(12) United States Patent
Kearns et al.

(10) Patent No.: US 9,400,503 B2
(45) Date of Patent: Jul. 26, 2016

(54) MOBILE HUMAN INTERFACE ROBOT

(75) Inventors: Justin H. Kearns, Cambridge, MA (US); Orjeta Taka, Peabody, MA (US); Robert Todd Pack, Nashua, NH (US); Michael T. Rosenstein, S. Hadley, MA (US); Michael Halloran, Waltham, MA (US); Timothy S. Farlow, Needham, MA (US); Steven V. Shamlian, Bedford, MA (US); Chikyung Won, Tewksbury, MA (US); Mark Chiappetta, Chelmsford, MA (US); Jasper Fourways Vicenti, Somerville, MA (US)

(73) Assignee: iRobot Corporation, Bedford, MA (US)

( * ) Notice: Subject to any disclaimer, the term of this patent is extended or adjusted under 35 U.S.C. 154(b) by 169 days.

(21) Appl. No.: 13/032,228

(22) Filed: Feb. 22, 2011

(65) Prior Publication Data

US 2012/0182392 A1 Jul. 19, 2012

Related U.S. Application Data

(60) Provisional application No. 61/346,612, filed on May 20, 2010, provisional application No. 61/356,910, filed on Jun. 21, 2010, provisional application No. 61/428,717, filed on Dec. 30, 2010, provisional (Continued)

(51) Int. Cl.
*G05D 1/00* (2006.01)
*G05D 1/02* (2006.01)
(Continued)

(52) U.S. Cl.
CPC ............ *G05D 1/0246* (2013.01); *B25J 11/009* (2013.01); *G05D 1/024* (2013.01); *G05D 1/0272* (2013.01); *G05D 1/0274* (2013.01);

(Continued)

(58) Field of Classification Search
CPC ........................................................ G01C 3/08
USPC ............................................................ 348/46
See application file for complete search history.

(56) References Cited

U.S. PATENT DOCUMENTS

| 4,223,753 A | 9/1980 | Bradbury |
| 5,350,033 A | 9/1994 | Kraft |

(Continued)

FOREIGN PATENT DOCUMENTS

| EP | 1806210 A2 | 7/2007 |
| JP | 10143243 A | 5/1998 |

(Continued)

OTHER PUBLICATIONS

Epton, "Odometry Correction of a Mobile Robot Using a Range-Finding Laser", A MS Thesis, the Graduate School of Clemson University, Dec. 2007.*

(Continued)

*Primary Examiner* — Jay Patel
*Assistant Examiner* — Frank Huang
(74) *Attorney, Agent, or Firm* — Honigman Miller Schwartz and Cohn LLP

(57) ABSTRACT

A method of object detection for a mobile robot includes emitting a speckle pattern of light onto a scene about the robot while maneuvering the robot across a work surface, receiving reflections of the emitted speckle pattern off surfaces of a target object in the scene, determining a distance of each reflecting surface of the target object, constructing a three-dimensional depth map of the target object, and classifying the target object.

12 Claims, 55 Drawing Sheets

Related U.S. Application Data application No. 61/428,734, filed on Dec. 30, 2010, provisional application No. 61/428,759, filed on Dec. 30, 2010, provisional application No. 61/429,863, filed on Jan. 5, 2011.

(51) Int. Cl.
- B25J 11/00 (2006.01)
- G06K 9/00 (2006.01)
- G06T 7/00 (2006.01)
- G06T 7/20 (2006.01)

(52) U.S. Cl.
CPC ......... *G06K 9/00664* (2013.01); *G06T 7/0057* (2013.01); *G06T 7/204* (2013.01); *G05D 1/027* (2013.01); *G05D 1/0227* (2013.01); *G05D 1/0242* (2013.01); *G05D 1/0255* (2013.01); *G05D 2201/0206* (2013.01); *Y10S 901/01* (2013.01); *Y10S 901/09* (2013.01); *Y10S 901/47* (2013.01)

(56) References Cited

U.S. PATENT DOCUMENTS

| | | |
|---|---|---|
| 5,372,211 A | 12/1994 | Wilcox et al. |
| 6,323,942 B1 | 11/2001 | Bamji |
| 6,515,740 B2 | 2/2003 | Bamji et al. |
| 6,604,021 B2 | 8/2003 | Imai et al. |
| 7,115,849 B2 | 10/2006 | Dowski, Jr. et al. |
| 7,139,642 B2 | 11/2006 | Kamoto et al. |
| 7,158,317 B2 | 1/2007 | Ben-Eliezer et al. |
| 7,340,077 B2 | 3/2008 | Gokturk et al. |
| 7,433,024 B2* | 10/2008 | Garcia et al. ............. 356/4.01 |
| 7,706,917 B1 | 4/2010 | Chiappetta et al. |
| 7,957,837 B2* | 6/2011 | Ziegler et al. ............ 700/258 |
| 2001/0037163 A1 | 11/2001 | Allard |
| 2004/0153229 A1* | 8/2004 | Gokturk et al. ............ 701/45 |
| 2004/0190753 A1* | 9/2004 | Sakagami ........... H04N 7/18 382/103 |
| 2005/0091684 A1 | 4/2005 | Kawabata et al. |
| 2005/0216126 A1 | 9/2005 | Koselka et al. |
| 2006/0095170 A1 | 5/2006 | Yang et al. |
| 2007/0100498 A1 | 5/2007 | Matsumoto et al. |
| 2007/0114075 A1 | 5/2007 | Buehler et al. |
| 2007/0152427 A1 | 7/2007 | Olsen |
| 2007/0291128 A1 | 12/2007 | Wang et al. |
| 2007/0293985 A1 | 12/2007 | Myeong et al. |
| 2008/0105481 A1 | 5/2008 | Hutcheson et al. |
| 2008/0106746 A1 | 5/2008 | Shpunt et al. |
| 2008/0201014 A1 | 8/2008 | Sonoura |
| 2008/0240502 A1 | 10/2008 | Freedman et al. |
| 2008/0253613 A1 | 10/2008 | Jones et al. |
| 2009/0055023 A1 | 2/2009 | Walters et al. |
| 2009/0096783 A1 | 4/2009 | Shpunt et al. |
| 2009/0164045 A1 | 6/2009 | Deguire et al. |
| 2009/0177323 A1 | 7/2009 | Ziegler et al. |
| 2009/0185274 A1 | 7/2009 | Shpunt |
| 2009/0226113 A1 | 9/2009 | Matsumoto et al. |
| 2010/0020078 A1 | 1/2010 | Shpunt |
| 2010/0034457 A1 | 2/2010 | Berliner et al. |
| 2010/0066587 A1 | 3/2010 | Yamauchi et al. |
| 2010/0118123 A1 | 5/2010 | Freedman et al. |
| 2010/0185362 A1 | 7/2010 | Vialatte et al. |
| 2010/0226543 A1* | 9/2010 | Zalevsky ............. 382/107 |
| 2011/0035054 A1 | 2/2011 | Gal et al. |
| 2011/0037866 A1 | 2/2011 | Iwamoto |
| 2011/0288682 A1 | 11/2011 | Pinter et al. |
| 2011/0288684 A1 | 11/2011 | Farlow et al. |
| 2012/0264414 A1 | 10/2012 | Fung |
| 2012/0303160 A1 | 11/2012 | Ziegler et al. |
| 2013/0054025 A1 | 2/2013 | Ito |
| 2013/0073089 A1 | 3/2013 | Nakahara |
| 2013/0163853 A1 | 6/2013 | Kwak et al. |
| 2013/0238125 A1 | 9/2013 | Suzuki |
| 2013/0238128 A1 | 9/2013 | Suzuki |

FOREIGN PATENT DOCUMENTS

| | | |
|---|---|---|
| JP | 2000289985 A | 10/2000 |
| JP | 200285305 A | 3/2002 |
| JP | 2008004078 A | 1/2008 |
| JP | 2009123061 A | 6/2009 |
| JP | 2009217363 A | 9/2009 |
| WO | WO-03102706 A1 | 12/2003 |
| WO | WO-2007041295 A2 | 4/2007 |
| WO | WO-2008/083489 A1 | 7/2008 |
| WO | WO-2008105634 A1 | 9/2008 |
| WO | WO-2010120707 A1 | 10/2010 |
| WO | WO-2011146254 A2 | 11/2011 |
| WO | WO-2011146259 A2 | 11/2011 |

OTHER PUBLICATIONS

Se, S.; Lowe, David G.; Little, J. (2001). "Vision-based mobile robot localization and mapping using scale-invariant features". *Proceedings of the IEEE International Conference on Robotics and Automation (ICRA)*. 2. pp. 2051.

Rothganger, F; S. Lazebnik, C. Schmid, and J. Ponce: 2004. 3D Object Modeling and Recognition Using Local Affine-Invariant Image Descriptors and Multi-View Spatial Constraints, ICCV.

Laptev, Ivan and Lindeberg, Tony (2004). "Local descriptors for spatio-temporal recognition". *ECCV'04 Workshop on Spatial Coherence for Visual Motion Analysis, Springer Lecture Notes in Computer Science*, vol. 3667. pp. 91-103.

Ivan Laptev, Barbara Caputo, Christian Schuldt and Tony Lindeberg (2007). "Local velocity-adapted motion events for spatio-temporal recognition". *Computer Vision and Image Understanding* 108: 207-229; Scovanner, Paul.

Ali, S; Shah, M (2007). "A 3-dimensional sift descriptor and its application to action recognition". *Proceedings of the 15th International Conference on Multimedia*. pp. 357-360.

Iryna Gordon and David G. Lowe, "What and where: 3D object recognition with accurate pose," *Toward Category-Level Object Recognition*, (Springer-Verlag, 2006), pp. 67-82.

Niebles, J. C. Wang, H. and Li, Fei-Fei (2006). "Unsupervised Learning of Human Action Categories Using Spatial-Temporal Words". *Proceedings of the British Machine Vision Conference (BMVC)*. Edinburgh.

Binotto A P D et al: "Real-time taks reconfiguration support applied to an UAV-based surveillance system", Computer Science and Information Technology, 2008. IMCSIT 2008. International Multiconference On, IEEE, Piscataway, NJ, USA, Oct. 20, 2008, pp. 581-588, XP031406238, ISBN: 978-83-60810-14-9.

International Search Report for application No. PCT/US2011/059863 dated Nov. 22, 2012.

Muller A., et al. "A model-based object following system", Intelligent Vehicles Symposium, 2009 IEEE, Piscataway, NJ, USA, Jun. 3, 2009, all pages.

Ho Seok Ahn, et. al. "PDA-based mobile robot system with remote monitoring for home environment", IEEE Transactions on Consumer Electronics, IEEE Service Center, New York, NY, USA, vol. 55, No. 3, 1, Aug. 1, 2009, all pages.

Kathryn A Daltorio, et al. "An obstacle-edging reflex for an autonomous lawnmower", Position Location and Navigation Symposium (PLANS), 2010 IEEE/ION, IEEE, Piscataway, NJ, USA, May 4, 2010, all pages.

International Search Report for Application No. PCT/US2011/035476 Dated May 17, 2013.

Jong-Hwan Kim et al., "Ubiquitous Robot: A New Paradigm for Integrated Sciences", 2007 IEEE International Conference on Robotics and Automation—Apr. 10-14, 2007—Roma, Italy, IEEE, Piscataway, NJ, USA, Apr. 10, 2007, all pages.

De F O Araujo T et al, "MaeRobot: An Open Source Test Platform for Prototyping Robots", Robotic Symposium, 2008, LARS '08. IEEE Latin American, IEEE, Piscataway, NJ, USA, Oct. 29, 2008, all pages.

(56) References Cited

OTHER PUBLICATIONS

Li Xiaopen et al., "Research an open control architecture of autonomous mobile robot with multi-layer and modularization", Infomatics in Control, Automation and Robotics (Car), 2010 2nd International Asia Conference ON, IEEE, Piscataway, NJ, USA, Mar. 6, 2010, all pages.
Hu Guanshan, "Neutral Networks Based on Information Fusion Using for Avoiding Obstacle Robot", Information Engineering, 2009. ICIE '09. Wase International Conference ON, IEEE, Piscataway, NJ, USA, Jul. 10, 2009, all pages.
Freire E O et al., "Prototyping a wheeled mobile robot embedding multiple sensors and agent-based control system", Proc. 43rd IEEE Midwest Symposium on Circuits and Systems, Aug. 8, 2000, all pages.
Sung-Min Han et al., "Mobile robot navigation by circular path planning algorithm using camera and ultrasonic sensor", Industrial Electronics, 2009. ISIE 2009. IEEE International Symposium ON, IEEE, Piscataway, NJ, USA, Jul. 5, 2009, all pages.
Ruifeng Li et al., "The development of a general type of security robot", Robotics and Biometrics, 2007. ROBIO 2007. IEEE International Conference ON, IEEE, Piscataway, NJ, USA, Dec. 15, 2007, all pages.
Pil Gyeom Kim el al., "Obstacle Avoidance of a Mobile Robot Using Vision System and Ultrasonic Sensor", Aug. 21, 2007, Advanced Intelligent Computing Theories and Applications, With Aspects of Theoretical and Methodological Issues, all pages.
International Search Report for Application No. PCT/US2011/059980 dated May 14, 2013.
Freire E. O., et al. "Prototyping a wheeled mobile robot embedding multiple sensors and agent-based control system", Proc. 43rd IEEE Midwest Symp. on Circuits and Systems, vol. 2, Aug. 8, 2000, Sep. 8, 2000, pp. 926-929.
Translation of Japanese Office Action for Application No. 2013-547475 dated Dec. 16, 2013.
Canadian Office Action for related Application No. 2,800,372 dated Apr. 2, 2014.
Australian examination report for related Application No. 2011256720 dated Mar. 27, 2014.
International Search Report for Application No. PCT/US2011/060935 Dated May 27, 2013.
Rajesh, Arumugam et al., "DAvinCi: A cloud computing framework fo service robots", 2010 IEEE International Conference on Robotics and Automation: ICRA 2010; Anchorage, Alaska, USA, May 3-8, 2010, IEEE, Piscataway, NJ, USA, May 3, 2010, all pages.
Bistry, H., et al. "A cloud computing approach to complex robot vision tasks using smart camera systems", Intelligent Robots and Systems (IROS), 2010 IEEE/RSJ International Conference On, Piscataway, NJ, USA, vol. 1-24, Oct. 18, 2010, all pages.
Nimmagadda, Y., et al. "Real-time moving object recognition and tracking using computation offloading", Intelligent Robots and Systems (IROS), 2010 IEEE/RSJ International Conference On, IEEE, Piscataway, NJ, USA, Oct. 18, 2010, all pages.
International Search Report for Application No. PCT/US2011/059910 Dated May 29, 2013.
Ferriere L. et. al., "Design of omnimobile robot wheels", Robotics and Automation, 1996. Proceedings., 1996 IEEE International Conference on Minneapolis, MN, Apr. 22028, 1996, New York, NY, IEEE, Apr. 22, 1996, all pages.
Kanda A. et. al., "Environment Recognition System Based on Multiple Classification Analyses for Mobile Robots", Journal of Bionic Engineering, Sep. 1, 2008, all pages.
International Search Report for Application No. PCT/US2011/035488 dated May 13, 2013.
Ahn, Ho Seok, et. al. "PDA-based mobile robot system with remote monitoring for home environment," IEEE Transactions on Consumer Electronics, IEEE Service Center, New York, NY, USA, vol. 55, No. 3, 1, Aug. 1, 2009, all pages.
Daltorio, Kathryn et al. "An obstacle-edging reflex for an autonomous lawnmower," Position Location and Navigation Symposium (PLANS), 2010 IEEE/ION, IEEE, Piscataway, NJ, USA, May 4, 2010, all pages.
International Search Report and Written Opinion for Application No. PCT/US2013/028208 dated Jul. 9, 2013.
Moravec, Hans: "Robots, Re-Evolving Mind", Carnegie Mellon University (Dec. 2000). Retrieved from http://www.frc.ri.cmu.edu/~hpm/project.archive/robot.papers/2000/Cerebrum. html.
Muller A., et al. "A model-based object following system," Intelligent Vehicles Symposium, 2009 IEEE, Piscataway, NJ, USA, Jun. 3, 2009, all pages.

* cited by examiner

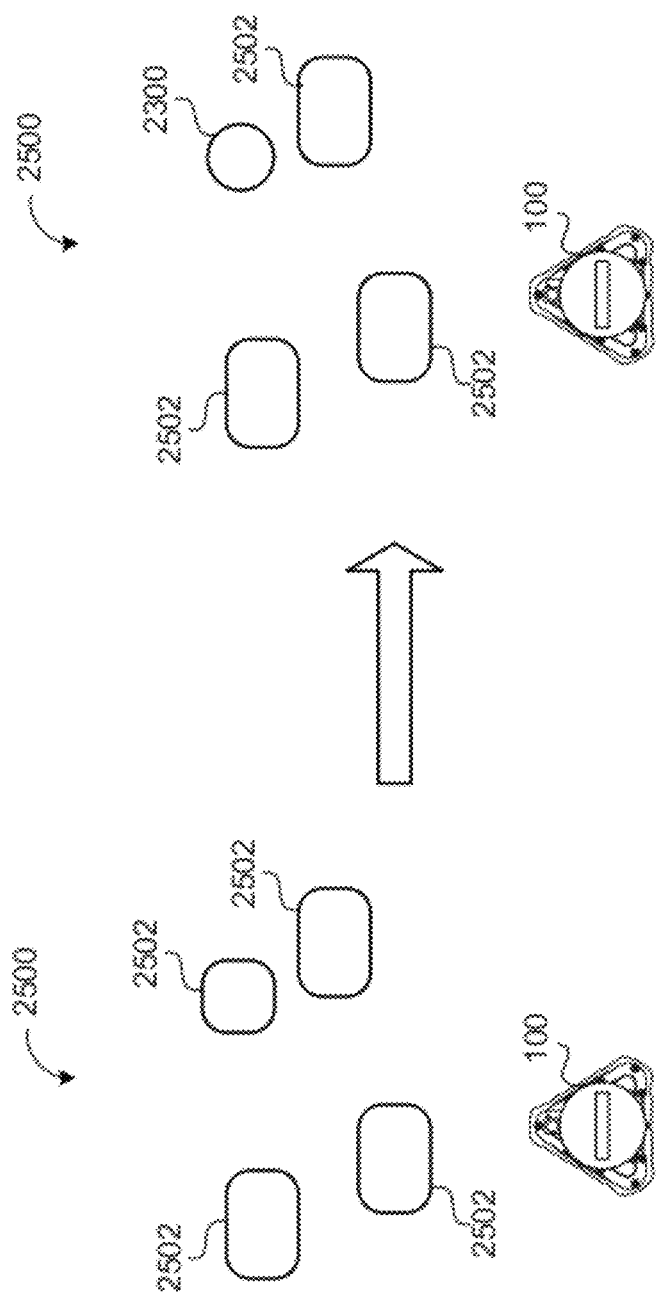

MOBILE HUMAN INTERFACE ROBOT

CROSS REFERENCE TO RELATED APPLICATIONS

This U.S. patent application claims priority under 35 U.S.C. §119(e) to U.S. Provisional Application 61/346,612, filed on May 20, 2010; U.S. Provisional Application 61/356,910, filed on Jun. 21, 2010; U.S. Provisional Application 61/428,717, filed on Dec. 30, 2010; U.S. Provisional Application 61/428,734, filed on Dec. 30, 2010; U.S. Provisional Application 61/428,759, filed on Dec. 30, 2010; and U.S. Provisional Application 61/429,863, filed on Jan. 5, 2011. The disclosures of these prior applications are considered part of the disclosure of this application and are hereby incorporated by reference in their entireties.

TECHNICAL FIELD

This disclosure relates to mobile human interface robots.

BACKGROUND

A robot is generally an electro-mechanical machine guided by a computer or electronic programming. Mobile robots have the capability to move around in their environment and are not fixed to one physical location. An example of a mobile robot that is in common use today is an automated guided vehicle or automatic guided vehicle (AGV). An AGV is generally a mobile robot that follows markers or wires in the floor, or uses a vision system or lasers for navigation. Mobile robots can be found in industry, military and security environments. They also appear as consumer products, for entertainment or to perform certain tasks like vacuum cleaning and home assistance.

SUMMARY

One aspect of the disclosure provides a mobile robot that includes a drive system, a controller in communication with the drive system, and a volumetric point cloud imaging device supported above the drive system at a height of greater than about one feet above the ground and directed to be capable of obtaining a point cloud from a volume of space that includes a floor plane in a direction of movement of the mobile robot. The controller receives point cloud signals from the imaging device and issues drive commands to the drive system based at least in part on the received point cloud signals.

Implementations of the disclosure may include one or more of the following features. In some implementations, the controller includes a computer capable of processing greater than 1000 million instructions per second (MIPS). The imaging device may emit light onto a scene about the robot and capture images of the scene along a drive direction of the robot. The images may include at least one of (a) a three-dimensional depth image, (b) an active illumination image, and (c) an ambient illumination image. The controller determines a location of an object in the scene based on the images and issues drive commands to the drive system to maneuver the robot in the scene based on the object location. In some examples, the imaging device determines a time-of-flight between emitting the light and receiving reflected light from the scene. The controller uses the time-of-flight for determining a distance to the reflecting surfaces of the object. In additional examples, the imaging device includes a light source for emitting light and an imager for receiving reflections of the emitted light from the scene. The imager includes an array of light detecting pixels. The light sensor may emit the light onto the scene in intermittent pulses. For example, the light sensor may emit the light pulses at a first, power saving frequency and upon receiving a sensor event emits the light pulses at a second, active frequency. The sensor event may include a sensor signal indicative of the presence of an object in the scene.

In some implementations, the imaging device includes first and second portions. The first portion is arranged to emit light substantially onto the ground and receive reflections of the emitted light from the ground. The second portion is arranged to emit light into a scene substantially above the ground and receive reflections of the emitted light from a scene about the robot.

The imaging device may include a speckle emitter emitting a speckle pattern of light onto a scene along a drive direction of the robot and an imager receiving reflections of the speckle pattern from the object in the scene. The controller stores reference images of the speckle pattern as reflected off a reference object in the scene. The reference images can be captured at different distances from the reference object. The controller compares at least one target image of the speckle pattern as reflected off a target object in the scene with the reference images for determining a distance of the reflecting surfaces of the target object. The controller may determine a primary speckle pattern on the target object and computes at least one of a respective cross-correlation and a decorrelation between the primary speckle pattern and the speckle patterns of the reference images.

Another aspect of the disclosure provides a mobile robot that includes a base and a holonomic drive system supported by the base. The drive system has first, second, and third drive wheels, each trilaterally spaced about the vertical center axis. Each drive wheel has a drive direction perpendicular to a radial axis with respect to the vertical center axis. The holonomic drive system maneuvers the robot over a work surface of a scene. The robot also includes a controller in communication with the drive system, a leg extending upward from the base and having a variable height, and a torso supported by the leg. The torso defines a shoulder having a bottom surface overhanging the base. An imaging sensor is disposed on the bottom surface of the torso and points downward along a forward drive direction of the drive system. The imaging sensor captures three-dimensional images of a scene about the robot.

In some implementations, the imaging sensor includes a speckle emitter emitting a speckle pattern of light onto the scene and an imager receiving reflections of the speckle pattern from the object in the scene. The controller stores reference images of the speckle pattern as reflected off a reference object in the scene. The reference images can be captured at different distances from the reference object. The controller compares at least one target image of the speckle pattern as reflected off a target object in the scene with the reference images for determining a distance of the reflecting surfaces of the target object.

The imaging sensor may capture image of the scene along a drive direction of the robot. The images may include at least one of (a) a three-dimensional depth image, (b) an active illumination image, and (c) an ambient illumination image. In some examples, the controller determines a location of an object in the scene based on the image comparison and issues drive commands to the drive system to maneuver the robot in the scene based on the object location. The controller may determine a primary speckle pattern on the target object and compute at least one of a respective cross-correlation and a decorrelation between the primary speckle pattern and the speckle patterns of the reference images.

In some implementations, the imaging sensor includes a volumetric point cloud imaging device positioned at a height of greater than 2 feet above the ground and directed to be capable of obtaining a point cloud from a volume of space that includes a floor plane in a direction of movement of the robot. The imaging sensor may be arranged on the torso to view the work surface forward of the drive wheels of the drive system. In some examples, the imaging sensor has a horizontal field of view of at least 45 degrees and a vertical field of view of at least 40 degrees. Moreover, the imaging sensor may have a range of between about 1 meter and about 5 meters. The imaging sensor may scan side-to-side with respect to the forward drive direction to increase a lateral field of view of the imaging sensor.

The imaging sensor may have a latency of about 44 ms. Imaging output of the imaging sensor can receive a time stamp for compensating for latency. In some examples, the imaging sensor includes a serial peripheral interface bus for communicating with the controller. The imaging sensor may be recessed within a body of the torso while maintaining its downward field of view (e.g., to minimize snagging on objects).

In some implementations, the robot includes an array of sonar proximity sensors disposed around the base and aiming upward to provide a sonar detection curtain around the robot for detecting objects encroaching on at least one of the leg and the torso. The array of sonar proximity sensors may be aimed away from the torso (e.g., off vertical). The robot may include a laser scanner in communication with the controller and having a field of view centered on the forward drive direction and substantially parallel to the work surface.

Each drive wheel may include first and second rows of rollers disposed about a periphery of the drive wheel. Each roller has a rolling direction perpendicular to a rolling direction of the drive wheel. The rollers may each define an arcuate rolling surface. Together the rollers define an at least substantially circular rolling surface of the drive wheel.

In yet another aspect, a self-propelled teleconferencing platform for tele-presence applications includes a drive system chassis supporting a drive system, a computer chassis disposed above the drive system chassis and supporting a computer capable of processing greater than 1000 million instructions per second (MIPS), a display supported above the computer chassis, and a camera supported above the computer chassis and movable within at least one degree of freedom separately from the display. The camera has an objective lens positioned more than 3 feet from the ground and less than 10 percent of a display height from a top edge of a display area of the display.

In some implementations, the camera comprises a volumetric point cloud imaging device positioned at a height greater than about 1 feet above the ground and directed to be capable of obtaining a point cloud from a volume of space that includes a floor plane in a direction of movement of the platform. Moreover, the camera may include a volumetric point cloud imaging device positioned to be capable of obtaining a point cloud from a volume of space adjacent the platform. In some examples, the display has a display area of at least 150 square inches and is movable with at least one degree of freedom. The objective lens of the camera may have a zoom lens.

The self-propelled teleconferencing platform may include a battery configured to power the computer for at least three hours. The drive system may include a motorized omni-directional drive. For example, the drive system may include first, second, and third drive wheels, each trilaterally spaced about a vertical center axis and supported by the drive system chassis. Each drive wheel has a drive direction perpendicular to a radial axis with respect to the vertical center axis.

The self-propelled teleconferencing platform may include a leg extending upward from the drive system chassis and having a variable height and a torso supported by the leg. The torso defines a shoulder having a bottom surface overhanging the base. The platform may also include a neck supported by the torso and a head supported by the neck. The neck pans and tilts the head with respect to the vertical center axis. The head supports both the display and the camera. The platform may include a torso imaging sensor disposed on the bottom surface of the torso and pointing downward along a forward drive direction of the drive system. The torso imaging sensor captures three-dimensional images of a scene about the robot. In some examples, the platform includes a head imaging sensor mounted on the head and capturing three-dimensional images of a scene about the robot.

One aspect of the disclosure provides a method of operating a mobile robot. The method includes receiving three-dimensional depth image data, producing a local perceptual space corresponding to an environment around the robot, and classifying portions of the local perceptual space corresponding to sensed objects located above a ground plane and below a height of the robot as obstacles. The method also includes classifying portions of the local perceptual space corresponding to sensed objects below the ground plane as obstacles, classifying portions of the local perceptual space corresponding to unobstructed area on the ground plane as free space, and classifying all remaining unclassified local perceptual space as unknown. The method includes executing a drive command to move to a location in the environment corresponding to local perceptual space classified as at least of free space and unknown.

Implementations of the disclosure may include one or more of the following features. In some implementations, the classifications decay over time unless persisted with updated three-dimensional depth image data. The method may include evaluating predicted robot paths corresponding to feasible robot drive commands by rejecting robot paths moving to locations having a corresponding local perceptual space classified as obstacles or unknown. In some examples, the method includes producing a three-dimensional voxel grid using the three-dimensional depth image data and converting the three-dimensional voxel grid into a two-dimensional grid. Each cell of the two-dimensional grid corresponds to a portion of the local perceptual space. In additional examples, the method includes producing a grid corresponding to the local perceptual space. Each grid cell has the classification of the corresponding local perceptual space. For each grid cell classified as an obstacle or unknown, the method includes retrieving a grid point within that grid cell and executing a collision evaluation. The collision evaluation may include rejecting grid points located within a collision circle about a location of the robot. Alternatively or additionally, the collision evaluation may include rejecting grid points located within a collision triangle centered about a location of the robot.

In some implementations, the method includes orienting a field of view of an imaging sensor providing the three-dimensional depth image data toward an area in the environment corresponding to local perceptual space classified as unknown. The method may include rejecting a drive command that moves the robot to a robot position beyond a field of view of an imaging sensor providing the three-dimensional depth image data. Moreover, the method may include rejecting a drive command to move holonomically perpendicular to a forward drive direction of the robot when the robot has been stationary for a threshold period of time. The imaging sensor providing the three-dimensional depth image data may be aligned with the forward drive direction. In some examples, the method includes accepting a drive command to move holonomically perpendicular to a forward drive direction of the robot while the robot is driving forward. The imaging sensor providing the three-dimensional depth image data can be aligned with the forward drive direction and have a field of view angle of at least 45 degrees. The method may include accepting a drive command to move to a location in the environment having corresponding local perceptual space classified as unknown when the robot determines that a field of view of an imaging sensor providing the three-dimensional depth image data covers the location before the robot reaches the location.

The three-dimensional depth image data is provided, in some implementations, by a volumetric point cloud imaging device positioned on the robot to be capable of obtaining a point cloud from a volume of space adjacent the robot. For example, the three-dimensional depth image data can be provided by a volumetric point cloud imaging device positioned on the robot at a height of greater than 2 feet above the ground and directed to be capable of obtaining a point cloud from a volume of space that includes a floor plane in a direction of movement of the robot.

Another aspect of the disclosure provides a method of operating a mobile robot to follow a person. The method includes receiving three-dimensional image data from a volumetric point cloud imaging device positioned to be capable of obtaining a point cloud from a volume of space adjacent the robot, segmenting the received three-dimensional image data into objects, filtering the objects to remove objects greater than a first threshold size and smaller than a second threshold size, identifying a person corresponding to at least a portion of the filtered objects, and moving at least a portion of the robot with respect to the identified person.

In some implementations, the three-dimensional image data comprises a two-dimensional array of pixels. Each pixel contains depth information. The method may include grouping the pixels into the objects based on a proximity of each pixel to a neighboring pixel. In some examples, the method includes driving the robot away from the identified person when the identified person is within a threshold distance of the robot. The method may include maintaining a field of view of the imaging device on the identified person. Moreover, the method may include driving the robot to maintain a following distance between the robot and the identified person.

In some implementations, the method includes issuing waypoint drive commands to drive the robot within a following distance of the identified person and/or maintaining a field of view of the imaging device on the identified person. The method may include at least one of panning and tilting the imaging device to aim a corresponding field of view at least substantially toward the identified person. In some examples, the method includes driving the robot toward the identified person when the identified person is beyond a threshold distance of the robot.

The imaging device may be positioned at a height of at least about one feet above a ground surface and directed to be capable of obtaining a point cloud from a volume of space that includes a floor plane in a direction of movement of the robot. The first threshold size may include a height of about 8 feet and the second threshold size may include a height of about 3 feet. The method may include identifying multiple people corresponding to the filtered objects. A Kalman filter can be used to track and propagate a movement trajectory of each identified person. The method may include issuing a drive command based at least in part on a movement trajectory of at least one identified person.

In yet another aspect, a method of object detection for a mobile robot includes maneuvering the robot across a work surface, emitting light onto a scene about the robot, and capturing images of the scene along a drive direction of the robot. The images include at least one of (a) a three-dimensional depth image, (b) an active illumination image, and (c) an ambient illumination image. The method further includes determining a location of an object in the scene based on the images, assigning a confidence level for the object location, and maneuvering the robot in the scene based on the object location and corresponding confidence level.

In some implementations, the method includes constructing an object occupancy map of the scene. The method may include degrading the confidence level of each object location over time until updating the respective object location with a newly determined object location. In some examples, the method includes maneuvering the robot to at least one of 1) contact the object and 2) follow along a perimeter of the object. In additional examples, the method includes maneuvering the robot to avoid the object.

The method may include emitting the light onto the scene in intermittent pulses. For example, a frequency of the emitted light pulses can be altered. In some implementations, the method includes emitting the light pulses at a first, power saving frequency and upon receiving a sensor event emitting the light pulses at a second, active frequency. The sensor event may include a sensor signal indicative of the presence of an object in the scene.

In some implementations, the method includes constructing the three-dimensional depth image of the scene by emitting a speckle pattern of light onto the scene, receiving reflections of the speckle pattern from the object in the scene, storing reference images of the speckle pattern as reflected off a reference object in the scene, capturing at least one target image of the speckle pattern as reflected off a target object in the scene, and comparing the at least one target image with the reference images for determining a distance of the reflecting surfaces of the target object. The reference images can be captured at different distances from the reference object. The method may include determining a primary speckle pattern on the target object and computing at least one of a respective cross-correlation and a decorrelation between the primary speckle pattern and the speckle patterns of the reference images.

In another aspect, a method of object detection for a mobile robot includes emitting a speckle pattern of light onto a scene about the robot while maneuvering the robot across a work surface, receiving reflections of the emitted speckle pattern off surfaces of a target object in the scene, determining a distance of each reflecting surface of the target object, constructing a three-dimensional depth map of the target object, and classifying the target object. In some examples, the method includes maneuvering the robot with respect to the target object based on the classification of the target object.

In some implementations, the method includes storing reference images of the speckle pattern as reflected off a reference object in the scene. The reference images can be captured at different distances from the reference object. The method may include determining a primary speckle pattern on the target object and computing at least one of a respective cross-correlation and a decorrelation between the primary speckle pattern and the speckle patterns of the reference images.

In some examples, the method includes emitting the speckle pattern of light in intermittent pulses, for example, as by altering a frequency of the emitted light pulses. The method may include capturing frames of reflections of the emitted speckle pattern off surfaces of the target object at a frame rate. The frame rate can be between about 10 Hz and about 90 Hz. The method may include resolving differences between speckle patterns captured in successive frames for identification of the target object.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 25B is a schematic view of an exemplary local map of a mobile human interface robot being updated with a person location.

Like reference symbols in the various drawings indicate like elements.

DETAILED DESCRIPTION

Mobile robots can interact or interface with humans to provide a number of services that range from home assistance to commercial assistance and more. In the example of home assistance, a mobile robot can assist elderly people with everyday tasks, including, but not limited to, maintaining a medication regime, mobility assistance, communication assistance (e.g., video conferencing, telecommunications, Internet access, etc.), home or site monitoring (inside and/or outside), person monitoring, and/or providing a personal emergency response system (PERS). For commercial assistance, the mobile robot can provide videoconferencing (e.g., in a hospital setting), a point of sale terminal, interactive information/marketing terminal, etc.

Figure 1:
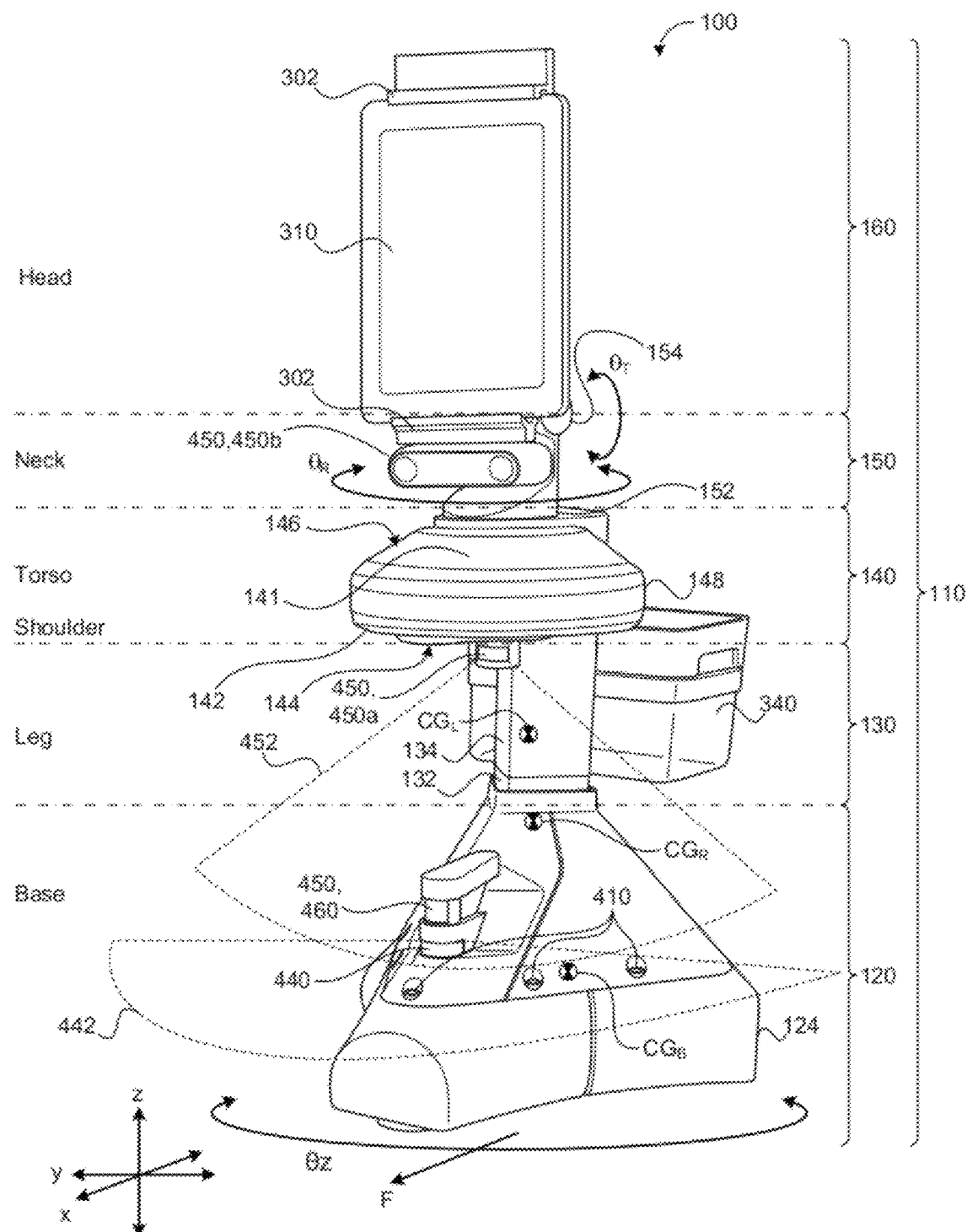
FIG. 1 is a perspective view of an exemplary mobile human interface robot.
Figure 2:
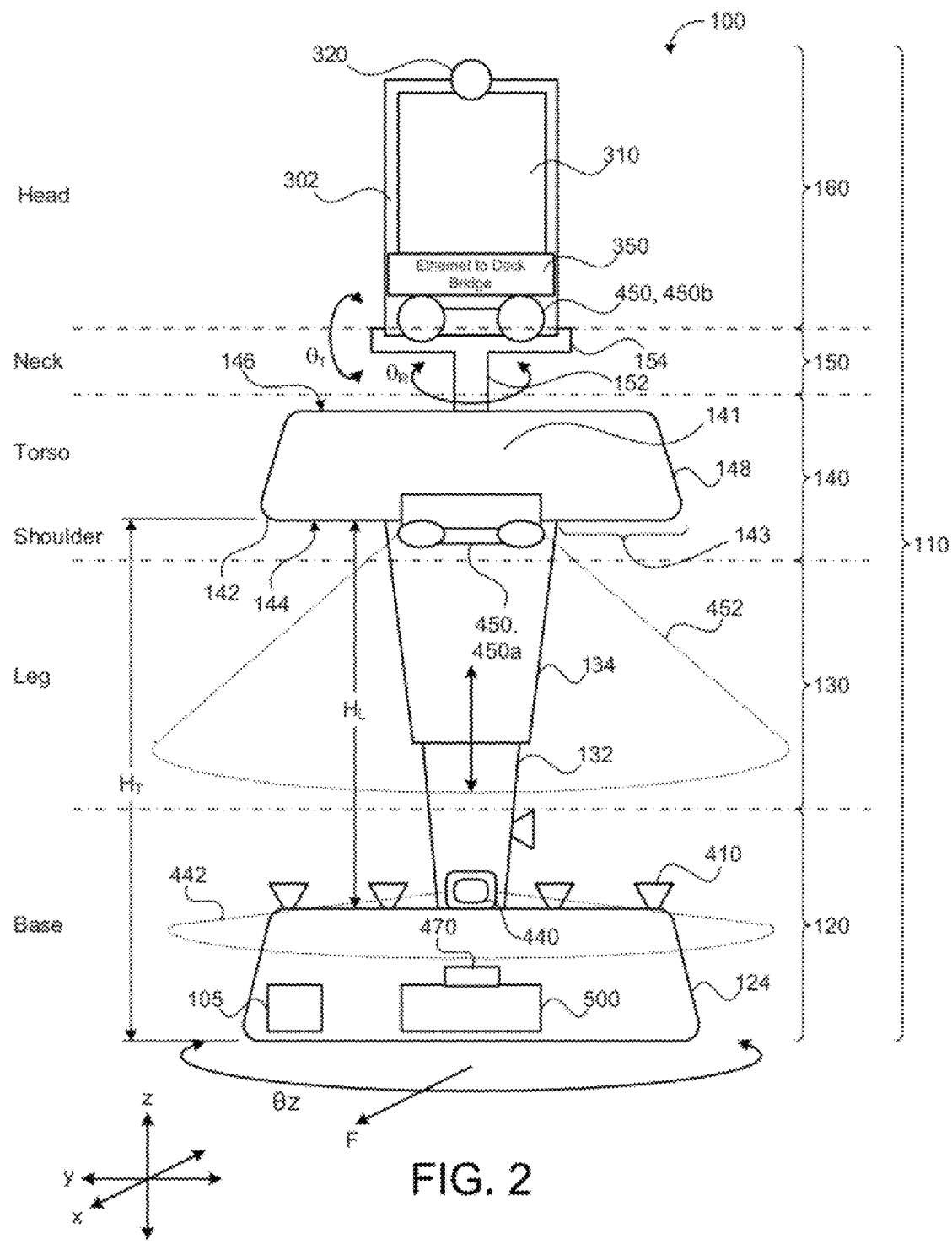
FIG. 2 is a schematic view of an exemplary mobile human interface robot.

Referring to FIGS. 1-2, in some implementations, a mobile robot 100 includes a robot body 110 (or chassis) that defines a forward drive direction F. The robot 100 also includes a drive system 200, an interfacing module 300, and a sensor system 400, each supported by the robot body 110 and in communication with a controller 500 that coordinates operation and movement of the robot 100. A power source 105 (e.g., battery or batteries) can be carried by the robot body 110 and in electrical communication with, and deliver power to, each of these components, as necessary. For example, the controller 500 may include a computer capable of >1000 MIPS (million instructions per second) and the power source 1058 provides a battery sufficient to power the computer for more than three hours.

The robot body 110, in the examples shown, includes a base 120, at least one leg 130 extending upwardly from the base 120, and a torso 140 supported by the at least one leg 130. The base 120 may support at least portions of the drive system 200. The robot body 110 also includes a neck 150 supported by the torso 140. The neck 150 supports a head 160, which supports at least a portion of the interfacing module 300. The base 120 includes enough weight (e.g., by supporting the power source 105 (batteries) to maintain a low center of gravity $CG_B$ of the base 120 and a low overall center of gravity $CG_R$ of the robot 100 for maintaining mechanical stability.

Referring to FIGS. 3 and 4A-4C, in some implementations, the base 120 defines a trilaterally symmetric shape (e.g., a triangular shape from the top view). For example, the base 120 may include a base chassis 122 that supports a base body 124 having first, second, and third base body portions 124a, 124b, 124c corresponding to each leg of the trilaterally shaped base 120 (see e.g., FIG. 4A). Each base body portion 124a, 124b, 124c can be movably supported by the base chassis 122 so as to move independently with respect to the base chassis 122 in response to contact with an object. The trilaterally symmetric shape of the base 120 allows bump detection 360° around the robot 100. Each base body portion 124a, 124b, 124c can have an associated contact sensor e.g., capacitive sensor, read switch, etc.) that detects movement of the corresponding base body portion 124a, 124b, 124c with respect to the base chassis 122.

In some implementations, the drive system 200 provides omni-directional and/or holonomic motion control of the robot 100. As used herein the term "omni-directional" refers to the ability to move in substantially any planar direction, i.e., side-to-side (lateral), forward/back, and rotational. These directions are generally referred to herein as x, y, and θz, respectively. Furthermore, the term "holonomic" is used in a manner substantially consistent with the literature use of the term and refers to the ability to move in a planar direction with three planar degrees of freedom, i.e., two translations and one rotation. Hence, a holonomic robot has the ability to move in a planar direction at a velocity made up of substantially any proportion of the three planar velocities (forward/back, lateral, and rotational), as well as the ability to change these proportions in a substantially continuous manner.

Figure 5A:
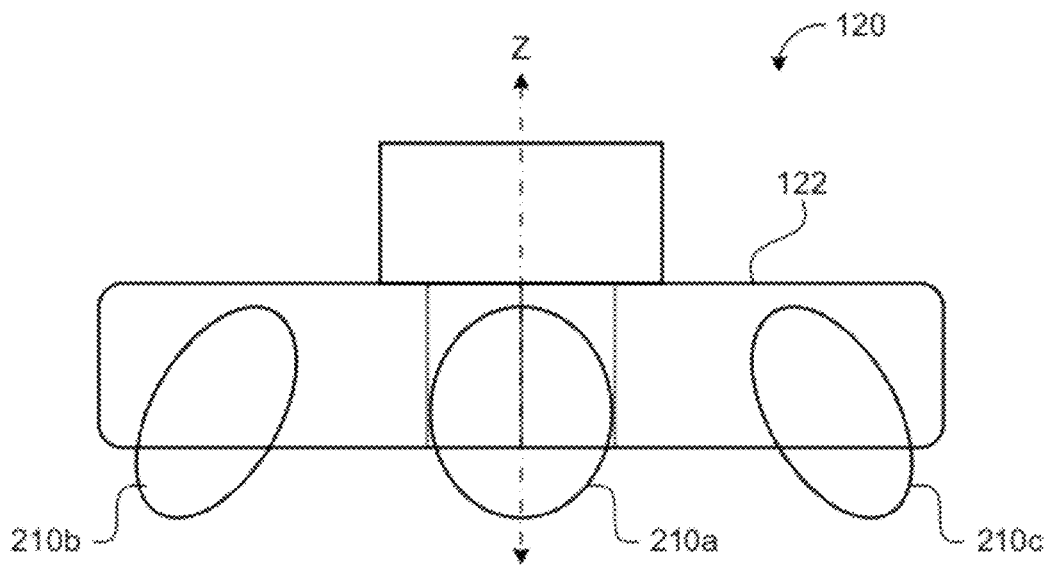
FIG. 5A is a front schematic view of an exemplary base for a mobile human interface robot.
Figure 5B:
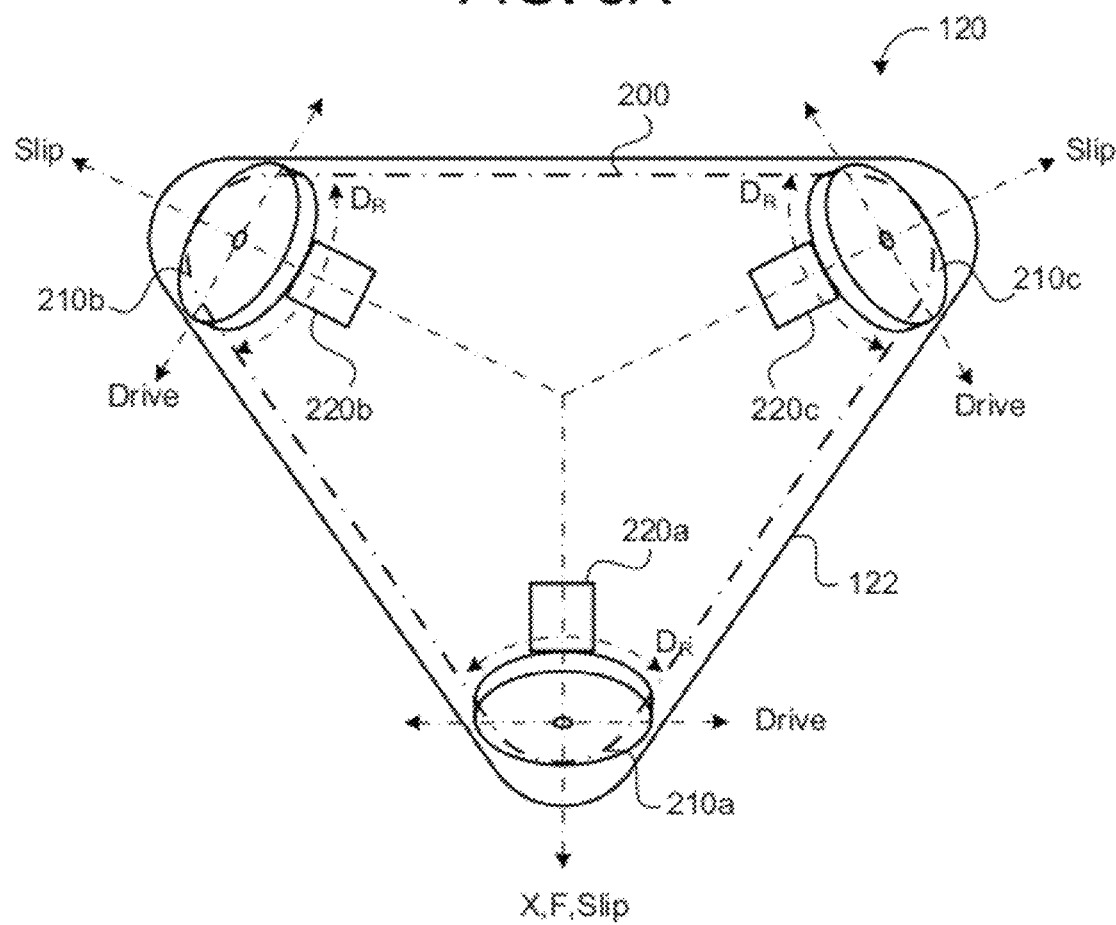
FIG. 5B is a top schematic view of an exemplary base for a mobile human interface robot.

The robot 100 can operate in human environments (e.g., environments typically designed for bipedal, walking occupants) using wheeled mobility. In some implementations, the drive system 200 includes first, second, and third drive wheels 210a, 210b, 210c equally spaced (i.e., trilaterally symmetric) about the vertical axis Z (e.g., 120 degrees apart); however, other arrangements are possible as well. Referring to FIGS. 5A and 5B, the drive wheels 210a, 210b, 210c may define a transverse arcuate rolling surface (i.e., a curved profile in a direction transverse or perpendicular to the rolling direction $D_R$), which may aid maneuverability of the holonomic drive system 200. Each drive wheel 210a, 210b, 210c is coupled to a respective drive motor 220a, 220b, 220c that can drive the drive wheel 210a, 210b, 210c in forward and/or reverse directions independently of the other drive motors 220a, 220b, 220c. Each drive motor 220a-c can have a respective encoder 212 (FIG. 8C), which provides wheel rotation feedback to the controller 500. In some examples, each drive wheels 210a, 210b, 210c is mounted on or near one of the three points of an equilateral triangle and having a drive direction (forward and reverse directions) that is perpendicular to an angle bisector of the respective triangle end. Driving the trilaterally symmetric holonomic base 120 with a forward driving direction F, allows the robot 100 to transition into non forward drive directions for autonomous escape from confinement or clutter and then rotating and/or translating to drive along the forward drive direction F after the escape has been resolved.

Figure 5D:
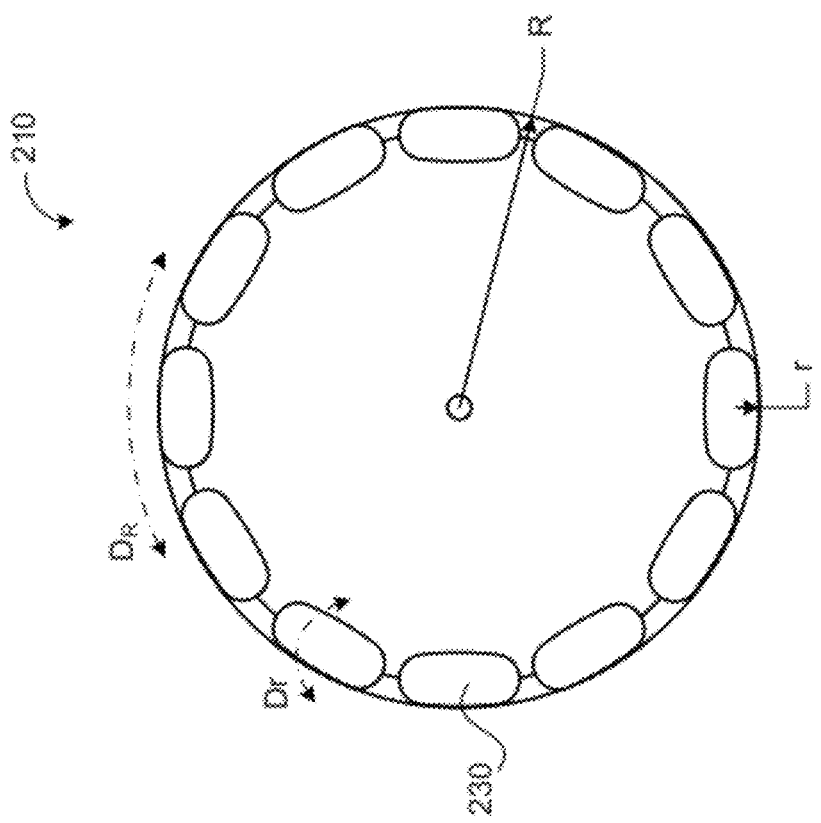
FIG. 5D is a side view of the wheel shown in FIG. 5C.
Figure 5C:
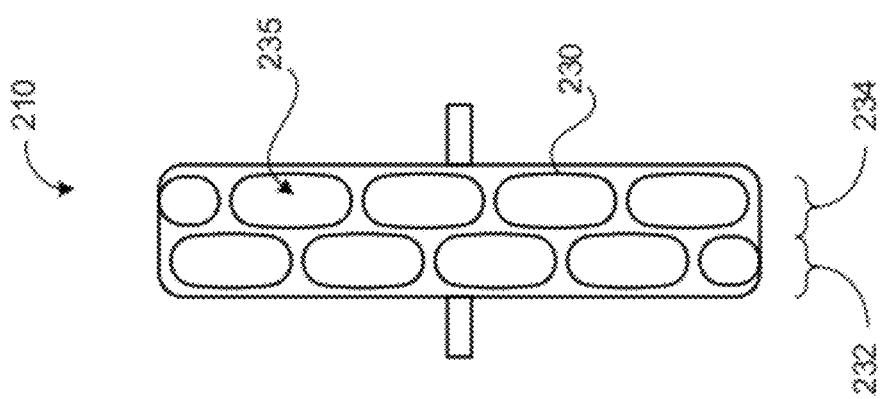
FIG. 5C is a front view of an exemplary holonomic wheel for a mobile human interface robot.

Referring to FIGS. 5C and 5D, in some implementations, each drive wheel 210 includes inboard and outboard rows 232, 234 of rollers 230, each have a rolling direction $D_r$ perpendicular to the rolling direction $D_R$ of the drive wheel 210. The rows 232, 234 of rollers 230 can be staggered (e.g., such that one roller 230 of the inboard row 232 is positioned equally between two adjacent rollers 230 of the outboard row 234. The rollers 230 provide infinite slip perpendicular to the drive direction the drive wheel 210. The rollers 230 define an arcuate (e.g., convex) outer surface 235 perpendicular to their rolling directions $D_r$, such that together the rollers 230 define the circular or substantially circular perimeter of the drive wheel 210. The profile of the rollers 230 affects the overall profile of the drive wheel 210. For example, the rollers 230 may define arcuate outer roller surfaces 235 that together define a scalloped rolling surface of the drive wheel 210 (e.g., as treads for traction). However, configuring the rollers 230 to have contours that define a circular overall rolling surface of the drive wheel 210 allows the robot 100 to travel smoothly on a flat surface instead of vibrating vertically with a wheel tread. When approaching an object at an angle, the staggered rows 232, 234 of rollers 230 (with radius r) can be used as treads to climb objects as tall or almost as tall as a wheel radius R of the drive wheel 210.

In the examples shown in FIGS. 3-5B, the first drive wheel 210a is arranged as a leading drive wheel along the forward drive direction F with the remaining two drive wheels 210b, 210c trailing behind. In this arrangement, to drive forward, the controller 500 may issue a drive command that causes the second and third drive wheels 210b, 210c to drive in a forward rolling direction at an equal rate while the first drive wheel 210a slips along the forward drive direction F. Moreover, this drive wheel arrangement allows the robot 100 to stop short (e.g., incur a rapid negative acceleration against the forward drive direction F). This is due to the natural dynamic instability of the three wheeled design. If the forward drive direction F were along an angle bisector between two forward drive wheels, stopping short would create a torque that would force the robot 100 to fall, pivoting over its two "front" wheels. Instead, travelling with one drive wheel 210a forward naturally supports or prevents the robot 100 from toppling over forward, if there is need to come to a quick stop. When accelerating from a stop, however, the controller 500 may take into account a moment of inertia I of the robot 100 from its overall center of gravity $CG_R$.

In some implementations of the drive system 200, each drive wheel 210a, 210b, 210 has a rolling direction $D_R$ radially aligned with a vertical axis Z, which is orthogonal to X and Y axes of the robot 100. The first drive wheel 210a can be arranged as a leading drive wheel along the forward drive direction F with the remaining two drive wheels 210b, 210c trailing behind. In this arrangement, to drive forward, the controller 500 may issue a drive command that causes the first drive wheel 210a to drive in a forward rolling direction and the second and third drive wheels 210b, 210c to drive at an equal rate as the first drive wheel 210a, but in a reverse direction.

In other implementations, the drive system 200 can be arranged to have the first and second drive wheels 210a, 210b positioned such that an angle bisector of an angle between the two drive wheels 210a, 210b is aligned with the forward drive direction F of the robot 100. In this arrangement, to drive forward, the controller 500 may issue a drive command that causes the first and second drive wheels 210a, 210b to drive in a forward rolling direction and an equal rate, while the third drive wheel 210c drives in a reverse direction or remains idle and is dragged behind the first and second drive wheels 210a, 210b. To turn left or right while driving forward, the controller 500 may issue a command that causes the corresponding first or second drive wheel 210a, 210b to drive at relatively quicker/slower rate. Other drive system 200 arrangements can be used as well. The drive wheels 210a, 210b, 210c may define a cylindrical, circular, elliptical, or polygonal profile.

Referring again to FIGS. 1-3, the base 120 supports at least one leg 130 extending upward in the Z direction from the base 120. The leg(s) 130 may be configured to have a variable height for raising and lowering the torso 140 with respect to the base 120. In some implementations, each leg 130 includes first and second leg portions 132, 134 that move with respect to each other (e.g., telescopic, linear, and/or angular movement). Rather than having extrusions of successively smaller diameter telescopically moving in and out of each other and out of a relatively larger base extrusion, the second leg portion 134, in the examples shown, moves telescopically over the first leg portion 132, thus allowing other components to be placed along the second leg portion 134 and potentially move with the second leg portion 134 to a relatively close proximity of the base 120. The leg 130 may include an actuator assembly 136 (FIG. 8C) for moving the second leg portion 134 with respect to the first leg portion 132. The actuator assembly 136 may include a motor driver 138a in communication with a lift motor 138b and an encoder 138c, which provides position feedback to the controller 500.

Generally, telescopic arrangements include successively smaller diameter extrusions telescopically moving up and out of relatively larger extrusions at the base 120 in order to keep a center of gravity $CG_L$ of the entire leg 130 as low as possible. Moreover, stronger and/or larger components can be placed at the bottom to deal with the greater torques that will be experienced at the base 120 when the leg 130 is fully extended. This approach, however, offers two problems. First, when the relatively smaller components are placed at the top of the leg 130, any rain, dust, or other particulate will tend to run or fall down the extrusions, infiltrating a space between the extrusions, thus obstructing nesting of the extrusions. This creates a very difficult sealing problem while still trying to maintain full mobility/articulation of the leg 130. Second, it may be desirable to mount payloads or accessories on the robot 100. One common place to mount accessories is at the top of the torso 140. If the second leg portion 134 moves telescopically in and out of the first leg portion, accessories and components could only be mounted above the entire second leg portion 134, if they need to move with the torso 140. Otherwise, any components mounted on the second leg portion 134 would limit the telescopic movement of the leg 130.

By having the second leg portion 134 move telescopically over the first leg portion 132, the second leg portion 134 provides additional payload attachment points that can move vertically with respect to the base 120. This type of arrangement causes water or airborne particulate to run down the torso 140 on the outside of every leg portion 132, 134 (e.g., extrusion) without entering a space between the leg portions 132, 134. This greatly simplifies sealing any joints of the leg 130. Moreover, payload/accessory mounting features of the torso 140 and/or second leg portion 134 are always exposed and available no matter how the leg 130 is extended.

Figure 3:
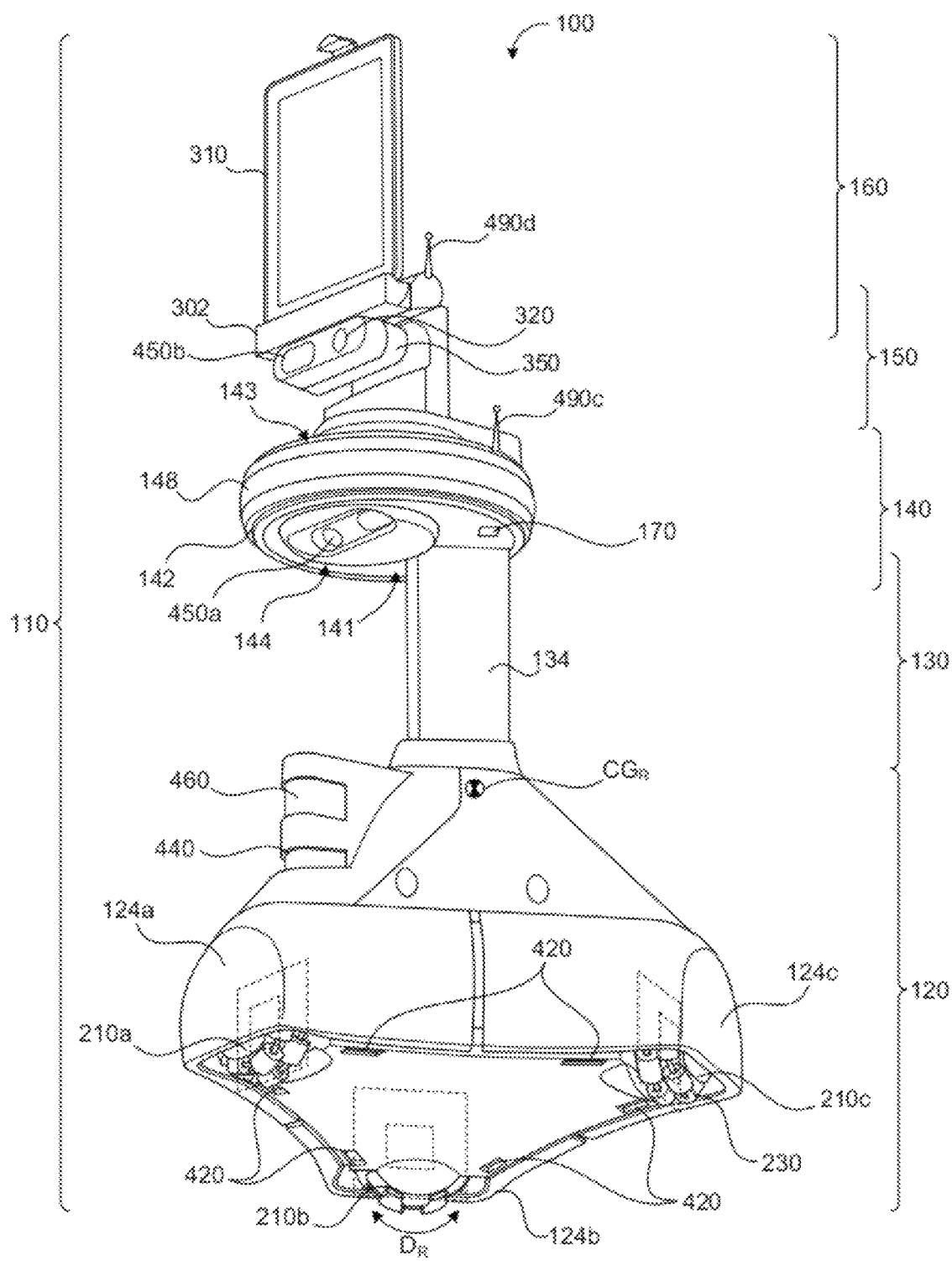
FIG. 3 is an elevated perspective view of an exemplary mobile human interface robot.
Figure 6:
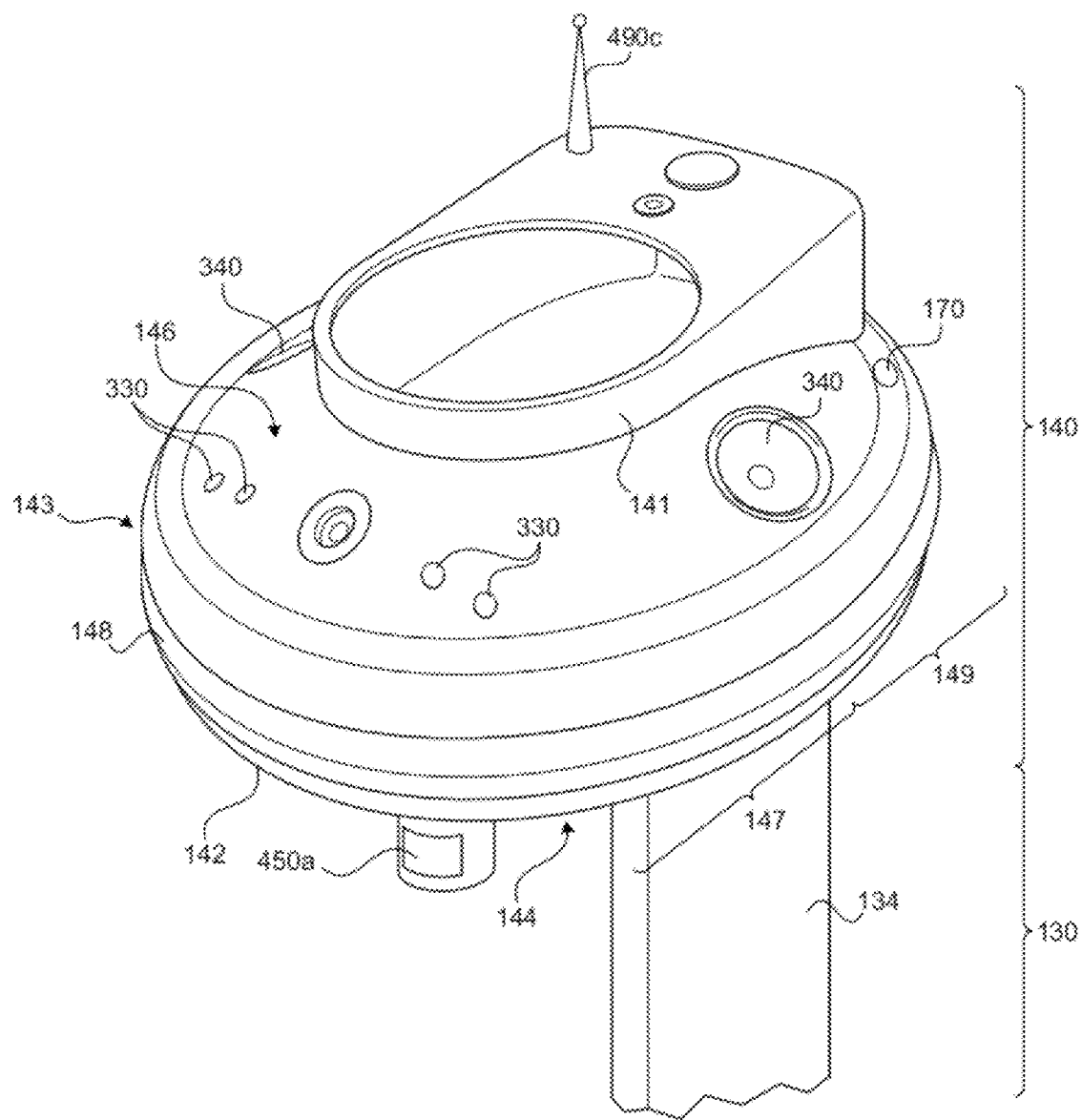
FIG. 6 is a front perspective view of an exemplary torso for a mobile human interface robot.
Figure 7:
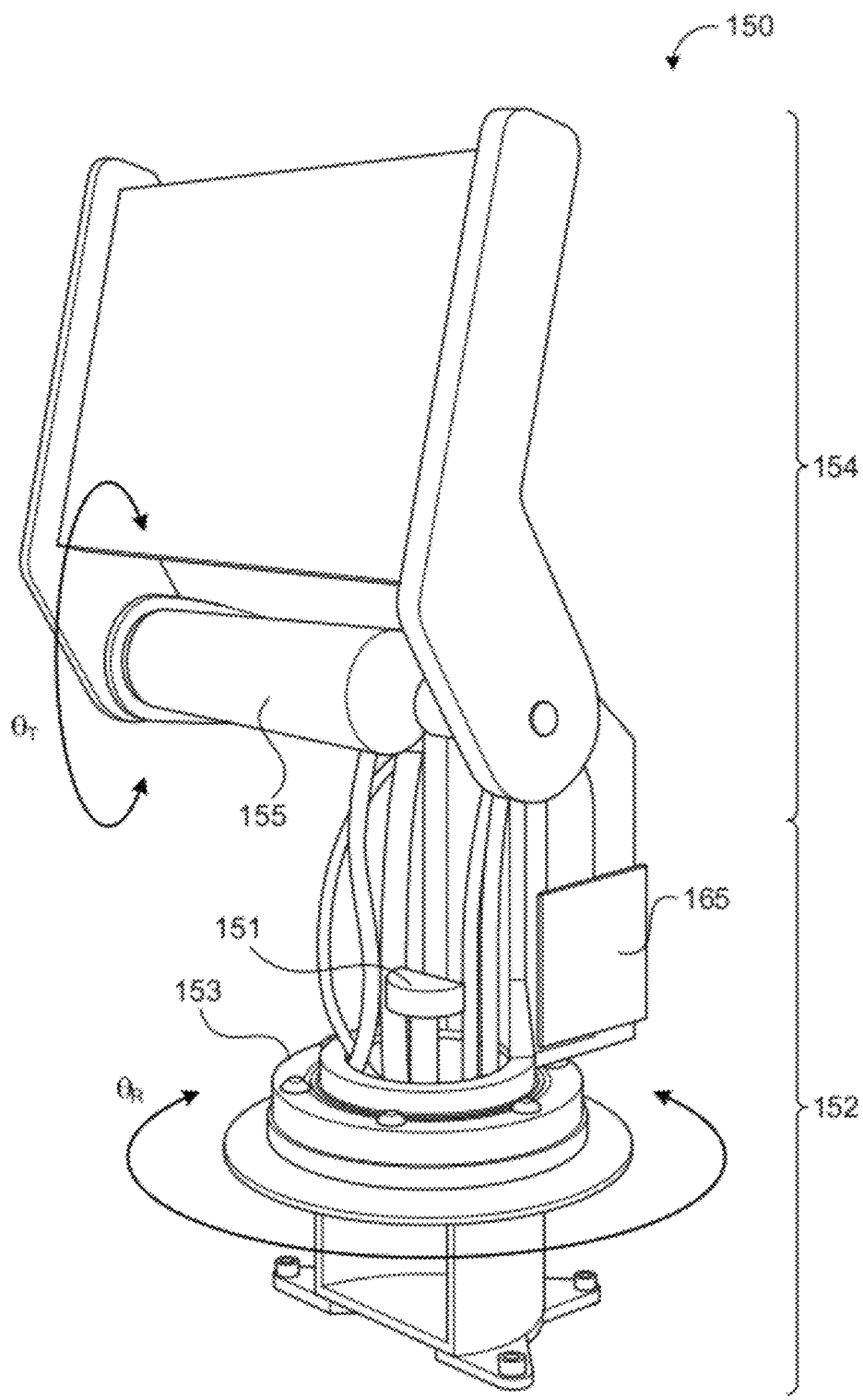
FIG. 7 is a front perspective view of an exemplary neck for a mobile human interface robot.

Referring to FIGS. 3 and 6, the leg(s) 130 support the torso 140, which may have a shoulder 142 extending over and above the base 120. In the example shown, the torso 140 has a downward facing or bottom surface 144 (e.g., toward the base) forming at least part of the shoulder 142 and an opposite upward facing or top surface 146, with a side surface 148 extending therebetween. The torso 140 may define various shapes or geometries, such as a circular or an elliptical shape having a central portion 141 supported by the leg(s) 130 and a peripheral free portion 143 that extends laterally beyond a lateral extent of the leg(s) 130, thus providing an overhanging portion that defines the downward facing surface 144. In some examples, the torso 140 defines a polygonal or other complex shape that defines a shoulder, which provides an overhanging portion that extends beyond the leg(s) 130 over the base 120.

The robot 100 may include one or more accessory ports 170 (e.g., mechanical and/or electrical interconnect points) for receiving payloads. The accessory ports 170 can be located so that received payloads do not occlude or obstruct sensors of the sensor system 400 (e.g., on the bottom and/or top surfaces 144, 146 of the torso 140, etc.). In some implementations, as shown in FIG. 6, the torso 140 includes one or more accessory ports 170 on a rearward portion 149 of the torso 140 for receiving a payload in the basket 340, for example, and so as not to obstruct sensors on a forward portion 147 of the torso 140 or other portions of the robot body 110.

Referring again to FIGS. 1-3 and 7, the torso 140 supports the neck 150, which provides panning and tilting of the head 160 with respect to the torso 140. In the examples shown, the neck 150 includes a rotator 152 and a tilter 154. The rotator 152 may provide a range of angular movement $\theta_R$ (e.g., about the Z axis) of between about 90° and about 360°. Other ranges are possible as well. Moreover, in some examples, the rotator 152 includes electrical connectors or contacts that allow continuous 360° rotation of the head 150 with respect to the torso 140 in an unlimited number of rotations while maintaining electrical communication between the head 150 and the remainder of the robot 100. The tilter 154 may include the same or similar electrical connectors or contacts allow rotation of the head 150 with respect to the torso 140 while maintaining electrical communication between the head 150 and the remainder of the robot 100. The rotator 152 may include a rotator motor 151 coupled to or engaging a ring 153 (e.g., a toothed ring rack). The tilter 154 may move the head at an angle $\theta_T$ (e.g., about the Y axis) with respect to the torso 140 independently of the rotator 152. In some examples that tilter 154 includes a tilter motor 155, which moves the head 150 between an angle $\theta_T$ of ±90° with respect to Z-axis. Other ranges are possible as well, such as ±45°, etc. The robot 100 may be configured so that the leg(s) 130, the torso 140, the neck 150, and the head 160 stay within a perimeter of the base 120 for maintaining stable mobility of the robot 100. In the exemplary circuit schematic shown in FIG. 8F, the neck 150 includes a pan-tilt assembly 151 that includes the rotator 152 and a tilter 154 along with corresponding motor drivers 156a, 156b and encoders 158a, 158b.

Figure 8A:
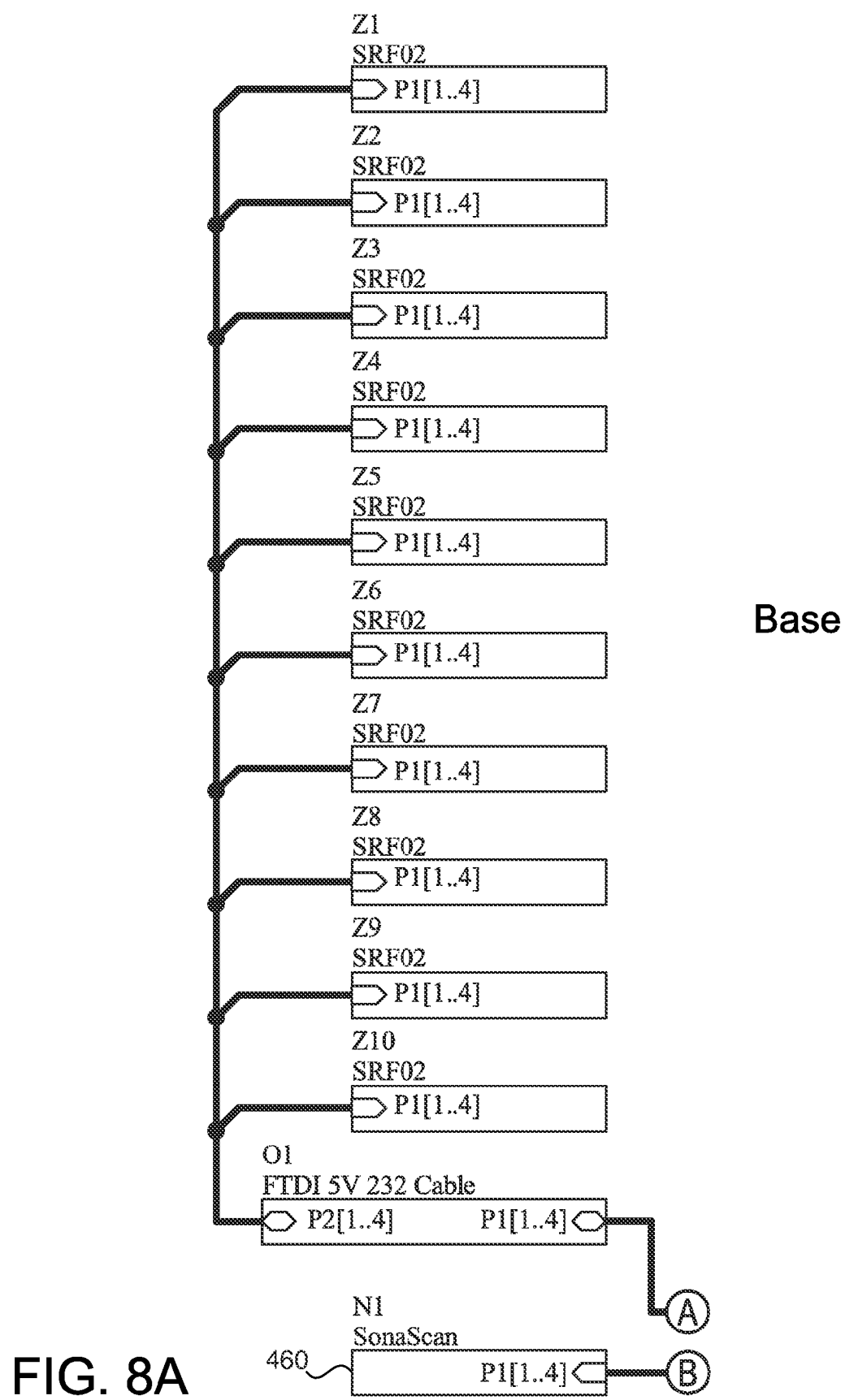
FIGS. 8A-8G are schematic views of exemplary circuitry for a mobile human interface robot.
Figure 8B:
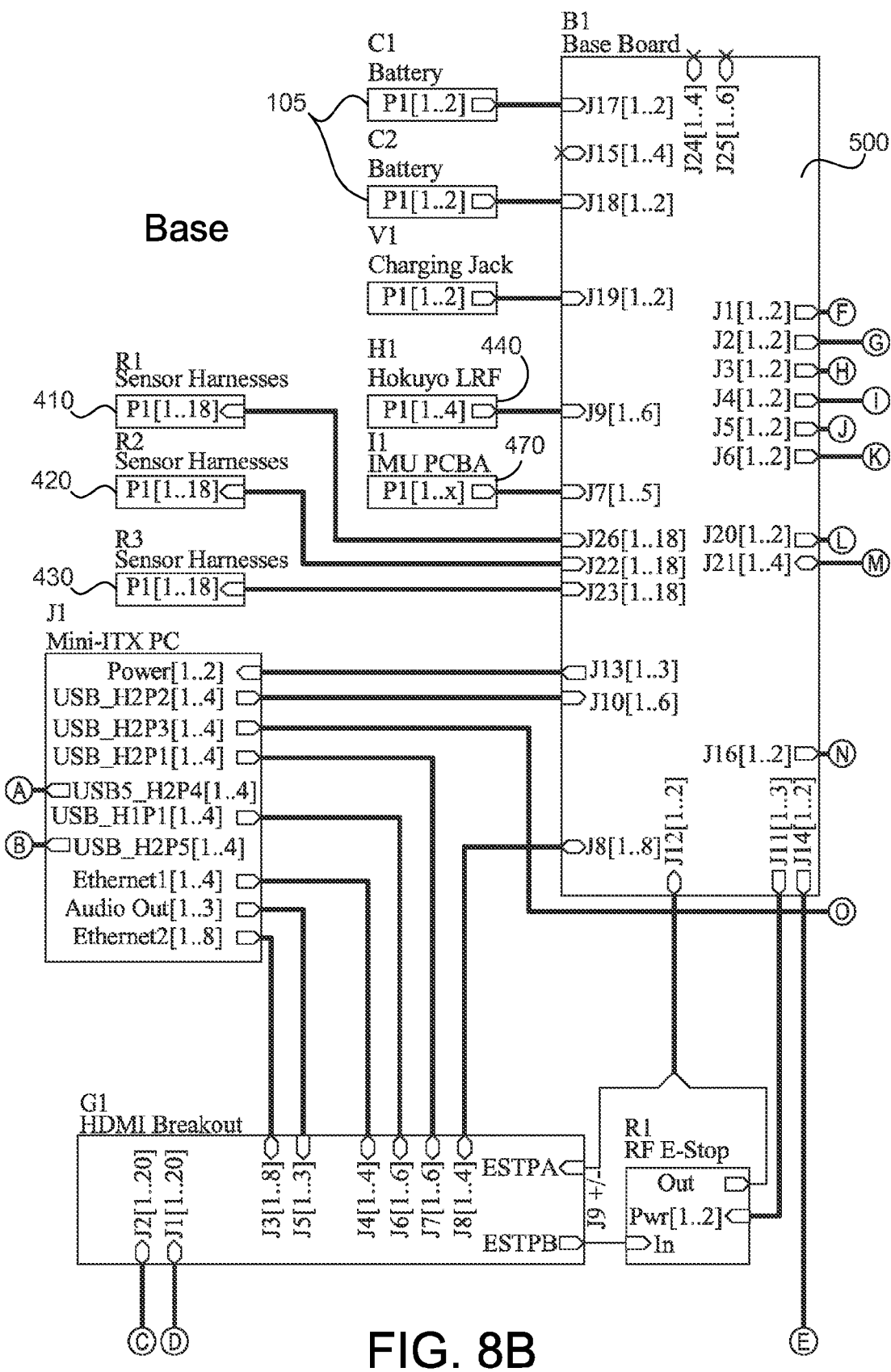
Figure 8C:
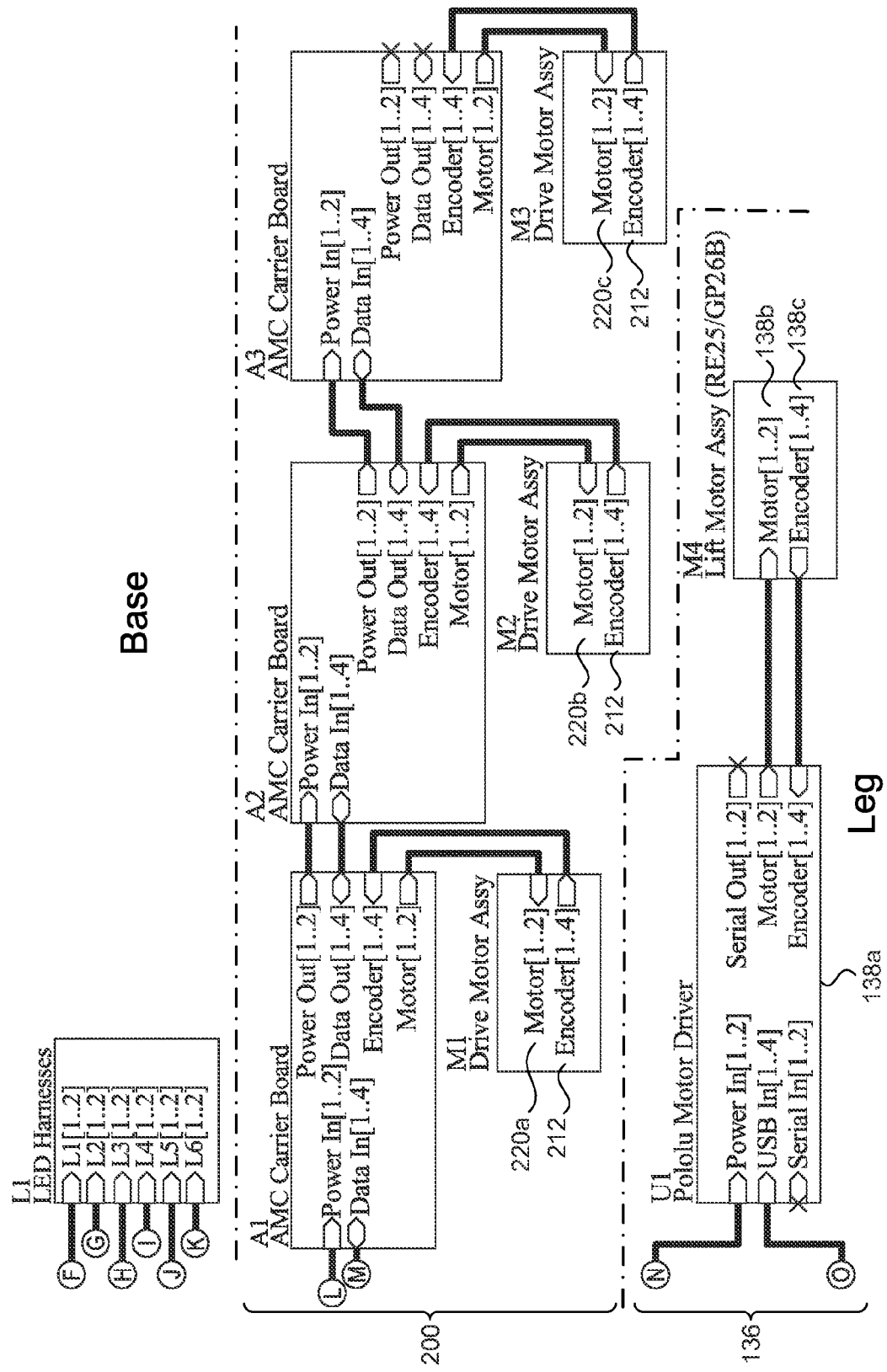
Figure 8D:
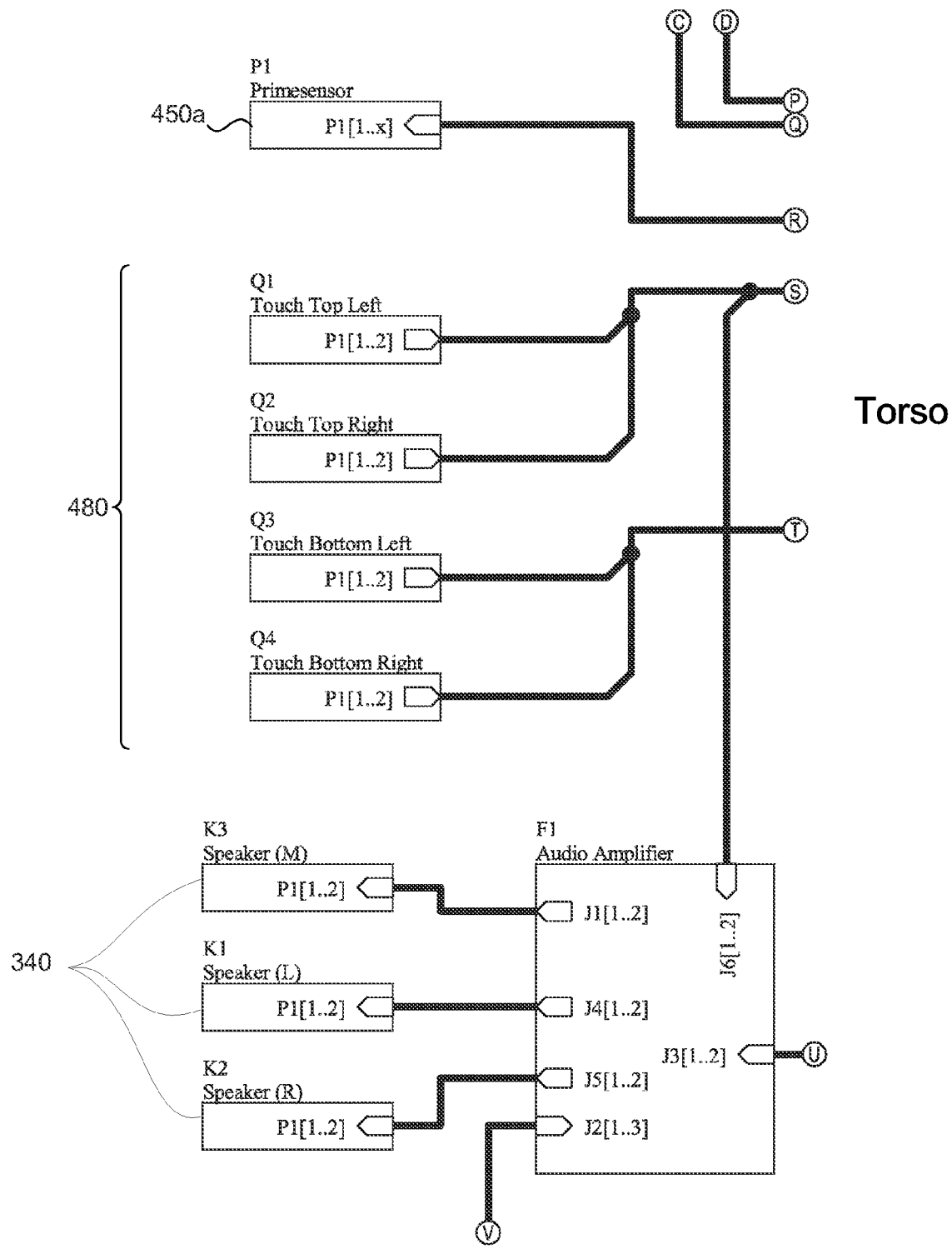
Figure 8E:
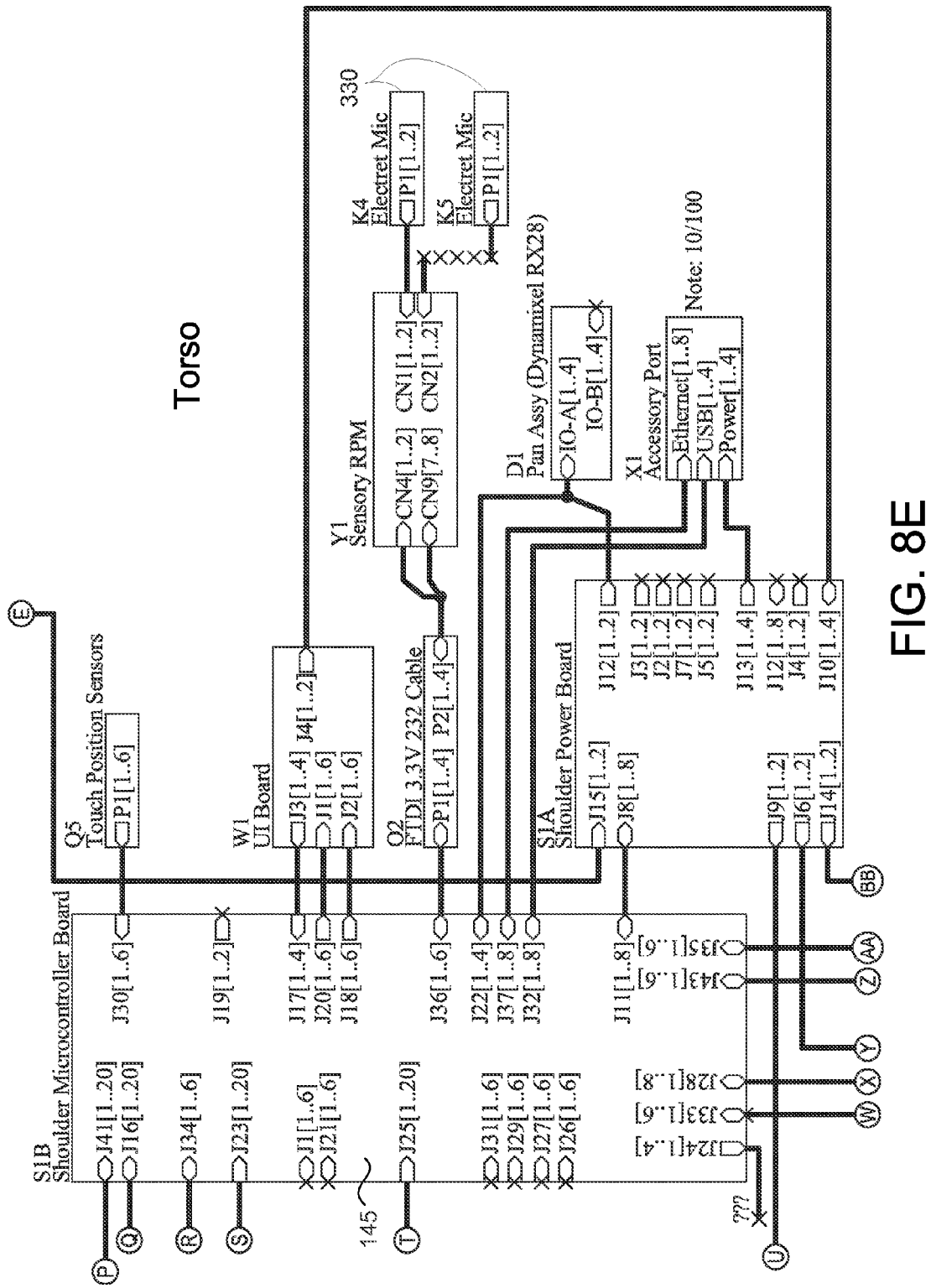
Figure 8F:
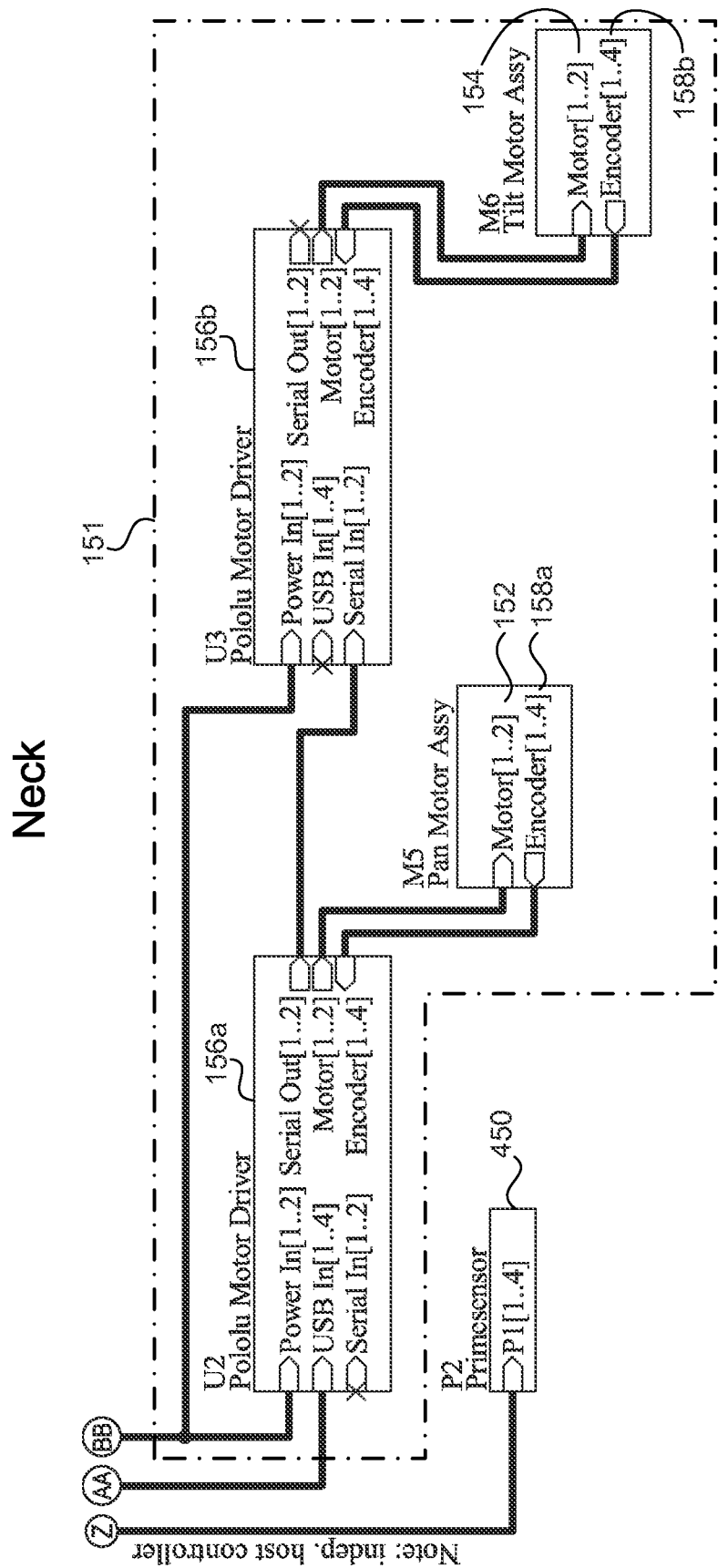
Figure 8G:
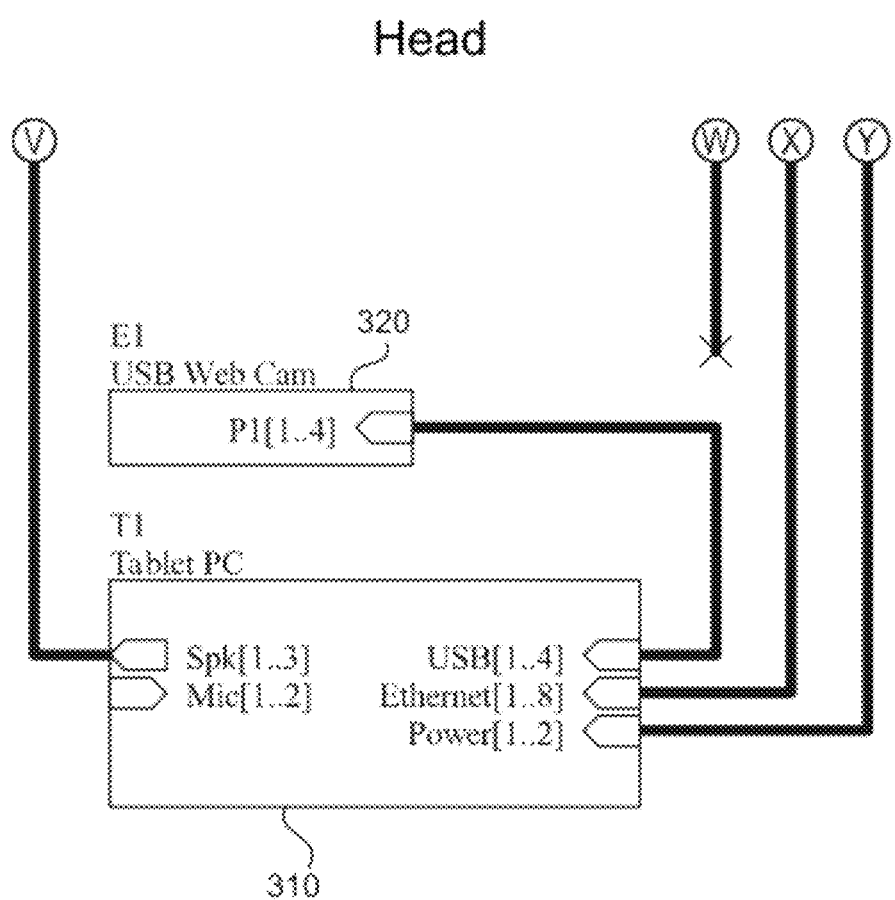
Figure 9:
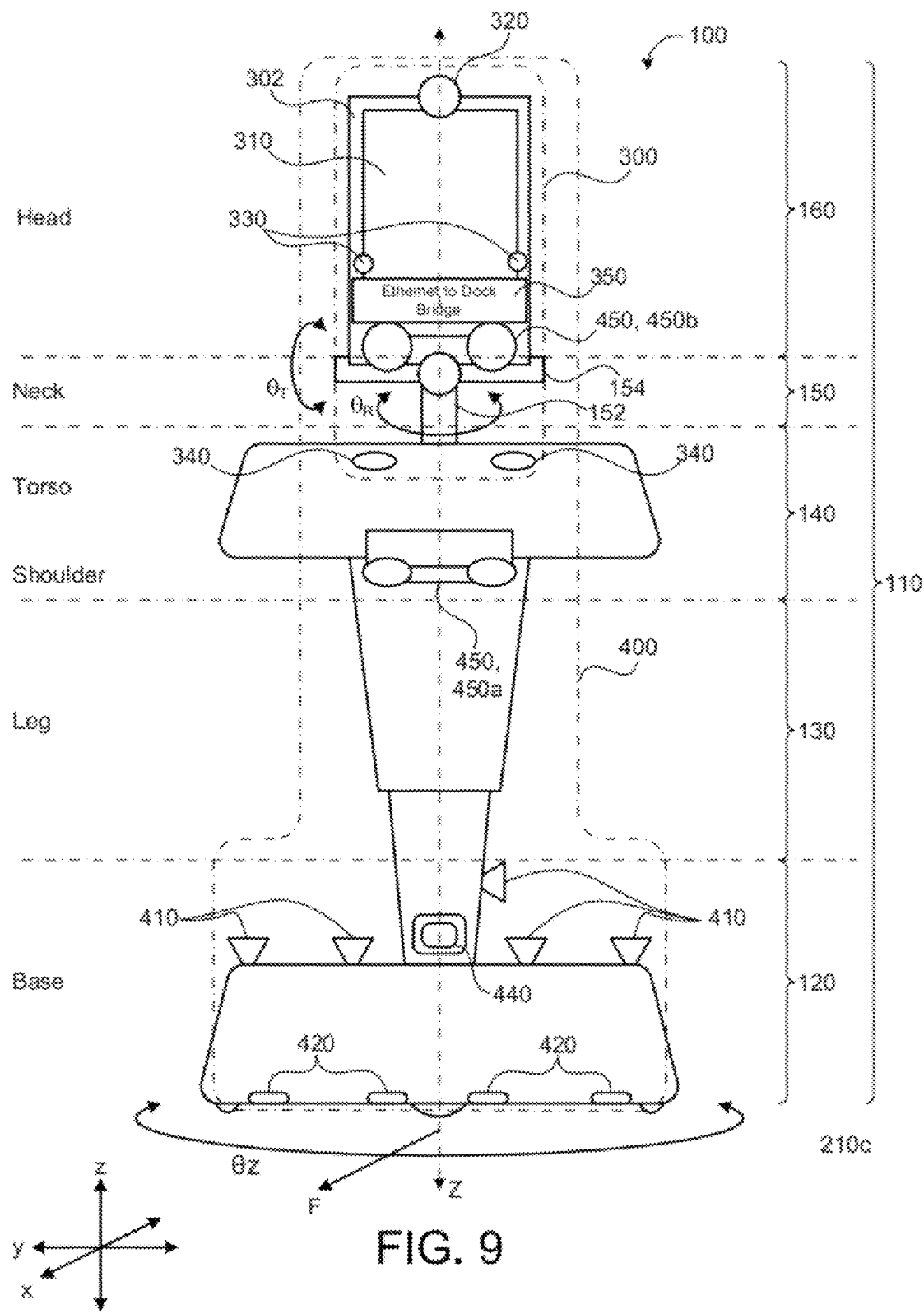
FIG. 9 is a schematic view of an exemplary mobile human interface robot.

FIGS. 8A-8G provide exemplary schematics of circuitry for the robot 100. FIGS. 8A-8C provide exemplary schematics of circuitry for the base 120, which may house the proximity sensors, such as the sonar proximity sensors 410 and the cliff proximity sensors 420, contact sensors 430, the laser scanner 440, the sonar scanner 460, and the drive system 200. The base 120 may also house the controller 500, the power source 105, and the leg actuator assembly 136. The torso 140 may house a microcontroller 145, the microphone(s) 330, the speaker(s) 340, the scanning 3-D image sensor 450a, and a torso touch sensor system 480, which allows the controller 500 to receive and respond to user contact or touches (e.g., as by moving the torso 140 with respect to the base 120, panning and/or tilting the neck 150, and/or issuing commands to the drive system 200 in response thereto). The neck 150 may house a pan-tilt assembly 151 that may include a pan motor 152 having a corresponding motor driver 156a and encoder 138a, and a tilt motor 154 152 having a corresponding motor driver 156b and encoder 138b. The head 160 may house one or more web pads 310 and a camera 320.

Referring to FIGS. 1-4C and 9, to achieve reliable and robust autonomous movement, the sensor system 400 may include several different types of sensors which can be used in conjunction with one another to create a perception of the robot's environment sufficient to allow the robot 100 to make intelligent decisions about actions to take in that environment. The sensor system 400 may include one or more types of sensors supported by the robot body 110, which may include obstacle detection obstacle avoidance (ODOA) sensors, communication sensors, navigation sensors, etc. For example, these sensors may include, but not limited to, proximity sensors, contact sensors, three-dimensional (3D) imaging/depth map sensors, a camera (e.g., visible light and/or infrared camera), sonar, radar, LIDAR (Light Detection And Ranging, which can entail optical remote sensing that measures properties of scattered light to find range and/or other information of a distant target), LADAR (Laser Detection and Ranging), etc. In some implementations, the sensor system 400 includes ranging sonar sensors 410 (e.g., nine about a perimeter of the base 120), proximity cliff detectors 420, contact sensors 430, a laser scanner 440, one or more 3-D imaging/depth sensors 450, and an imaging sonar 460.

There are several challenges involved in placing sensors on a robotic platform. First, the sensors need to be placed such that they have maximum coverage of areas of interest around the robot 100. Second, the sensors may need to be placed in such a way that the robot 100 itself causes an absolute minimum of occlusion to the sensors; in essence, the sensors cannot be placed such that they are "blinded" by the robot itself. Third, the placement and mounting of the sensors should not be intrusive to the rest of the industrial design of the platform. In terms of aesthetics, it can be assumed that a robot with sensors mounted inconspicuously is more "attractive" than otherwise. In terms of utility, sensors should be mounted in a manner so as not to interfere with normal robot operation (snagging on obstacles, etc.).

In some implementations, the sensor system 400 includes a set or an array of proximity sensors 410, 420 in communication with the controller 500 and arranged in one or more zones or portions of the robot 100 (e.g., disposed on or near the base body portion 124a, 124b, 124c of the robot body 110) for detecting any nearby or intruding obstacles. The proximity sensors 410, 420 may be converging infrared (IR) emitter-sensor elements, sonar sensors, ultrasonic sensors, and/or imaging sensors (e.g., 3D depth map image sensors) that provide a signal to the controller 500 when an object is within a given range of the robot 100.

Figure 4A:
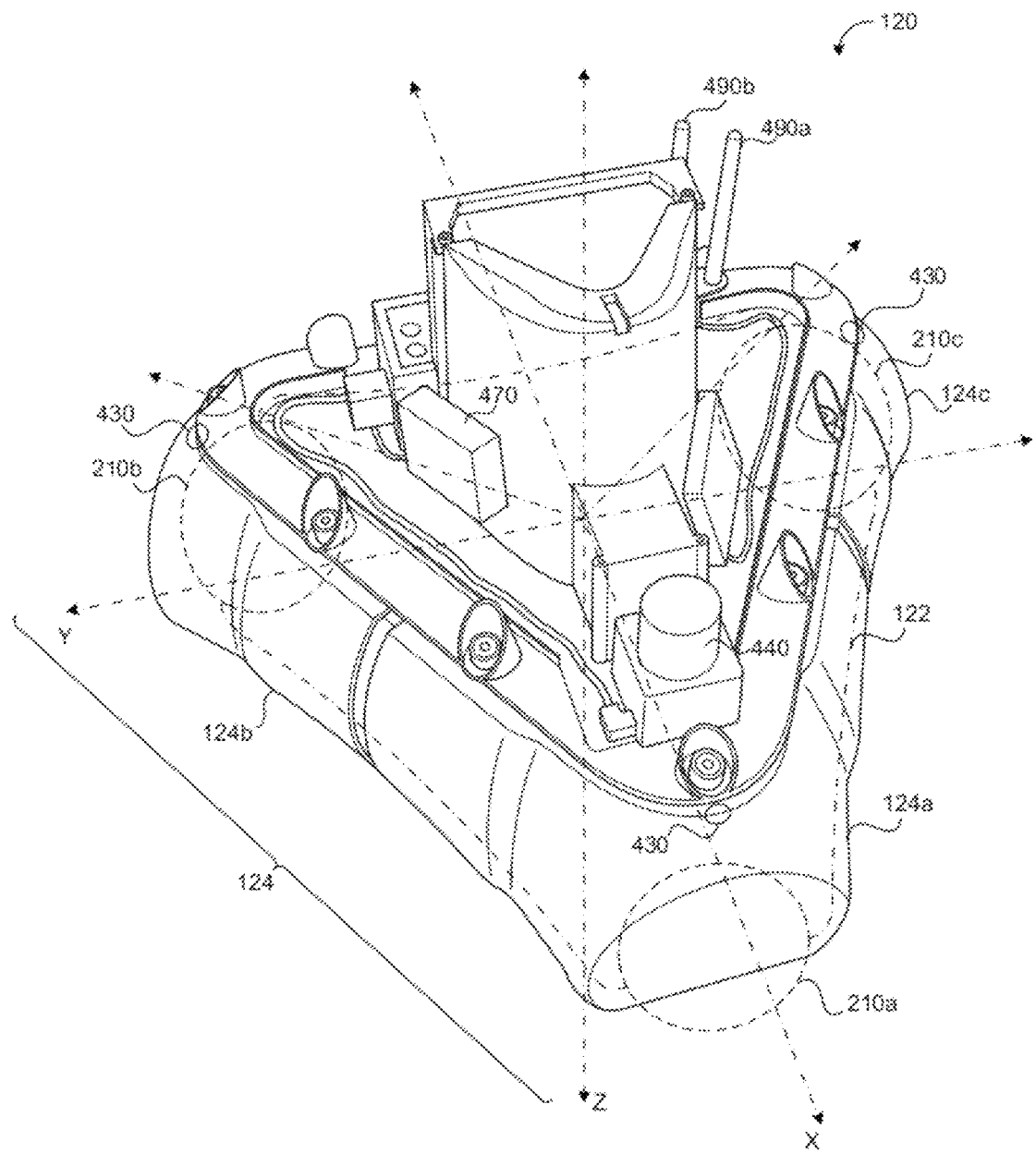
FIG. 4A is a front perspective view of an exemplary base for a mobile human interface robot.
Figure 4B:
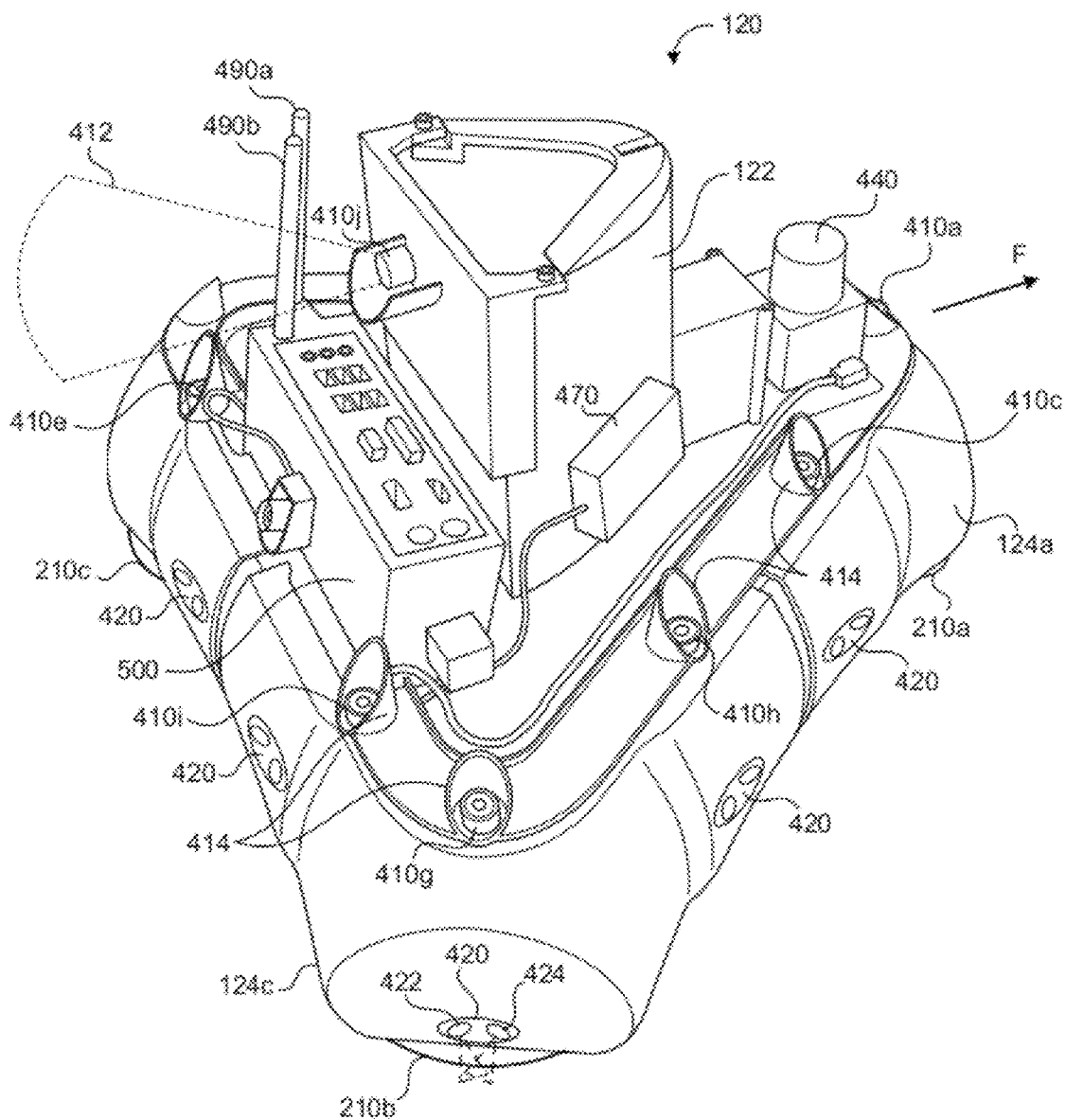
FIG. 4B is a rear perspective view of the base shown in FIG. 4A.
Figure 4C:
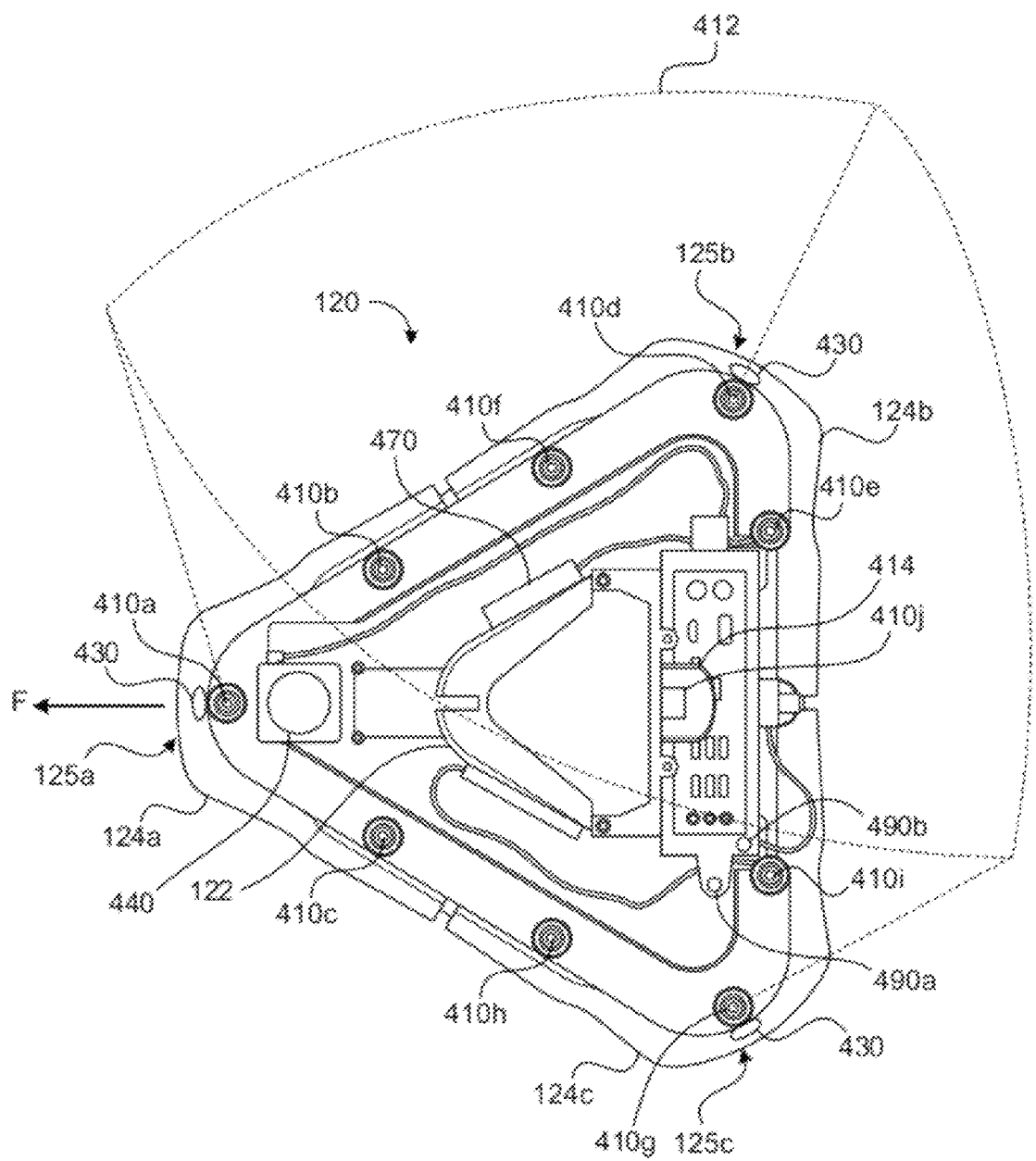
FIG. 4C is a top view of the base shown in FIG. 4A.

In the example shown in FIGS. 4A-4C, the robot 100 includes an array of sonar-type proximity sensors 410 disposed (e.g., substantially equidistant) around the base body 120 and arranged with an upward field of view. First, second, and third sonar proximity sensors 410a, 410b, 410c are disposed on or near the first (forward) base body portion 124a, with at least one of the sonar proximity sensors near a radially outer-most edge 125a of the first base body 124a. Fourth, fifth, and sixth sonar proximity sensors 410d, 410e, 410f are disposed on or near the second (right) base body portion 124b, with at least one of the sonar proximity sensors near a radially outer-most edge 125b of the second base body 124b. Seventh, eighth, and ninth sonar proximity sensors 410g, 410h, 410i are disposed on or near the third (right) base body portion 124c, with at least one of the sonar proximity sensors near a radially outer-most edge 125c of the third base body 124c. This configuration provides at least three zones of detection.

In some examples, the set of sonar proximity sensors 410 (e.g., 410a-410i) disposed around the base body 120 are arranged to point upward (e.g., substantially in the Z direction) and optionally angled outward away from the Z axis, thus creating a detection curtain 412 around the robot 100. Each sonar proximity sensor 410a-410i may have a shroud or emission guide 414 that guides the sonar emission upward or at least not toward the other portions of the robot body 110 (e.g., so as not to detect movement of the robot body 110 with respect to itself). The emission guide 414 may define a shell or half shell shape. In the example shown, the base body 120 extends laterally beyond the leg 130, and the sonar proximity sensors 410 (e.g., 410a-410i) are disposed on the base body 120 (e.g., substantially along a perimeter of the base body 120) around the leg 130. Moreover, the upward pointing sonar proximity sensors 410 are spaced to create a continuous or substantially continuous sonar detection curtain 412 around the leg 130. The sonar detection curtain 412 can be used to detect obstacles having elevated lateral protruding portions, such as table tops, shelves, etc.

The upward looking sonar proximity sensors 410 provide the ability to see objects that are primarily in the horizontal plane, such as table tops. These objects, due to their aspect ratio, may be missed by other sensors of the sensor system, such as the laser scanner 440 or imaging sensors 450, and as such, can pose a problem to the robot 100. The upward viewing sonar proximity sensors 410 arranged around the perimeter of the base 120 provide a means for seeing or detecting those type of objects/obstacles. Moreover, the sonar proximity sensors 410 can be placed around the widest points of the base perimeter and angled slightly outwards, so as not to be occluded or obstructed by the torso 140 or head 160 of the robot 100, thus not resulting in false positives for sensing portions of the robot 100 itself. In some implementations, the sonar proximity sensors 410 are arranged (upward and outward) to leave a volume about the torso 140 outside of a field of view of the sonar proximity sensors 410 and thus free to receive mounted payloads or accessories, such as the basket 340. The sonar proximity sensors 410 can be recessed into the base body 124 to provide visual concealment and no external features to snag on or hit obstacles.

The sensor system 400 may include or more sonar proximity sensors 410 (e.g., a rear proximity sensor 410$j$) directed rearward (e.g., opposite to the forward drive direction F) for detecting obstacles while backing up. The rear sonar proximity sensor 410$j$ may include an emission guide 414 to direct its sonar detection field 412. Moreover, the rear sonar proximity sensor 410$j$ can be used for ranging to determine a distance between the robot 100 and a detected object in the field of view of the rear sonar proximity sensor 410$j$ (e.g., as "back-up alert"). In some examples, the rear sonar proximity sensor 410$j$ is mounted recessed within the base body 120 so as to not provide any visual or functional irregularity in the housing form.

Referring to FIGS. 3 and 4B, in some implementations, the robot 100 includes cliff proximity sensors 420 arranged near or about the drive wheels 210$a$, 210$b$, 210$c$, so as to allow cliff detection before the drive wheels 210$a$, 210$b$, 210$c$ encounter a cliff (e.g., stairs). For example, a cliff proximity sensors 420 can be located at or near each of the radially outer-most edges 125$a$-$c$ of the base bodies 124$a$-$c$ and in locations therebetween. In some cases, cliff sensing is implemented using infrared (IR) proximity or actual range sensing, using an infrared emitter 422 and an infrared detector 424 angled toward each other so as to have an overlapping emission and detection fields, and hence a detection zone, at a location where a floor should be expected. IR proximity sensing can have a relatively narrow field of view, may depend on surface albedo for reliability, and can have varying range accuracy from surface to surface. As a result, multiple discrete sensors can be placed about the perimeter of the robot 100 to adequately detect cliffs from multiple points on the robot 100. Moreover, IR proximity based sensors typically cannot discriminate between a cliff and a safe event, such as just after the robot 100 climbs a threshold.

The cliff proximity sensors 420 can detect when the robot 100 has encountered a falling edge of the floor, such as when it encounters a set of stairs. The controller 500 (executing a control system) may execute behaviors that cause the robot 100 to take an action, such as changing its direction of travel, when an edge is detected. In some implementations, the sensor system 400 includes one or more secondary cliff sensors (e.g., other sensors configured for cliff sensing and optionally other types of sensing). The cliff detecting proximity sensors 420 can be arranged to provide early detection of cliffs, provide data for discriminating between actual cliffs and safe events (such as climbing over thresholds), and be positioned down and out so that their field of view includes at least part of the robot body 110 and an area away from the robot body 110. In some implementations, the controller 500 executes cliff detection routine that identifies and detects an edge of the supporting work surface (e.g., floor), an increase in distance past the edge of the work surface, and/or an increase in distance between the robot body 110 and the work surface. This implementation allows: 1) early detection of potential cliffs (which may allow faster mobility speeds in unknown environments); 2) increased reliability of autonomous mobility since the controller 500 receives cliff imaging information from the cliff detecting proximity sensors 420 to know if a cliff event is truly unsafe or if it can be safely traversed (e.g., such as climbing up and over a threshold); 3) a reduction in false positives of cliffs (e.g., due to the use of edge detection versus the multiple discrete IR proximity sensors with a narrow field of view). Additional sensors arranged as "wheel drop" sensors can be used for redundancy and for detecting situations where a range-sensing camera cannot reliably detect a certain type of cliff.

Threshold and step detection allows the robot 100 to effectively plan for either traversing a climb-able threshold or avoiding a step that is too tall. This can be the same for random objects on the work surface that the robot 100 may or may not be able to safely traverse. For those obstacles or thresholds that the robot 100 determines it can climb, knowing their heights allows the robot 100 to slow down appropriately, if deemed needed, to allow for a smooth transition in order to maximize smoothness and minimize any instability due to sudden accelerations. In some implementations, threshold and step detection is based on object height above the work surface along with geometry recognition (e.g., discerning between a threshold or an electrical cable versus a blob, such as a sock). Thresholds may be recognized by edge detection. The controller 500 may receive imaging data from the cliff detecting proximity sensors 420 (or another imaging sensor on the robot 100), execute an edge detection routine, and issue a drive command based on results of the edge detection routine. The controller 500 may use pattern recognition to identify objects as well. Threshold detection allows the robot 100 to change its orientation with respect to the threshold to maximize smooth step climbing ability.

The proximity sensors 410, 420 may function alone, or as an alternative, may function in combination with one or more contact sensors 430 (e.g., bump switches) for redundancy. For example, one or more contact or bump sensors 430 on the robot body 110 can detect if the robot 100 physically encounters an obstacle. Such sensors may use a physical property such as capacitance or physical displacement within the robot 100 to determine when it has encountered an obstacle. In some implementations, each base body portion 124$a$, 124$b$, 124$c$ of the base 120 has an associated contact sensor 430 (e.g., capacitive sensor, read switch, etc.) that detects movement of the corresponding base body portion 124$a$, 124$b$, 124$c$ with respect to the base chassis 122 (see e.g., FIG. 4A). For example, each base body 124$a$-$c$ may move radially with respect to the Z axis of the base chassis 122, so as to provide 3-way bump detection.

Referring to FIGS. 1-4C, 9 and 10A, in some implementations, the sensor system 400 includes a laser scanner 440 mounted on a forward portion of the robot body 110 and in communication with the controller 500. In the examples shown, the laser scanner 440 is mounted on the base body 120 facing forward (e.g., having a field of view along the forward drive direction F) on or above the first base body 124a (e.g., to have maximum imaging coverage along the drive direction F of the robot). Moreover, the placement of the laser scanner on or near the front tip of the triangular base 120 means that the external angle of the robotic base (e.g., 300 degrees) is greater than a field of view 442 of the laser scanner 440 (e.g., ~285 degrees), thus preventing the base 120 from occluding or obstructing the detection field of view 442 of the laser scanner 440. The laser scanner 440 can be mounted recessed within the base body 124 as much as possible without occluding its fields of view, to minimize any portion of the laser scanner sticking out past the base body 124 (e.g., for aesthetics and to minimize snagging on obstacles).

The laser scanner 440 scans an area about the robot 100 and the controller 500, using signals received from the laser scanner 440, creates an environment map or object map of the scanned area. The controller 500 may use the object map for navigation, obstacle detection, and obstacle avoidance. Moreover, the controller 500 may use sensory inputs from other sensors of the sensor system 400 for creating object map and/or for navigation.

In some examples, the laser scanner 440 is a scanning LIDAR, which may use a laser that quickly scans an area in one dimension, as a "main" scan line, and a time-of-flight imaging element that uses a phase difference or similar technique to assign a depth to each pixel generated in the line (returning a two dimensional depth line in the plane of scanning). In order to generate a three dimensional map, the LIDAR can perform an "auxiliary" scan in a second direction (for example, by "nodding" the scanner). This mechanical scanning technique can be complemented, if not supplemented, by technologies such as the "Flash" LIDAR/LADAR and "Swiss Ranger" type focal plane imaging element sensors, techniques which use semiconductor stacks to permit time of flight calculations for a full 2-D matrix of pixels to provide a depth at each pixel, or even a series of depths at each pixel (with an encoded illuminator or illuminating laser).

The sensor system 400 may include one or more three-dimensional (3-D) image sensors 450 in communication with the controller 500. If the 3-D image sensor 450 has a limited field of view, the controller 500 or the sensor system 400 can actuate the 3-D image sensor 450a in a side-to-side scanning manner to create a relatively wider field of view to perform robust ODOA.

Referring again to FIGS. 2 and 4A-4C, the sensor system 400 may include an inertial measurement unit (IMU) 470 in communication with the controller 500 to measure and monitor a moment of inertia of the robot 100 with respect to the overall center of gravity $CG_R$ of the robot 100.

The controller 500 may monitor any deviation in feedback from the IMU 470 from a threshold signal corresponding to normal unencumbered operation. For example, if the robot begins to pitch away from an upright position, it may be "clothes lined" or otherwise impeded, or someone may have suddenly added a heavy payload. In these instances, it may be necessary to take urgent action (including, but not limited to, evasive maneuvers, recalibration, and/or issuing an audio/visual warning) in order to assure safe operation of the robot 100.

Since robot 100 may operate in a human environment, it may interact with humans and operate in spaces designed for humans (and without regard for robot constraints). The robot 100 can limit its drive speeds and accelerations when in a congested, constrained, or highly dynamic environment, such as at a cocktail party or busy hospital. However, the robot 100 may encounter situations where it is safe to drive relatively fast, as in a long empty corridor, but yet be able to decelerate suddenly, as when something crosses the robots' motion path.

When accelerating from a stop, the controller 500 may take into account a moment of inertia of the robot 100 from its overall center of gravity $CG_R$ to prevent robot tipping. The controller 500 may use a model of its pose, including its current moment of inertia. When payloads are supported, the controller 500 may measure a load impact on the overall center of gravity $CG_R$ and monitor movement of the robot moment of inertia.

For example, the torso 140 and/or neck 150 may include strain gauges to measure strain. If this is not possible, the controller 500 may apply a test torque command to the drive wheels 210 and measure actual linear and angular acceleration of the robot using the IMU 470, in order to experimentally determine safe limits.

During a sudden deceleration, a commanded load on the second and third drive wheels 210b, 210c (the rear wheels) is reduced, while the first drive wheel 210a (the front wheel) slips in the forward drive direction and supports the robot 100. If the loading of the second and third drive wheels 210b, 210c (the rear wheels) is asymmetrical, the robot 100 may "yaw" which will reduce dynamic stability. The IMU 470 (e.g., a gyro) can be used to detect this yaw and command the second and third drive wheels 210b, 210c to reorient the robot 100.

Referring to FIGS. 1-3, 9 and 10A, in some implementations, the robot 100 includes a scanning 3-D image sensor 450a mounted on a forward portion of the robot body 110 with a field of view along the forward drive direction F (e.g., to have maximum imaging coverage along the drive direction F of the robot). The scanning 3-D image sensor 450a can be used primarily for obstacle detection/obstacle avoidance (ODOA). In the example shown, the scanning 3-D image sensor 450a is mounted on the torso 140 underneath the shoulder 142 or on the bottom surface 144 and recessed within the torso 140 (e.g., flush or past the bottom surface 144), as shown in FIG. 3, for example, to prevent user contact with the scanning 3-D image sensor 450a. The scanning 3-D image sensor 450 can be arranged to aim substantially downward and away from the robot body 110, so as to have a downward field of view 452 in front of the robot 100 for obstacle detection and obstacle avoidance (ODOA) (e.g., with obstruction by the base 120 or other portions of the robot body 110). Placement of the scanning 3-D image sensor 450a on or near a forward edge of the torso 140 allows the field of view of the 3-D image sensor 450 (e.g., ~285 degrees) to be less than an external surface angle of the torso 140 (e.g., 300 degrees) with respect to the 3-D image sensor 450, thus preventing the torso 140 from occluding or obstructing the detection field of view 452 of the scanning 3-D image sensor 450a. Moreover, the scanning 3-D image sensor 450a (and associated actuator) can be mounted recessed within the torso 140 as much as possible without occluding its fields of view (e.g., also for aesthetics and to minimize snagging on obstacles). The distracting scanning motion of the scanning 3-D image sensor 450a is not visible to a user, creating a less distracting interaction experience. Unlike a protruding sensor or feature, the recessed scanning 3-D image sensor 450a will not tend to have unintended interactions with the environment (snagging on people, obstacles, etc.), especially when moving or scanning, as virtually no moving part extends beyond the envelope of the torso 140.

In some implementations, the sensor system 400 includes additional 3-D image sensors 450 disposed on the base body 120, the leg 130, the neck 150, and/or the head 160. In the example shown in FIG. 1, the robot 100 includes 3-D image sensors 450 on the base body 120, the torso 140, and the head 160. In the example shown in FIG. 2, the robot 100 includes 3-D image sensors 450 on the base body 120, the torso 140, and the head 160. In the example shown in FIG. 9, the robot 100 includes 3-D image sensors 450 on the leg 130, the torso 140, and the neck 150. Other configurations are possible as well. One 3-D image sensor 450 (e.g., on the neck 150 and over the head 160) can be used for people recognition, gesture recognition, and/or videoconferencing, while another 3-D image sensor 450 (e.g., on the base 120 and/or the leg 130) can be used for navigation and/or obstacle detection and obstacle avoidance.

A forward facing 3-D image sensor 450 disposed on the neck 150 and/or the head 160 can be used for person, face, and/or gesture recognition of people about the robot 100. For example, using signal inputs from the 3-D image sensor 450 on the head 160, the controller 500 may recognize a user by creating a three-dimensional map of the viewed/captured user's face and comparing the created three-dimensional map with known 3-D images of people's faces and determining a match with one of the known 3-D facial images. Facial recognition may be used for validating users as allowable users of the robot 100. Moreover, one or more of the 3-D image sensors 450 can be used for determining gestures of person viewed by the robot 100, and optionally reacting based on the determined gesture(s) (e.g., hand pointing, waving, and or hand signals). For example, the controller 500 may issue a drive command in response to a recognized hand point in a particular direction.

Figure 10A:
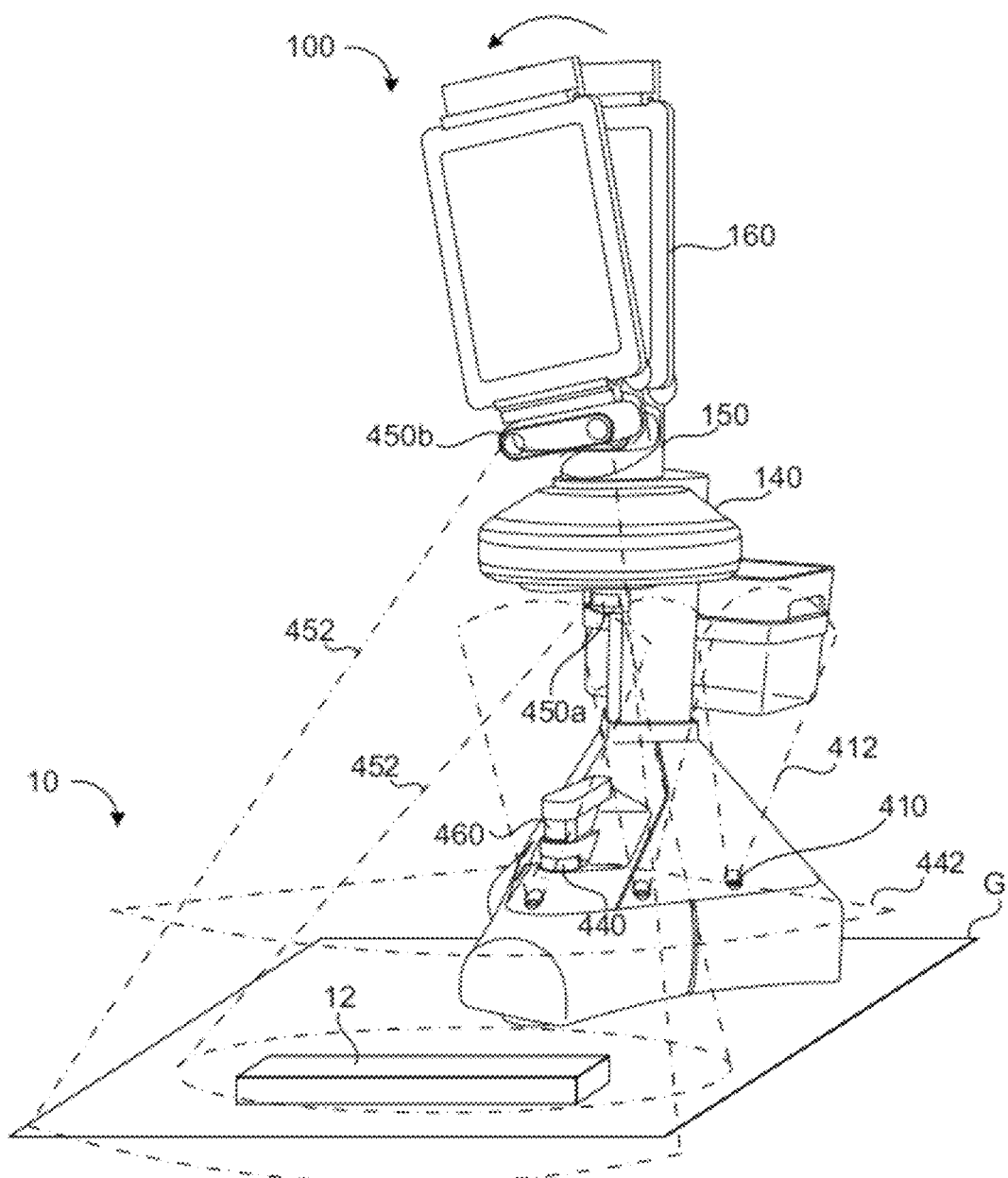
FIG. 10A is a perspective view of an exemplary mobile human interface robot having multiple sensors pointed toward the ground.
Figure 10B:
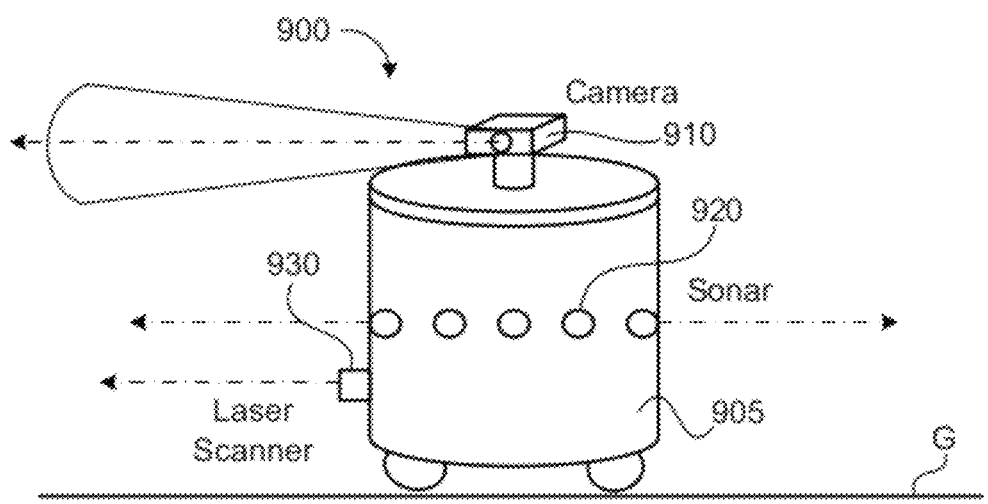
FIG. 10B is a perspective view of an exemplary mobile robot having multiple sensors pointed parallel with the ground.

FIG. 10B provides a schematic view of a robot 900 having a camera 910, sonar sensors 920, and a laser range finder 930 all mounted on a robot body 905 and each having a field of view parallel or substantially parallel to the ground G. This arrangement allows detection of objects at a distance. In the example, a laser range finder 930 detects objects close to the ground G, a ring of ultrasonic sensors (sonars) 920 detect objects further above the ground G, and the camera 910 captures a large portion of the scene from a high vantage point. The key feature of this design is that the sensors 910, 920, 930 are all oriented parallel to the ground G. One advantage of this arrangement is that computation can be simplified, in the sense that a distance to an object determined by the using one or more of the sensors 910, 920, 930 is also the distance the robot 900 can travel before it contacts an object in a corresponding given direction. A drawback of this arrangement is that to get good coverage of the robot's surroundings, many levels of sensing are needed. This can be prohibitive from a cost or computation perspective, which often leads to large gaps in a sensory field of view of all the sensors 910, 920, 930 of the robot 900.

In some implementations, the robot includes a sonar scanner 460 for acoustic imaging of an area surrounding the robot 100. In the examples shown in FIGS. 1 and 3, the sonar scanner 460 is disposed on a forward portion of the base body 120.

Referring to FIGS. 1, 3B and 10A, in some implementations, the robot 100 uses the laser scanner or laser range finder 440 for redundant sensing, as well as a rear-facing sonar proximity sensor 410j for safety, both of which are oriented parallel to the ground G. The robot 100 may include first and second 3-D image sensors 450a, 450b (depth cameras) to provide robust sensing of the environment around the robot 100. The first 3-D image sensor 450a is mounted on the torso 140 and pointed downward at a fixed angle to the ground G. By angling the first 3-D image sensor 450a downward, the robot 100 receives dense sensor coverage in an area immediately forward or adjacent to the robot 100, which is relevant for short-term travel of the robot 100 in the forward direction. The rear-facing sonar 410j provides object detection when the robot travels backward. If backward travel is typical for the robot 100, the robot 100 may include a third 3D image sensor 450 facing downward and backward to provide dense sensor coverage in an area immediately rearward or adjacent to the robot 100.

The second 3-D image sensor 450b is mounted on the head 160, which can pan and tilt via the neck 150. The second 3-D image sensor 450b can be useful for remote driving since it allows a human operator to see where the robot 100 is going. The neck 150 enables the operator tilt and/or pan the second 3-D image sensor 450b to see both close and distant objects. Panning the second 3-D image sensor 450b increases an associated horizontal field of view. During fast travel, the robot 100 may tilt the second 3-D image sensor 450b downward slightly to increase a total or combined field of view of both 3-D image sensors 450a, 450b, and to give sufficient time for the robot 100 to avoid an obstacle (since higher speeds generally mean less time to react to obstacles). At slower speeds, the robot 100 may tilt the second 3-D image sensor 450b upward or substantially parallel to the ground G to track a person that the robot 100 is meant to follow. Moreover, while driving at relatively low speeds, the robot 100 can pan the second 3-D image sensor 450b to increase its field of view around the robot 100. The first 3-D image sensor 450a can stay fixed (e.g., not moved with respect to the base 120) when the robot is driving to expand the robot's perceptual range.

The 3-D image sensors 450 may be capable of producing the following types of data: (i) a depth map, (ii) a reflectivity based intensity image, and/or (iii) a regular intensity image. The 3-D image sensors 450 may obtain such data by image pattern matching, measuring the flight time and/or phase delay shift for light emitted from a source and reflected off of a target.

In some implementations, reasoning or control software, executable on a processor (e.g., of the robot controller 500), uses a combination of algorithms executed using various data types generated by the sensor system 400. The reasoning software processes the data collected from the sensor system 400 and outputs data for making navigational decisions on where the robot 100 can move without colliding with an obstacle, for example. By accumulating imaging data over time of the robot's surroundings, the reasoning software can in turn apply effective methods to selected segments of the sensed image(s) to improve depth measurements of the 3-D image sensors 450. This may include using appropriate temporal and spatial averaging techniques.

The reliability of executing robot collision free moves may be based on: (i) a confidence level built by high level reasoning over time and (ii) a depth-perceptive sensor that accumulates three major types of data for analysis—(a) a depth image, (b) an active illumination image and (c) an ambient illumination image. Algorithms cognizant of the different types of data can be executed on each of the images obtained by the depth-perceptive imaging sensor 450. The aggregate data may improve the confidence level a compared to a system using only one of the kinds of data.

The 3-D image sensors 450 may obtain images containing depth and brightness data from a scene about the robot 100 (e.g., a sensor view portion of a room or work area) that contains one or more objects. The controller 500 may be configured to determine occupancy data for the object based on the captured reflected light from the scene. Moreover, the controller 500, in some examples, issues a drive command to the drive system 200 based at least in part on the occupancy data to circumnavigate obstacles (i.e., the object in the scene). The 3-D image sensors 450 may repeatedly capture scene depth images for real-time decision making by the controller 500 to navigate the robot 100 about the scene without colliding into any objects in the scene. For example, the speed or frequency in which the depth image data is obtained by the 3-D image sensors 450 may be controlled by a shutter speed of the 3-D image sensors 450. In addition, the controller 500 may receive an event trigger (e.g., from another sensor component of the sensor system 400, such as proximity sensor 410, 420, notifying the controller 500 of a nearby object or hazard. The controller 500, in response to the event trigger, can cause the 3-D image sensors 450 to increase a frequency at which depth images are captured and occupancy information is obtained.

Figure 11:
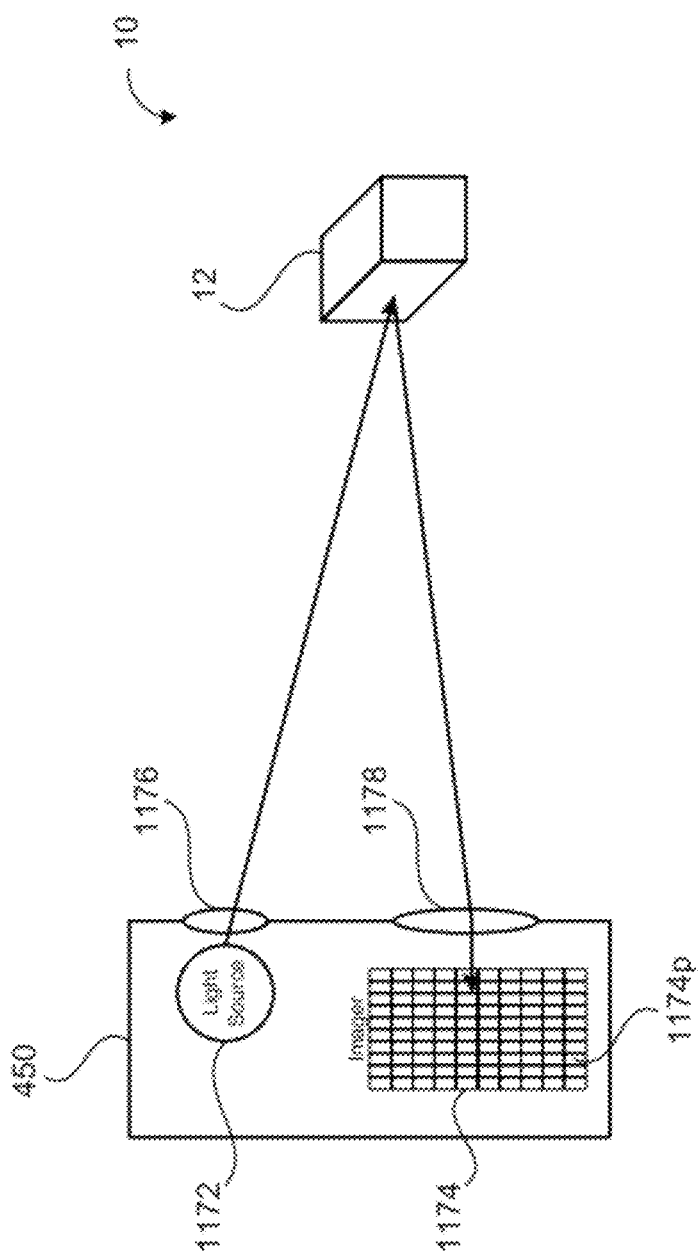
FIG. 11 is a schematic view of an exemplary imaging sensor sensing an object in a scene.

Referring to FIG. 11, in some implementations, the 3-D imaging sensor 450 includes a light source 1172 that emits light onto a scene 10, such as the area around the robot 100 (e.g., a room). The imaging sensor 450 may also include an imager 1174 (e.g., an array of light-sensitive pixels 1174p) which captures reflected light from the scene 10, including reflected light that originated from the light source 1172 (e.g., as a scene depth image). In some examples, the imaging sensor 450 includes a light source lens 1176 and/or a detector lens 1178 for manipulating (e.g., speckling or focusing) the emitted and received reflected light, respectively. The robot controller 500 or a sensor controller (not shown) in communication with the robot controller 500 receives light signals from the imager 1174 (e.g., the pixels 1174p) to determine depth information for an object 12 in the scene 10 based on image pattern matching and/or a time-of-flight characteristic of the reflected light captured by the imager 1174.

Figure 12:
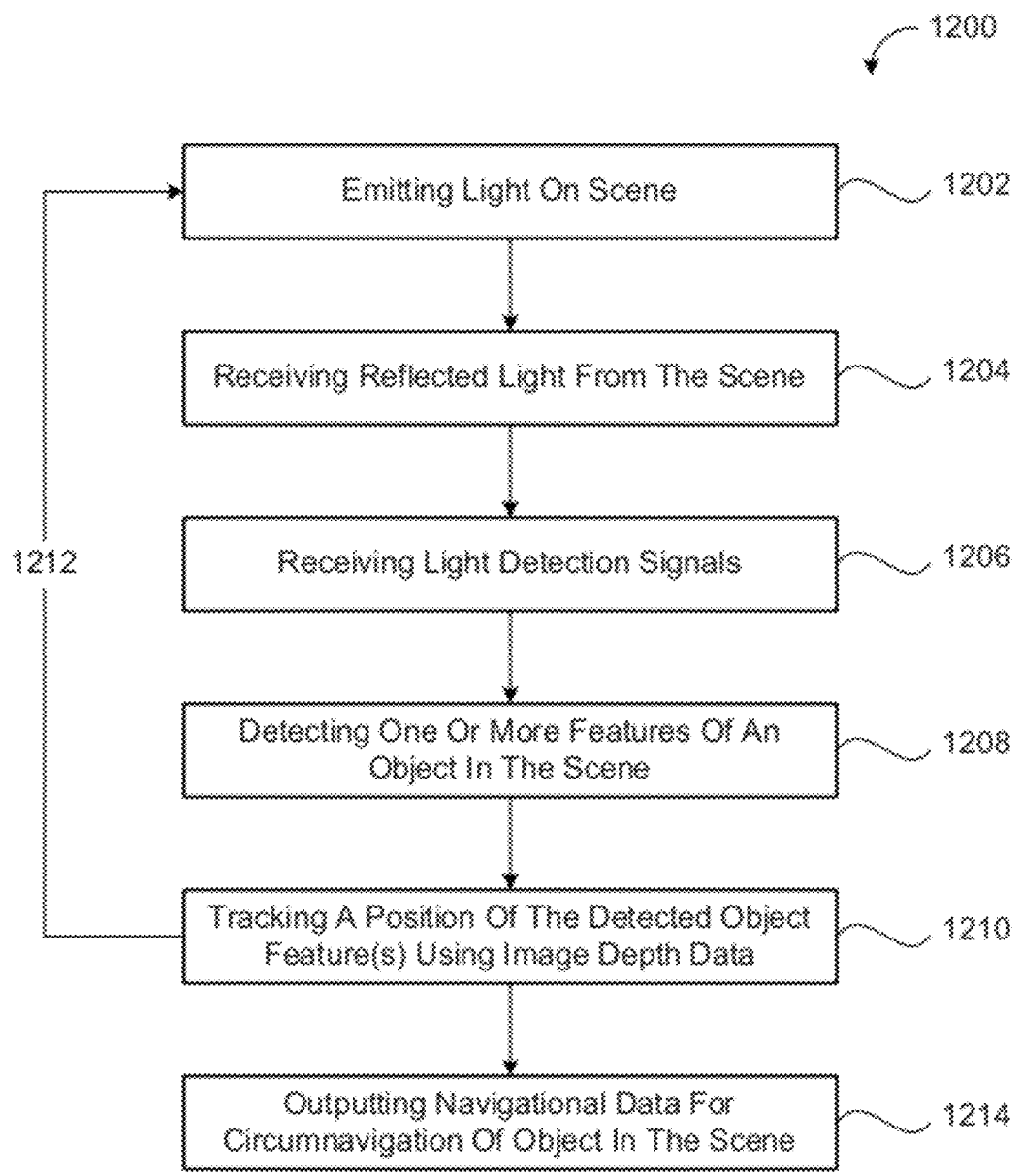
FIG. 12 is a schematic view of an exemplary arrangement of operations for operating an imaging sensor.

FIG. 12 provides an exemplary arrangement 1200 of operations for operating the imaging sensor 450. With additional reference to FIG. 10A, the operations include emitting 1202 light onto a scene 10 about the robot 100 and receiving 1204 reflections of the emitted light from the scene 10 on an imager (e.g., array of light-sensitive pixels). The operations further include the controller 500 receiving 1206 light detection signals from the imager, detecting 1208 one or more features of an object 12 in the scene 10 using image data derived from the light detection signals, and tracking 1210 a position of the detected feature(s) of the object 12 in the scene 10 using image depth data derived from the light detection signals. The operations may include repeating 1212 the operations of emitting 1202 light, receiving 1204 light reflections, receiving 1206 light detection signals, detecting 1208 object feature(s), and tracking 12010 a position of the object feature(s) to increase a resolution of the image data or image depth data, and/or to provide a confidence level.

The repeating 1212 operation can be performed at a relatively slow rate (e.g., slow frame rate) for relatively high resolution, an intermediate rate, or a high rate with a relatively low resolution. The frequency of the repeating 1212 operation may be adjustable by the robot controller 500. In some implementations, the controller 500 may raise or lower the frequency of the repeating 1212 operation upon receiving an event trigger. For example, a sensed item in the scene may trigger an event that causes an increased frequency of the repeating 1212 operation to sense an possibly eminent object 12 (e.g., doorway, threshold, or cliff) in the scene 10. In additional examples, a lapsed time event between detected objects 12 may cause the frequency of the repeating 1212 operation to slow down or stop for a period of time (e.g., go to sleep until awakened by another event). In some examples, the operation of detecting 1208 one or more features of an object 12 in the scene 10 triggers a feature detection event causing a relatively greater frequency of the repeating operation 1212 for increasing the rate at which image depth data is obtained. A relatively greater acquisition rate of image depth data can allow for relatively more reliable feature tracking within the scene.

The operations also include outputting 1214 navigation data for circumnavigating the object 12 in the scene 10. In some implementations, the controller 500 uses the outputted navigation data to issue drive commands to the drive system 200 to move the robot 100 in a manner that avoids a collision with the object 12.

In some implementations, the sensor system 400 detects multiple objects 12 within the scene 10 about the robot 100 and the controller 500 tracks the positions of each of the detected objects 12. The controller 500 may create an occupancy map of objects 12 in an area about the robot 100, such as the bounded area of a room. The controller 500 may use the image depth data of the sensor system 400 to match a scene 10 with a portion of the occupancy map and update the occupancy map with the location of tracked objects 12.

Figure 13:
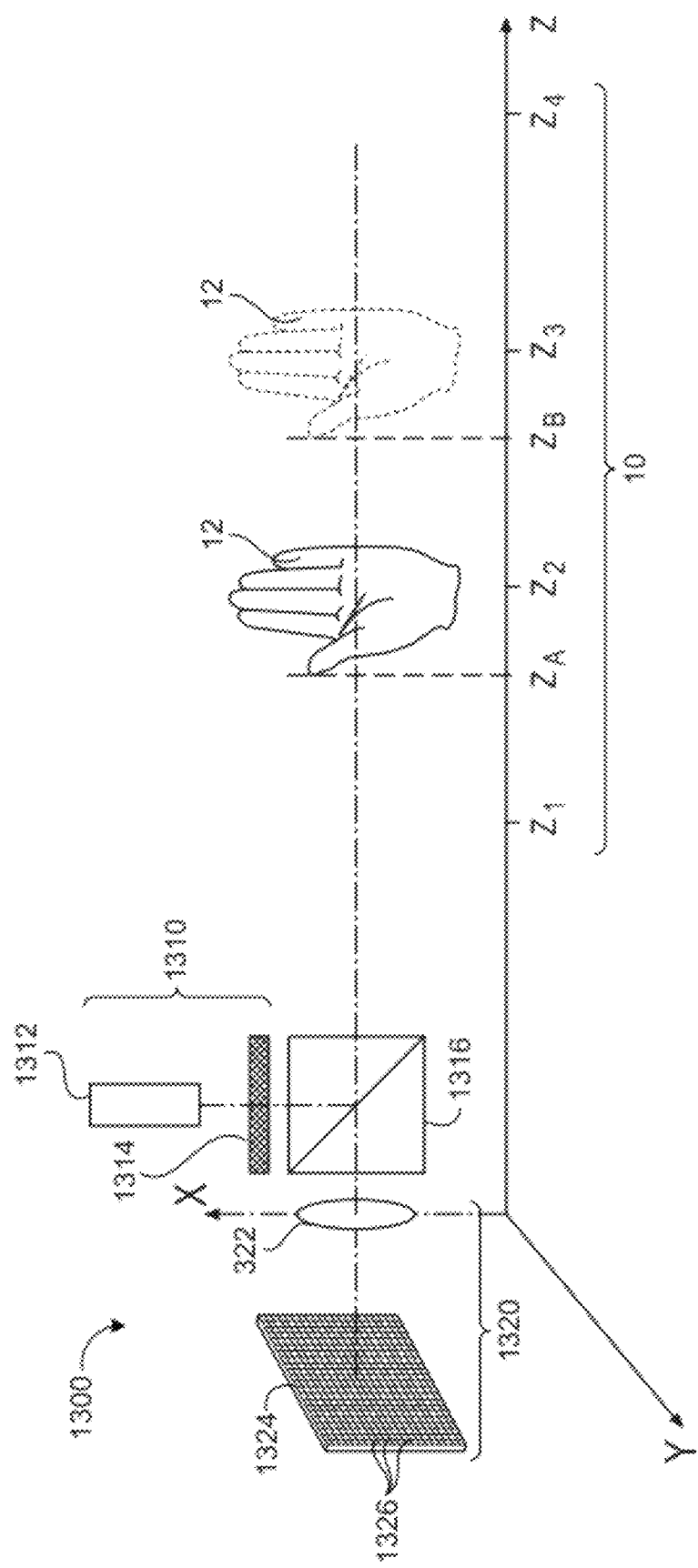
FIG. 13 is a schematic view of an exemplary three-dimensional (3D) speckle camera sensing an object in a scene.

Referring to FIG. 13, in some implementations, the 3-D image sensor 450 includes a three-dimensional (3D) speckle camera 1300, which allows image mapping through speckle decorrelation. The speckle camera 1300 includes a speckle emitter 1310 (e.g., of infrared, ultraviolet, and/or visible light) that emits a speckle pattern into the scene 10 (as a target region) and an imager 1320 that captures images of the speckle pattern on surfaces of an object 12 in the scene 10.

The speckle emitter 1310 may include a light source 1312, such as a laser, emitting a beam of light into a diffuser 1314 and onto a reflector 1316 for reflection, and hence projection, as a speckle pattern into the scene 10. The imager 1320 may include objective optics 1322, which focus the image onto an image sensor 1324 having an array of light detectors 1326, such as a CCD or CMOS-based image sensor. Although the optical axes of the speckle emitter 1310 and the imager 1320 are shown as being collinear, in a decorrelation mode for example, the optical axes of the speckle emitter 1310 and the imager 1320 may also be non-collinear, while in a cross-correlation mode for example, such that an imaging axis is displaced from an emission axis.

The speckle emitter 1310 emits a speckle pattern into the scene 10 and the imager 1320 captures reference images of the speckle pattern in the scene 10 at a range of different object distances $Z_n$ from the speckle emitter 1310 (e.g., where the Z-axis can be defined by the optical axis of imager 1320). In the example shown, reference images of the projected speckle pattern are captured at a succession of planes at different, respective distances from the origin, such as at the fiducial locations marked $Z_1$, $Z_2$, $Z_3$, and so on. The distance between reference images, $\Delta Z$, can be set at a threshold distance (e.g., 5 mm) or adjustable by the controller 500 (e.g., in response to triggered events). The speckle camera 1300 archives and indexes the captured reference images to the respective emission distances to allow decorrelation of the speckle pattern with distance from the speckle emitter 1310 to perform distance ranging of objects 12 captured in subsequent images. Assuming $\Delta Z$ to be roughly equal to the distance between adjacent fiducial distances $Z_1$, $Z_2$, $Z_3$, ..., the speckle pattern on the object 12 at location $Z_A$ can be correlated with the reference image of the speckle pattern captured at $Z_2$, for example. On the other hand, the speckle pattern on the object 12 at $Z_B$ can be correlated with the reference image at $Z_3$, for example. These correlation measurements give the approximate distance of the object 12 from the origin. To map the object 12 in three dimensions, the speckle camera 1300 or the controller 500 receiving information from the speckle camera 1300 can use local cross-correlation with the reference image that gave the closest match.

Other details and features on 3D image mapping using speckle ranging, via speckle cross-correlation using triangulation or decorrelation, for example, which may combinable with those described herein, can be found in PCT Patent Application PCT/IL2006/000335; the contents of which is hereby incorporated by reference in its entirety.

Figure 14:
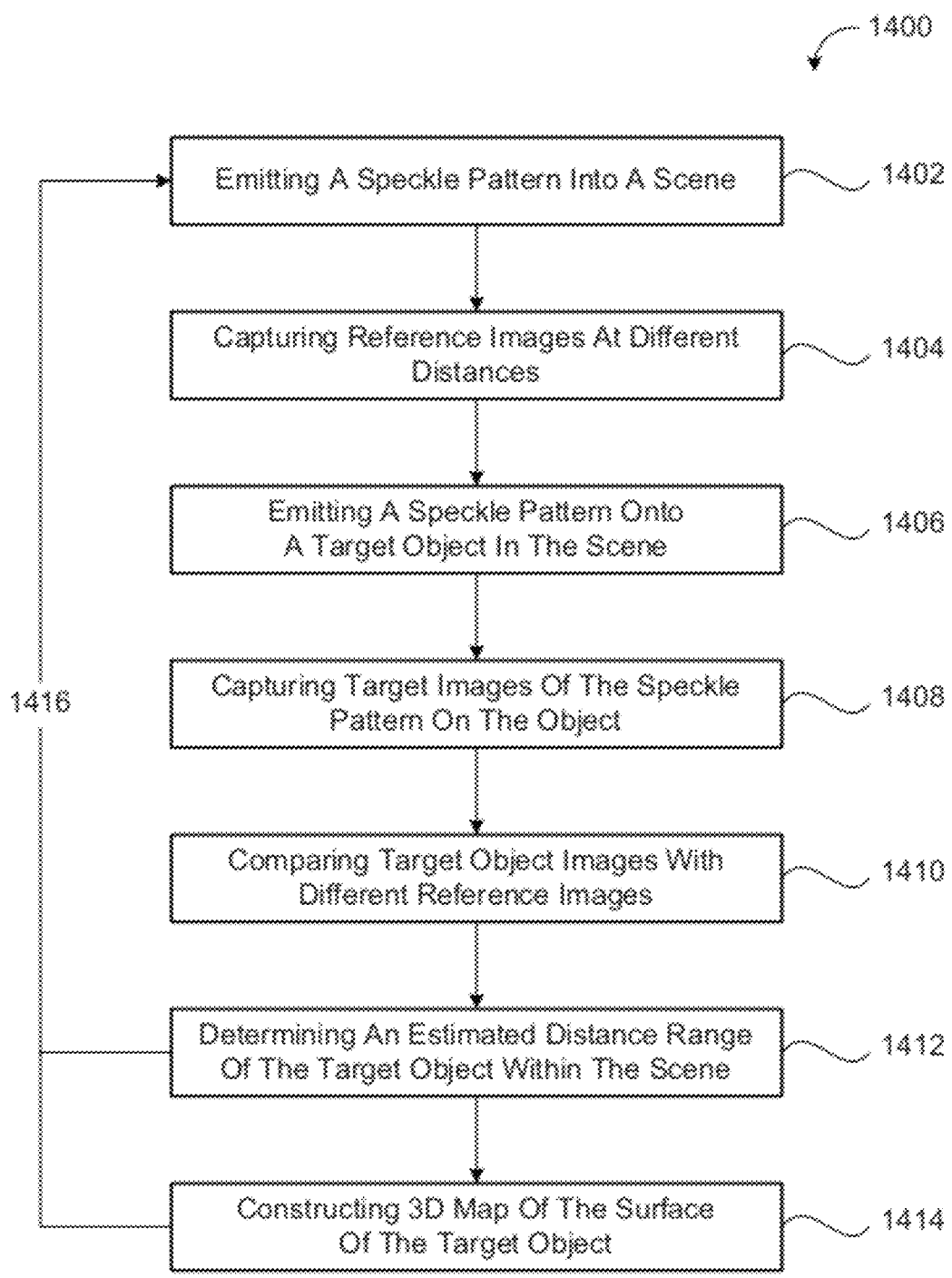
FIG. 14 is a schematic view of an exemplary arrangement of operations for operating a 3D speckle camera.

FIG. 14 provides an exemplary arrangement 1400 of operations for operating the speckle camera 1300. The operations include emitting 1402 a speckle pattern into the scene 10 and capturing 1404 reference images (e.g., of a reference object 12) at different distances from the speckle emitter 1310. The operations further include emitting 1406 a speckle pattern onto a target object 12 in the scene 10 and capturing 1408 target images of the speckle pattern on the object 12. The operations further include comparing 1410 the target images (of the speckled object) with different reference images to identify a reference pattern that correlates most strongly with the speckle pattern on the target object 12 and determining 1412 an estimated distance range of the target object 12 within the scene 10. This may include determining a primary speckle pattern on the object 12 and finding a reference image having speckle pattern that correlates most strongly with the primary speckle pattern on the object 12. The distance range can be determined from the corresponding distance of the reference image.

The operations optionally include constructing 1414 a 3D map of the surface of the object 12 by local cross-correlation between the speckle pattern on the object 12 and the identified reference pattern, for example, to determine a location of the object 12 in the scene. This may include determining a primary speckle pattern on the object 12 and finding respective offsets between the primary speckle pattern on multiple areas of the object 12 in the target image and the primary speckle pattern in the identified reference image so as to derive a three-dimensional (3D) map of the object. The use of solid state components for 3D mapping of a scene provides a relatively inexpensive solution for robot navigational systems.

Typically, at least some of the different, respective distances are separated axially by more than an axial length of the primary speckle pattern at the respective distances. Comparing the target image to the reference images may include computing a respective cross-correlation between the target image and each of at least some of the reference images, and selecting the reference image having the greatest respective cross-correlation with the target image.

The operations may include repeating 1416 operations 1402-1412 or operations 1406-1412, and optionally operation 1414, (e.g., continuously) to track motion of the object 12 within the scene 10. For example, the speckle camera 1300 may capture a succession of target images while the object 12 is moving for comparison with the reference images.

Other details and features on 3D image mapping using speckle ranging, which may combinable with those described herein, can be found in U.S. Pat. No. 7,433,024; U.S. Patent Application Publication No. 2008/0106746, entitled "Depth-varying light fields for three dimensional sensing"; U.S. Patent Application Publication No. 2010/0118123, entitled "Depth Mapping Using Projected Patterns"; U.S. Patent Application Publication No. 2010/0034457, Entitled "Modeling Of Humanoid Forms From Depth Maps"; U.S. Patent Application Publication No. 2010/0020078, Entitled "Depth Mapping Using Multi-Beam Illumination"; U.S. Patent Application Publication No. 2009/0185274, Entitled "Optical Designs For Zero Order Reduction"; U.S. Patent Application Publication No. 2009/0096783, Entitled "Three-Dimensional Sensing Using Speckle Patterns"; U.S. Patent Application Publication No. 2008/0240502, Entitled "Depth Mapping Using Projected Patterns"; and U.S. Patent Application Publication No. 2008/0106746, Entitled "Depth-Varying Light Fields For Three Dimensional Sensing"; the contents of which are hereby incorporated by reference in their entireties.

Figure 15:
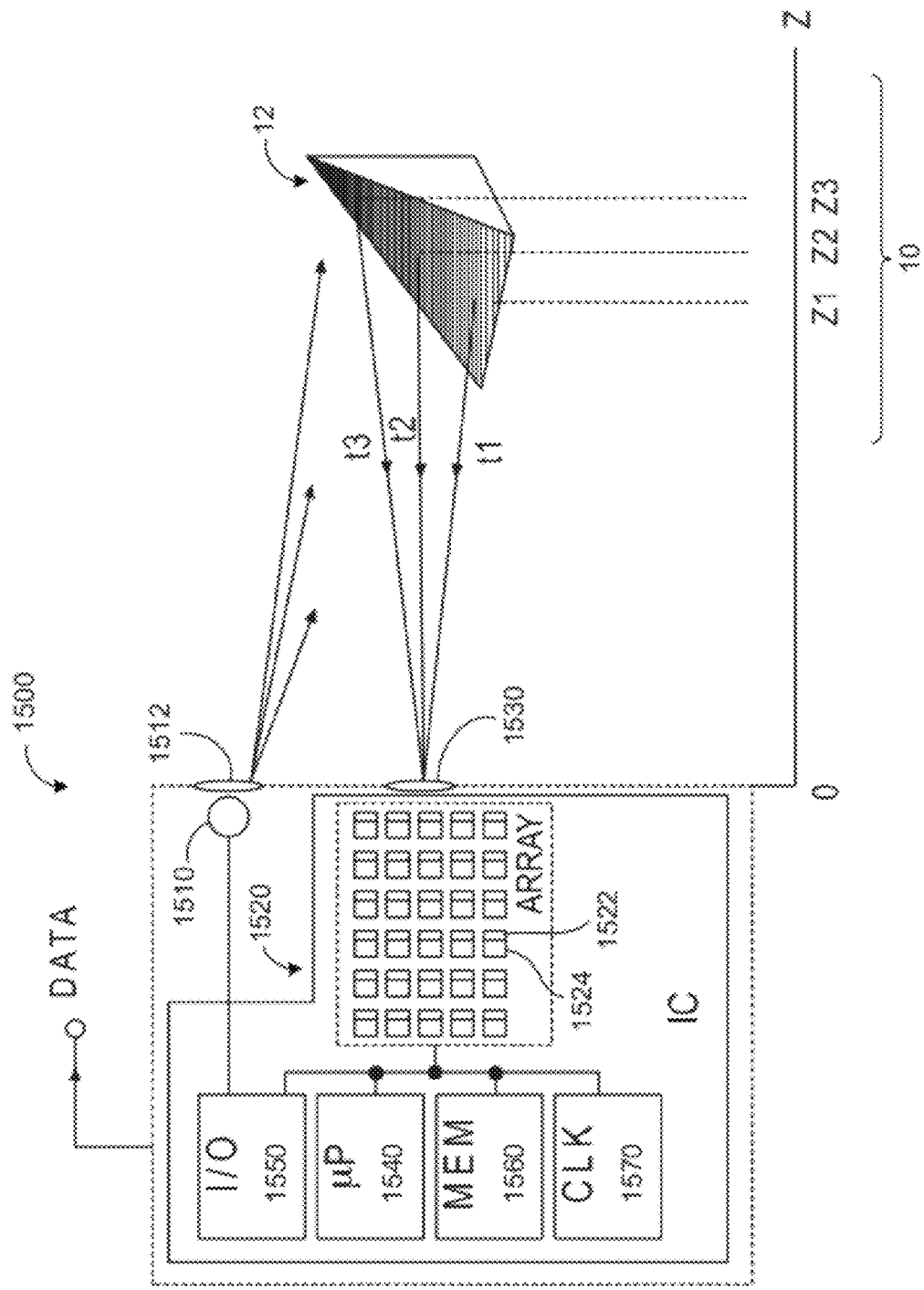
FIG. 15 is a schematic view of an exemplary 3D time-of-flight (TOF) camera sensing an object in a scene.

Referring to FIG. 15, in some implementations, the 3-D imaging sensor 450 includes a 3D time-of-flight (TOF) camera 1500 for obtaining depth image data. The 3D TOF camera 1500 includes a light source 1510, a complementary metal oxide semiconductor (CMOS) sensor 1520 (or charge-coupled device (CCD)), a lens 1530, and control logic or a camera controller 1540 having processing resources (and/or the robot controller 500) in communication with the light source 1510 and the CMOS sensor 1520. The light source 1510 may be a laser or light-emitting diode (LED) with an intensity that is modulated by a periodic signal of high frequency. In some examples, the light source 1510 includes a focusing lens 1512. The CMOS sensor 1520 may include an array of pixel detectors 1522, or other arrangement of pixel detectors 1522, where each pixel detector 1522 is capable of detecting the intensity and phase of photonic energy impinging upon it. In some examples, each pixel detector 1522 has dedicated detector circuitry 1524 for processing detection charge output of the associated pixel detector 1522. The lens 1530 focuses light reflected from a scene 10, containing one or more objects 12 of interest, onto the CMOS sensor 1520. The camera controller 1540 provides a sequence of operations that formats pixel data obtained by the CMOS sensor 1520 into a depth map and a brightness image. In some examples, the 3D TOF camera 1500 also includes inputs/outputs (IO) 1550 (e.g., in communication with the robot controller 500), memory 1560, and/or a clock 1570 in communication with the camera controller 1540 and/or the pixel detectors 1522 (e.g., the detector circuitry 1524).

Figure 16:
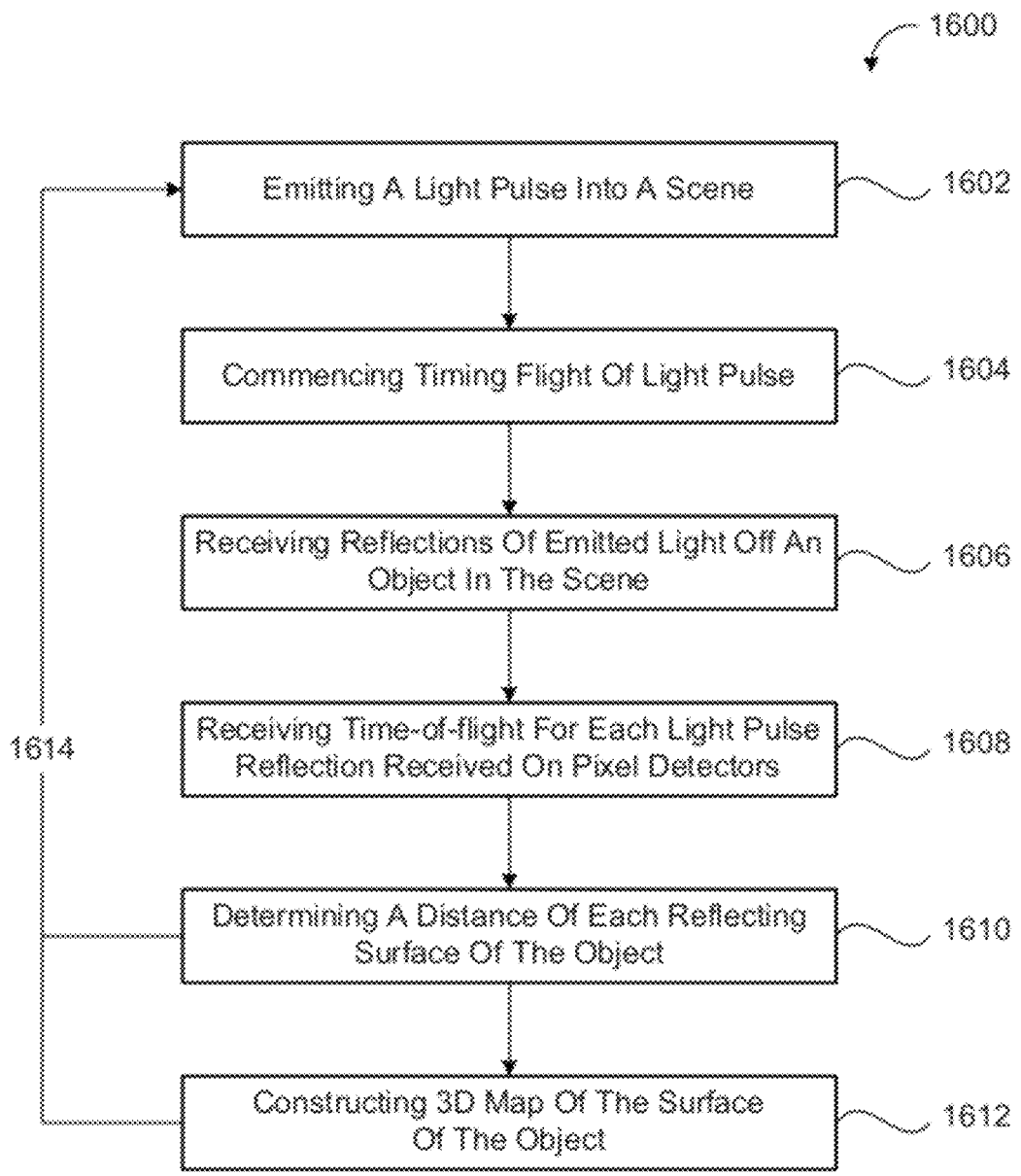
FIG. 16 is a schematic view of an exemplary arrangement of operations for operating a 3D TOF camera.

FIG. 16 provides an exemplary arrangement 1600 of operations for operating the 3D TOF camera 1500. The operations include emitting 1602 a light pulse (e.g., infrared, ultraviolet, and/or visible light) into the scene 10 and commencing 1604 timing of the flight time of the light pulse (e.g., by counting clock pulses of the clock 1570). The operations include receiving 1606 reflections of the emitted light off one or more surfaces of an object 12 in the scene 10. The reflections may be off surfaces of the object 12 that are at different distances $Z_n$ from the light source 1510. The reflections are received though the lens 1530 and onto pixel detectors 1522 of the CMOS sensor 1520. The operations include receiving 1608 time-of-flight for each light pulse reflection received on each corresponding pixel detector 1522 of the CMOS sensor 1520. During the roundtrip time of flight (TOF) of a light pulse, a counter of the detector circuitry 1523 of each respective pixel detector 1522 accumulates clock pulses. A larger number of accumulated clock pulses represents a longer TOF, and hence a greater distance between a light reflecting point on the imaged object 12 and the light source 1510. The operations further include determining 1610 a distance between the reflecting surface of the object 12 for each received light pulse reflection and optionally constructing 1612 a three-dimensional object surface. In some implementations, the operations include repeating 1614 operations 1602-1610 and optionally 1612 for tracking movement of the object 12 in the scene 10.

Other details and features on 3D time-of-flight imaging, which may combinable with those described herein, can be found in U.S. Pat. No. 6,323,942, entitled "CMOS Compatible 3-D Image Sensor"; U.S. Pat. No. 6,515,740, entitled "Methods for CMOS-Compatible Three-Dimensional Image Sensing Using Quantum Efficiency Modulation"; and PCT Patent Application PCT/US02/16621, entitled "Method and System to Enhance Dynamic Range Conversion Usable with CMOS Three-Dimensional Imaging", the contents of which are hereby incorporated by reference in their entireties.

In some implementations, the 3-D imaging sensor 450 provides three types of information: (1) depth information (e.g., from each pixel detector 1522 of the CMOS sensor 1520 to a corresponding location on the scene 12); (2) ambient light intensity at each pixel detector location; and (3) the active illumination intensity at each pixel detector location. The depth information enables the position of the detected object 12 to be tracked over time, particularly in relation to the object's proximity to the site of robot deployment. The active illumination intensity and ambient light intensity are different types of brightness images. The active illumination intensity is captured from reflections of an active light (such as provided by the light source 1510) reflected off of the target object 12. The ambient light image is of ambient light reflected off of the target object 12. The two images together provide additional robustness, particularly when lighting conditions are poor (e.g., too dark or excessive ambient lighting).

Image segmentation and classification algorithms may be used to classify and detect the position of objects 12 in the scene 10. Information provided by these algorithms, as well as the distance measurement information obtained from the imaging sensor 450, can be used by the robot controller 500 or other processing resources. The imaging sensor 450 can operate on the principle of time-of-flight, and more specifically, on detectable phase delays in a modulated light pattern reflected from the scene 10, including techniques for modulating the sensitivity of photodiodes for filtering ambient light.

The robot 100 may use the imaging sensor 450 for 1) mapping, localization & navigation; 2) object detection & object avoidance (ODOA); 3) object hunting (e.g., to find a person); 4) gesture recognition (e.g., for companion robots); 5) people & face detection; 6) people tracking; 7) monitoring manipulation of objects by the robot 100; and other suitable applications for autonomous operation of the robot 100.

In some implementations, at least one of 3-D image sensors 450 can be a volumetric point cloud imaging device (such as a speckle or time-of-flight camera) positioned on the robot 100 at a height of greater than 1 or 2 feet above the ground and directed to be capable of obtaining a point cloud from a volume of space including a floor plane in a direction of movement of the robot (via the omni-directional drive system 200). In the examples shown in FIGS. 1 and 3, the first 3-D image sensor 450a can be positioned on the base 120 at height of greater than 1 or 2 feet above the ground (or at a height of about 1 or 2 feet above the ground) and aimed along the forward drive direction F to capture images (e.g., volumetric point cloud) of a volume including the floor while driving (e.g., for obstacle detection and obstacle avoidance). The second 3-D image sensor 450b is shown mounted on the head 160 (e.g., at a height greater than about 3 or 4 feet above the ground), so as to be capable of obtaining skeletal recognition and definition point clouds from a volume of space adjacent the robot 100. The controller 500 may execute skeletal/digital recognition software to analyze data of the captured volumetric point clouds.

Properly sensing objects 12 using the imaging sensor 450, despite ambient light conditions can be important. In many environments the lighting conditions cover a broad range from direct sunlight to bright fluorescent lighting to dim shadows, and can result in large variations in surface texture and basic reflectance of objects 12. Lighting can vary within a given location and from scene 10 to scene 10 as well. In some implementations, the imaging sensor 450 can be used for identifying and resolving people and objects 12 in all situations with relatively little impact from ambient light conditions (e.g., ambient light rejection).

In some implementations, VGA resolution of the imaging sensor 450 is 640 horizontal by 480 vertical pixels; however, other resolutions are possible as well, such. 320×240 (e.g., for short range sensors).

The imaging sensor 450 may include a pulse laser and camera iris to act as a bandpass filter in the time domain to look at objects 12 only within a specific range. A varying iris of the imaging sensor 450 can be used to detect objects 12 a different distances. Moreover, a pulsing higher power laser can be used for outdoor applications.

Table 1 and Table 2 (below) provide exemplary features, parameters, and/or specifications of imaging sensors 450 for various applications. Sensor 1 can be used as a general purpose imaging sensor 450. Sensors 2 and 3 could be used on a human interaction robot, and sensors 4 and 5 could be used on a coverage or cleaning robot.

TABLE 1

|  | Unit | Sensor 1 | Sensor 2 Long Range | Sensor 3 Short Range | Sensor 4 Long Range | Sensor 5 Short Range |
|---|---|---|---|---|---|---|
| Dimensions | | | | | | |
| Width | cm | 18 | <=18 < 14 | <14 <= 6 | <=6 | <=6 |
| Height | cm | 2.5 | <=2.5 < 4 | <4 <= 1.2 | <=1.2 | <=1.2 |
| Depth | cm | 3.5 | <=3.5 < 5 | <5 <= .6 | <=.6 | <=.6 |
| Operating Temp | | | | | | |
| Minimum | ° C. | 5 | 5 | 5 | 5 | 5 |
| Maximum | ° C. | 40 | 40 | 40 | 40 | 40 |
| Comm Port | | | | | | |
| Data interface | | USB 2.0 | USB 2.0 | USB 2.0 | SPI | SPI |
| Field-of-View | | | | | | |
| Horizontal | deg | 57.5 | >=57.5 | >70 | >70 | >70 |
| Vertical | deg | 45 | >=45 | >=45 | >=45 | >40 |
| Diagonal | deg | 69 | | | | |

TABLE 1-continued

|  | Unit | Sensor 1 | Sensor 2 Long Range | Sensor 3 Short Range | Sensor 4 Long Range | Sensor 5 Short Range |
| --- | --- | --- | --- | --- | --- | --- |
| Spatial Resolution | | | | | | |
| Depth image size | | 640 × 480 | 640 × 480 | | | |
| @15 cm | mm | | | | | |
| @20 cm | mm | | | | | |
| @40 cm | mm | | | | | |
| @80 cm | mm | | | | | |
| @1 m | mm | 1.7 | 1.7 | | | |
| @2 m | mm | 3.4 | 3.4 | | | |
| @3 m | mm | 5.1 | 5.1 | | | |
| @3.5 m | mm | 6 | 6 | | | |
| Downsampling | | | | | | |
| QVGA | pixels | 320 × 240 | 320 × 240 | 320 × 240 | 320 × 240 | 320 × 240 |
| QQVGA | pixels | 160 × 120 | 160 × 120 | 160 × 120 | 160 × 120 | 160 × 120 |

TABLE 2

|  | Unit | Sensor 1 | Sensor 2 Long Range | Sensor 3 Short Range | Sensor 4 Long Range | Sensor 5 Short Range |
| --- | --- | --- | --- | --- | --- | --- |
| Depth Resolution | | | | | | |
| @1 m | cm | 0.57 | | | | |
| @2 m | cm | 2.31 | | | | |
| @3 m | cm | 5.23 | | | | |
| @3.5 m | cm | 7.14 | | | | |
| Minimum Object Size | | | | | | |
| @1 m | cm | 2.4 | <=2.4 | | | 0.2 |
| @2 m | cm | 4.8 | <=4.8 | | | |
| @3 m | cm | 7.2 | <=7.2 | | | |
| @3.5 m | cm | 8.4 | <=8.4 | | | |
| Throughput | | | | | | |
| Frame rate | fps | 30 | 30 | 30 | 30 | 30 |
| VGA depth image | ms | 44 | <=44 | <=44 | <=44 | <=44 |
| QVGA depth image | ms | 41 | <=41 | <=41 | <=41 | <=41 |
| Range | | | | | | |
| In Spec. range | m | 0.8-3.5 | 0.8-3.5 | 0.25-1.50 | 0.25-1.50 | 0.15-1.0 |
| Observed range | m | 0.3-5 | 0.3-5 | 0.15-2.00 | 0.15-2.00 | 0.10-1.5 |
| Color Image | | | | | | |
| Color camera | | CMOS 1280 × 1024 | N/R | N/R | N/R | N/R |
| Audio | | | | | | |
| Built-in microphones | | 2 | N/R | N/R | N/R | N/R |
| Data format | | 16 | | | | |
| Sample rate | | 17746 | | | | |
| External digital audio inputs | | 4 | | | | |
| Power | | | | | | |
| Power supply | | USB 2.0 | USB 2.0 | USB 2.0 | | |
| Current consumption | | 0.45 | | | | |
| Max power consumption | | 2.25 | | | | 0.5 |

Minimal sensor latency assures that objects 12 can be seen quickly enough to be avoided when the robot 100 is moving. Latency of the imaging sensor 450 can be a factor in reacting in real time to detected and recognized user gestures. In some examples, the imaging sensor 450 has a latency of about 44 ms. Images captured by the imaging sensor 450 can have an attributed time stamp, which can be used for determining at what robot pose an image was taken while translating or rotating in space.

A Serial Peripheral Interface Bus (SPI) in communication with the controller 500 may be used for communicating with the imaging sensor 450. Using an SPI interface for the imaging sensor 450 does not limit its use for multi-node distributed sensor/actuator systems, and allows connection with an Ethernet enabled device such as a microprocessor or a field-programmable gate array (FPGA), which can then make data available over Ethernet and an EtherIO system, as described in U.S. Patent Application Ser. No. 61/305,069, filed on Feb. 16, 2010 and titled "Mobile Robot Communication System," which is hereby incorporate by reference in its entirety.

Since SPI is a limited protocol, an interrupt pin may be available on the interface to the imaging sensor 450 that would strobe or transition when an image capture is executed. The interrupt pin allows communication to the controller 500 of when a frame is captured. This allows the controller 500 to know that data is ready to be read. Additionally, the interrupt pin can be used by the controller 500 to capture a timestamp which indicates when the image was taken. Imaging output of the imaging sensor 450 can be time stamped (e.g., by a global clock of the controller 500), which can be referenced to compensate for latency. Moreover, the time stamped imaging output from multiple imaging sensors 450 (e.g., of different portions of the scene 10) can be synchronized and combined (e.g., stitched together). Over an EtherIO system, an interrupt time (on the interrupt pin) can be captured and made available to higher level devices and software on the EtherIO system. The robot 100 may include a multi-node distributed sensor/actuator systems that implements a clock synchronization strategy, such as IEEE1588, which we can be applied to data captured from the imaging sensor 450.

Both the SPI interface and EtherIO can be memory-address driven interfaces. Data in the form of bytes/words/doublewords, for example, can be read from the imaging sensor 450 over the SPI interface, and made available in a memory space of the EtherIO system. For example, local registers and memory, such as direct memory access (DMA) memory, in an FPGA, can be used to control an EtherIO node of the EtherIO system.

In some cases, the robot 100 may need to scan the imaging sensor 450 from side to side (e.g., to view an object 12 or around an occlusion 16 (FIG. 17A)). For a differentially steered robot 100, this may involve rotating the robot 100 in place with the drive system 200; or rotating a mirror, prism, variable angle micro-mirror, or MEMS mirror array associated with the imaging sensor 450.

The field of view 452 of the imaging sensor 450 having a view angle θv less than 360 can be enlarged to 360 degrees by optics, such as omni-directional, fisheye, catadioptric (e.g., parabolic mirror, telecentric lens), panamorph mirrors and lenses. Since the controller 500 may use the imaging sensor 450 for distance ranging, inter alia, but not necessarily for human-viewable images or video (e.g., for human communications), distortion (e.g., warping) of the illumination of the light source 1172 and/or the image capturing by the imager 1174 (FIG. 11) through optics is acceptable for distance ranging (e.g., as with the 3D speckle camera 1300 and/or the 3D TOF camera 1500).

In some instances, the imaging sensor 450 may have difficulties recognizing and ranging black objects 12, surfaces of varied albedo, highly reflective objects 12, strong 3D structures, self-similar or periodic structures, or objects at or just beyond the field of view 452 (e.g., at or outside horizontal and vertical viewing field angles). In such instances, other sensors of the sensor system 400 can be used to supplement or act as redundancies to the imaging sensor 450.

In some implementations, the light source 1172 (e.g., of the 3D speckle camera 1300 and/or the 3D TOF camera 1500) includes an infrared (IR) laser, IR pattern illuminator, or other IR illuminator. A black object, especially black fabric or carpet, may absorb IR and fail to return a strong enough reflection for recognition by the imager 1174. In this case, either a secondary mode of sensing (such as sonar) or a technique for self calibrating for surface albedo differences may be necessary to improve recognition of black objects.

A highly reflective object 12 or an object 12 with significant specular highlights (e.g., cylindrical or spherical) may make distance ranging difficult for the imaging sensor 450. Similarly, objects 12 that are extremely absorptive in the wavelength of light for which the imaging sensor 450 is sensing, can pose problems as well. Objects 12, such as doors and window, which are made of glass can be highly reflective and, when ranged, either appear as if they are free space (infinite range) or else range as the reflection to the first non-specularly-reflective surface. This may cause the robot 100 to not see the object 12 as an obstacle, and, as a result, may collide with the window or door, possibly causing damage to the robot or to the object 12. In order to avoid this, the controller 500 may execute one or more algorithms that look for discontinuities in surfaces matching the size and shape (rectilinear) of a typical window pane or doorway. These surfaces can then be inferred as being obstacles and not free space. Another implementation for detecting reflective objects in the path of the robot includes using a reflection sensor that detects its own reflection. Upon careful approach of the obstacle or object 12, the reflection sensor can be used determine whether there is a specularly reflective object ahead, or if the robot can safely occupy the space.

In the case of the 3D speckle camera 1300, the light source 1310 may fail to form a pattern recognizable on the surface of a highly reflective object 12 or the imager 1320 may fail to recognize a speckle reflection from the highly reflective object 12. In the case of the 3D TOF camera 1500, the highly reflective object 12 may create a multi-path situation where the 3D TOF camera 1500 obtains a range to another object 12 reflected in the object 12 (rather than to the object itself). To remedy IR failure modes, the sensor system 400 may employ acoustic time of flight, millimeter wave radar, stereo or other vision techniques able to use even small reflections in the scene 10.

Mesh objects 12 may make distance ranging difficult for the imaging sensor 450. If there are no objects 12 immediately behind mesh of a particular porosity, the mesh will appear as a solid obstacle 12. If an object 12 transits behind the mesh, however, and, in the case of the 3D speckle camera 1300, the speckles are able to reflect off the object 12 behind the mesh, the object will appear in the depth map instead of the mesh, even though it is behind it. If information is available about the points that had previously contributed to the identification of the mesh (before an object 12 transited behind it), such information could be used to register the position of the mesh in future occupancy maps. By receiving information about the probabilistic correlation of the received speckle map at various distances, the controller 500 may determine the locations of multiple porous or mesh-like objects 12 in line with the imaging sensor 450.

The controller 500 may use imaging data from the imaging sensor 450 for color/size/dimension blob matching. Identification of discrete objects 12 in the scene 10 allows the robot 100 to not only avoid collisions, but also to search for objects 12. The human interface robot 100 may need to identify humans and target objects 12 against the background of a home or office environment. The controller 500 may execute one or more color map blob-finding algorithms on the depth map(s) derived from the imaging data of the imaging sensor 450 as if the maps were simple grayscale maps and search for the same "color" (that is, continuity in depth) to yield continuous objects 12 in the scene 10. Using color maps to augment the decision of how to segment objects 12 would further amplify object matching, by allowing segmentation in the color space as well as in the depth space. The controller 500 may first detect objects 12 by depth, and then further segment the objects 12 by color. This allows the robot 100 to distinguish between two objects 12 close to or resting against one another with differing optical qualities.

In implementations where the sensor system 400 includes only one imaging sensor 450 (e.g., camera) for object detection, the imaging sensor 450 may have problems imaging surfaces in the absence of scene texture and may not be able to resolve the scale of the scene. Moreover, mirror and/or specular highlights of an object 12 can cause saturation in a group of pixels 1174p of the imager 1174 (e.g., saturating a corresponding portion of a captured image); and in color images, the specular highlights can appear differently from different viewpoints, thereby hampering image matching, as for the speckle camera 1300.

Using or aggregating two or more sensors for object detection can provide a relatively more robust and redundant sensor system 400. For example, although flash LADARs generally have low dynamic range and rotating scanners generally have long inspection times, these types of sensor can be useful for object detection. In some implementations, the sensor system 400 include a flash LADAR and/or a rotating scanner in addition to the imaging sensor 450 (e.g., the 3D speckle camera 1300 and/or the 3D TOF camera 1500) in communication with the controller 500. The controller 500 may use detection signals from the imaging sensor 450 and the flash ladar and/or a rotating scanner to identify objects 12, determine a distance of objects 12 from the robot 100, construct a 3D map of surfaces of objects 12, and/or construct or update an occupancy map 1700. The 3D speckle camera 1300 and/or the 3D TOF camera 1500 can be used to address any color or stereo camera weaknesses by initializing a distance range, filling in areas of low texture, detecting depth discontinuities, and/or anchoring scale.

In examples using the 3D speckle camera 1300, the speckle pattern emitted by the speckle emitter 1310 may be rotation-invariant with respect to the imager 1320. Moreover, an additional camera 1300 (e.g., color or stereo camera) co-registered with the 3D speckle camera 1300 and/or the 3D TOF camera 1500 may employ a feature detector that is some or fully scale-rotation-affine invariant to handle ego rotation, tilt, perspective, and/or scale (distance). Scale-invariant feature transform (or SIFT) is an algorithm for detecting and/or describing local features in images. SIFT can be used by the controller 140 (with data from the sensor system 130) for object recognition, robotic mapping and navigation, 3D modeling, gesture recognition, video tracking, and match moving. SIFT, as a scale-invariant, rotation-invariant transform, allows placement of a signature on features in the scene 10 and can help reacquire identified features in the scene 10 even if they are farther away or rotated. For example, the application of SIFT on ordinary images allows recognition of a moved object 12 (e.g., a face or a button or some text) be identifying that the object 12 has the same luminance or color pattern, just bigger or smaller or rotated. Other of transforms may be employed that are affine-invariant and can account for skew or distortion for identifying objects 12 from an angle. The sensor system 400 and/or the controller 500 may provide scale-invariant feature recognition (e.g., with a color or stereo camera) by employing SIFT, RIFT, Affine SIFT, RIFT, G-RIF, SURF, PCA-SIFT, GLOH. PCA-SIFT, SIFT w/FAST corner detector and/or Scalable Vocabulary Tree, and/or SIFT w/Irregular Orientation Histogram Binning.

In some implementations, the controller 500 executes a program or routine that employs SIFT and/or other transforms for object detection and/or identification. The controller 500 may receive image data from an image sensor 450, such as a color, black and white, or IR camera. In some examples, the image sensor 450 is a 3D speckle IR camera that can provide image data without the speckle illumination to identify features without the benefit of speckle ranging. The controller 500 can identify or tag features or objects 12 previously mapped in the 3D scene from the speckle ranging. The depth map can be used to filter and improve the recognition rate of SIFT applied to features imaged with a camera, and/or simplify scale invariance (because both motion and change in range are known and can be related to scale). SIFT-like transforms may be useful with depth map data normalized and/or shifted for position variation from frame to frame, which robots with inertial tracking, odometry, proprioception, and/or beacon reference may be able to track. For example, a transform applied for scale and rotation invariance may still be effective to recognize a localized feature in the depth map if the depth map is indexed by the amount of movement in the direction of the feature.

Other details and features on SIFT-like or other feature descriptors to 3D data, which may combinable with those described herein, can be found in Se, S.; Lowe, David G.; Little, J. (2001). "*Vision-based mobile robot localization and mapping using scale-invariant features*". Proceedings of the IEEE International Conference on Robotics and Automation (*ICRA*). 2. pp. 2051; or Rothganger, F; S. Lazebnik, C. Schmid, and J. Ponce: 2004. 3*D Object Modeling and Recognition Using Local Affine-Invariant Image Descriptors and Multi-View Spatial Constraints*, ICCV; or Iryna Gordon and David G. Lowe, "*What and where:* 3*D object recognition with accurate pose,*" Toward Category-Level Object Recognition, (Springer-Verlag, 2006), pp. 67-82; the contents of which are hereby incorporated by reference in their entireties.

Other details and features on techniques suitable for 3D SIFT in human action recognition, including falling, can be found in Laptev, Ivan and Lindeberg, Tony (2004). "*Local descriptors for spatio-temporal recognition*". ECCV'04 Workshop on Spatial Coherence for Visual Motion Analysis, Springer Lecture Notes in Computer Science, Volume 3667. pp. 91-103; Ivan Laptev, Barbara Caputo, Christian Schuldt and Tony Lindeberg (2007). "*Local velocity-adapted motion events for spatio-temporal recognition*". Computer Vision and Image Understanding 108: 207-229; Scovanner, Paul; Ali, S; Shah, M (2007). "*A* 3-*dimensional sift descriptor and its application to action recognition*". Proceedings of the 15*th International Conference on Multimedia*. pp. 357-360; Niebles, J. C. Wang, H. and Li, Fei-Fei (2006). "*Unsupervised Learning of Human Action Categories Using Spatial-Temporal Words*". Proceedings of the British Machine Vision Conference (*BMVC*). Edinburgh; the contents of which are hereby incorporated by reference in their entireties.

The controller 500 may use the imaging sensor 450 (e.g., a depth map sensor) when constructing a 3D map of the surface of and object 12 to fill in holes from depth discontinuities and to anchor a metric scale of a 3D model. Structure-from-motion, augmented with depth map sensor range data, may be used to estimate sensor poses. A typical structure-from-motion pipeline may include viewpoint-invariant feature estimation, inter-camera feature matching, and a bundle adjustment.

A software solution combining features of color/stereo cameras with the imaging sensor 450 (e.g., the 3D speckle camera 1300, and/or the TOF camera 1500) may include (1) sensor pose estimation, (2) depth map estimation, and (3) 3D mesh estimation. In sensor pose estimation, the position and attitude of the sensor package of each image capture is determined. In depth map estimation, a high-resolution depth map is obtained for each image. In 3D mesh estimation, sensor pose estimates and depth maps can be used to identify objects of interest.

In some implementations, a color or stereo camera 320 (FIG. 9) and the 3D speckle 1300 or the 3D TOF camera 1500 may be co-registered. A stand-off distance of 1 meter and 45-degree field of view 452 may give a reasonable circuit time and overlap between views. If at least two pixels are needed for 50-percent detection, at least a 1 mega pixel resolution color camera may be used with a lens with a 45-degree field of view 452, with proportionately larger resolution for a 60 degree or wider field of view 452.

Although a depth map sensor may have relatively low resolution and range accuracy, it can reliably assign collections of pixels from the color/stereo image to a correct surface. This allows reduction of stereo vision errors due to lack of texture, and also, by bounding range to, e.g., a 5 cm interval, can reduce the disparity search range, and computational cost.

Referring again to FIG. 10A, the first and second 3-D image sensors 450a, 450b can be used to improve mapping of the robot's environment to create a robot map, as the first 3-D image sensor 450a can be used to map out nearby objects and the second 3-D image sensor 450b can be used to map out distant objects.

Figure 17A:
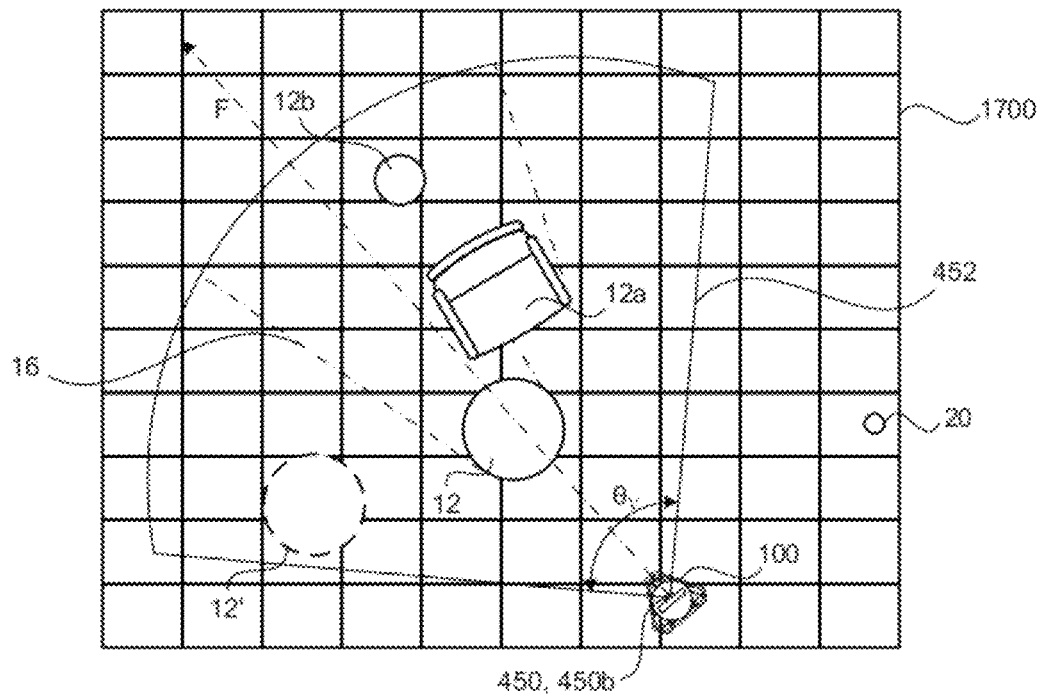
FIG. 17A is a schematic view of an exemplary occupancy map.
Figure 17B:
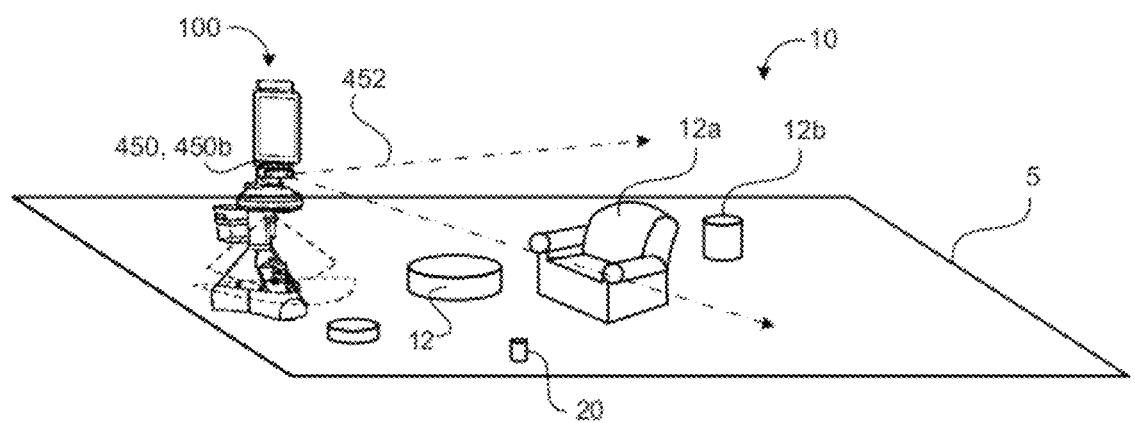
FIG. 17B is a schematic view of a mobile robot having a field of view of a scene in a working area.

Referring to FIGS. 17A and 17B, in some circumstances, the robot 100 receives an occupancy map 1700 of objects 12 in a scene 10 and/or work area 5, or the robot controller 500 produces (and may update) the occupancy map 1700 based on image data and/or image depth data received from an imaging sensor 450 (e.g., the second 3-D image sensor 450b) over time. In addition to localization of the robot 100 in the scene 10 (e.g., the environment about the robot 100), the robot 100 may travel to other points in a connected space (e.g., the work area 5) using the sensor system 400. The robot 100 may include a short range type of imaging sensor 450a (e.g., mounted on the underside of the torso 140, as shown in FIGS. 1 and 3) for mapping a nearby area about the robot 110 and discerning relatively close objects 12, and a long range type of imaging sensor 450b (e.g., mounted on the head 160, as shown in FIGS. 1 and 3) for mapping a relatively larger area about the robot 100 and discerning relatively far away objects 12. The robot 100 can use the occupancy map 1700 to identify known objects 12 in the scene 10 as well as occlusions 16 (e.g., where an object 12 should or should not be, but cannot be confirmed from the current vantage point). The robot 100 can register an occlusion 16 or new object 12 in the scene 10 and attempt to circumnavigate the occlusion 16 or new object 12 to verify the location of new object 12 or any objects 12 in the occlusion 16. Moreover, using the occupancy map 1700, the robot 100 can determine and track movement of an object 12 in the scene 10. For example, the imaging sensor 450, 450a, 450b may detect a new position 12' of the object 12 in the scene 10 while not detecting a mapped position of the object 12 in the scene 10. The robot 100 can register the position of the old object 12 as an occlusion 16 and try to circumnavigate the occlusion 16 to verify the location of the object 12. The robot 100 may compare new image depth data with previous image depth data (e.g., the map 1700) and assign a confidence level of the location of the object 12 in the scene 10. The location confidence level of objects 12 within the scene 10 can time out after a threshold period of time. The sensor system 400 can update location confidence levels of each object 12 after each imaging cycle of the sensor system 400. In some examples, a detected new occlusion 16 (e.g., a missing object 12 from the occupancy map 1700) within an occlusion detection period (e.g., less than ten seconds), may signify a "live" object 12 (e.g., a moving object 12) in the scene 10.

In some implementations, a second object 12b of interest, located behind a detected first object 12a in the scene 10, may be initially undetected as an occlusion 16 in the scene 10. An occlusion 16 can be area in the scene 10 that is not readily detectable or viewable by the imaging sensor 450, 450a, 450b. In the example shown, the sensor system 400 (e.g., or a portion thereof, such as imaging sensor 450, 450a, 450b) of the robot 100 has a field of view 452 with a viewing angle $\theta_V$ (which can be any angle between 0 degrees and 360 degrees) to view the scene 10. In some examples, the imaging sensor 170 includes omni-directional optics for a 360 degree viewing angle $\theta_V$; while in other examples, the imaging sensor 450, 450a, 450b has a viewing angle $\theta_V$ of less than 360 degrees (e.g., between about 45 degrees and 180 degrees). In examples, where the viewing angle $\theta_V$ is less than 360 degrees, the imaging sensor 450, 450a, 450b (or components thereof) may rotate with respect to the robot body 110 to achieve a viewing angle $\theta_V$ of 360 degrees. In some implementations, the imaging sensor 450, 450a, 450b or portions thereof, can move with respect to the robot body 110 and/or drive system 120. Moreover, in order to detect the second object 12b, the robot 100 may move the imaging sensor 450, 450a, 450b by driving about the scene 10 in one or more directions (e.g., by translating and/or rotating on the work surface 5) to obtain a vantage point that allows detection of the second object 10b. Robot movement or independent movement of the imaging sensor 450, 450a, 450b, or portions thereof, may resolve monocular difficulties as well.

A confidence level may be assigned to detected locations or tracked movements of objects 12 in the working area 5. For example, upon producing or updating the occupancy map 1700, the controller 500 may assign a confidence level for each object 12 on the map 1700. The confidence level can be directly proportional to a probability that the object 12 actually located in the working area 5 as indicated on the map 1700. The confidence level may be determined by a number of factors, such as the number and type of sensors used to detect the object 12. For example, the contact sensor 430 may provide the highest level of confidence, as the contact sensor 430 senses actual contact with the object 12 by the robot 100. The imaging sensor 450 may provide a different level of confidence, which may be higher than the proximity sensor 430. Data received from more than one sensor of the sensor system 400 can be aggregated or accumulated for providing a relatively higher level of confidence over any single sensor.

Odometry is the use of data from the movement of actuators to estimate change in position over time (distance traveled). In some examples, an encoder is disposed on the drive system 200 for measuring wheel revolutions, therefore a distance traveled by the robot 100. The controller 500 may use odometry in assessing a confidence level for an object location. In some implementations, the sensor system 400 includes an odometer and/or an angular rate sensor (e.g., gyroscope or the IMU 470) for sensing a distance traveled by the robot 100. A gyroscope is a device for measuring or maintaining orientation, based on the principles of conservation of angular momentum. The controller 500 may use odometry and/or gyro signals received from the odometer and/or angular rate sensor, respectively, to determine a location of the robot 100 in a working area 5 and/or on an occupancy map 1700. In some examples, the controller 500 uses dead reckoning. Dead reckoning is the process of estimating a current position based upon a previously determined position, and advancing that position based upon known or estimated speeds over elapsed time, and course. By knowing a robot location in the working area 5 (e.g., via odometry, gyroscope, etc.) as well as a sensed location of one or more objects 12 in the working area 5 (via the sensor system 400), the controller 500 can assess a relatively higher confidence level of a location or movement of an object 12 on the occupancy map 1700 and in the working area 5 (versus without the use of odometry or a gyroscope).

Odometry based on wheel motion can be electrically noisy. The controller 500 may receive image data from the imaging sensor 450 of the environment or scene 10 about the robot 100 for computing robot motion, independently of wheel based odometry of the drive system 200, through visual odometry. Visual odometry may entail using optical flow to determine the motion of the imaging sensor 450. The controller 500 can use the calculated motion based on imaging data of the imaging sensor 450 for correcting any errors in the wheel based odometry, thus allowing for improved mapping and motion control. Visual odometry may have limitations with low-texture or low-light scenes 10, if the imaging sensor 450 cannot track features within the captured image(s).

Other details and features on odometry and imaging systems, which may combinable with those described herein, can be found in U.S. Pat. No. 7,158,317 (describing a "depth-of field" imaging system), and U.S. Pat. No. 7,115,849 (describing wavefront coding interference contrast imaging systems), the contents of which are hereby incorporated by reference in their entireties.

When a robot is new to a building that it will be working in, the robot may need to be shown around or provided with a map of the building (e.g., room and hallway locations) for autonomous navigation. For example, in a hospital, the robot may need to know the location of each patient room, nursing stations, etc. In some implementations, the robot 100 receives a layout map 1810, such as the one shown in FIG. 18A, and can be trained to learn the layout map 1810. For example, while leading the robot 100 around the building, the robot 100 may record specific locations corresponding to locations on the layout map 1810. The robot 100 may display the layout map 1810 on the web pad 310 and when the user takes the robot 100 to a specific location, the user can tag that location on the layout map 1810 (e.g., using a touch screen or other pointing device of the web pads 310). The user may choose to enter a label for a tagged location, like a room name or a room number. At the time of tagging, the robot 100 may store the tag, with a point on the layout map 1810 and a corresponding point on a robot map 1220, such as the one shown in FIG. 12D.

Using the sensor system 400, the robot 100 may build the robot map 1820 as it moves around. For example, the sensor system 400 can provide information on how far the robot 100 has moved and a direction of travel. The robot map 1820 may include fixed obstacles in addition to the walls provided in the layout map 1810. The robot 100 may use the robot map 1820 to execute autonomous navigation. In the robot map at 1820, the "walls" may not look perfectly straight, for example, due to detected packing creates along the wall in the corresponding hallway and/or furniture detected inside various cubicles. Moreover, rotational and resolution differences may exist between the layout map 1810 and the robot map 1820.

After map training, when a user wants to send the robot 100 to a location, the user can either refer to a label/tag (e.g., enter a label or tag into a location text box displayed on the web pad 310) or the robot 100 can display the layout map 1810 to the user on the web pad 310 and the user may select the location on the layout map 1810. If the user selects a tagged layout map location, the robot 100 can easily determine the location on the robot map 1820 that corresponds to the selected location on the layout map 1810 and can proceed to navigate to the selected location.

If the selected location on the layout map 1810 is not a tagged location, the robot 100 determines a corresponding location on the robot map 1820. In some implementations, the robot 100 computes a scaling size, origin mapping, and rotation between the layout map 1810 and the robot map 1820 using existing tagged locations, and then applies the computed parameters to determine the robot map location (e.g., using an affine transformation or coordinates).

The robot map 1820 may not be the same orientation and scale as the layout map 1810. Moreover, the layout map may not be to scale and may have distortions that vary by map area. For example, a layout map 1810 created by scanning a fire evacuation map typically seen in hotels, offices, and hospitals is usually not to drawn scale and can even have different scales in different regions of the map. The robot map 1820 may have its own distortions. For example, locations on the robot map 1820 may been computed by counting wheel turns as a measure of distance, and if the floor was slightly slippery or turning of corners caused extra wheel, inaccurate rotation calculations may cause the robot 100 to determine inaccurate locations of mapped objects.

A method of mapping a given point 1814 on the layout map 1810 to a corresponding point 1824 on the robot map 1820 may include using existing tagged 1812 points to compute a local distortion between the layout map 1810 and the robot map 1820 in a region (e.g., within a threshold radius) containing the layout map point. The method further includes applying a distortion calculation to the layout map point 1814 in order to find a corresponding robot map point 1824. The reverse can be done if you are starting with a given point on the robot map 1820 and want to find a corresponding point on the layout map 1810, for example, for asking the robot for its current location.

Figure 18B:
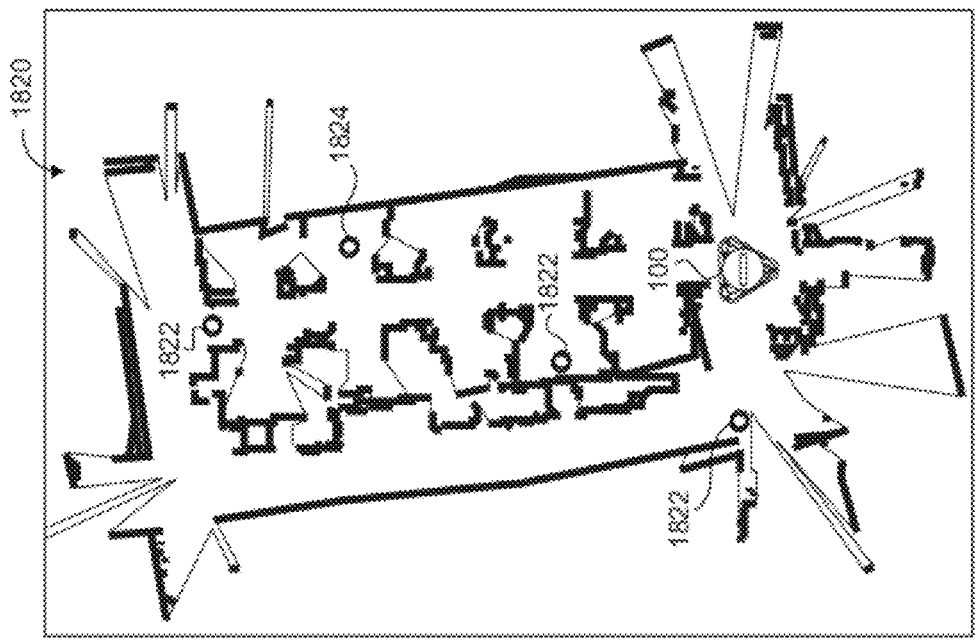
FIG. 18B is a schematic view of an exemplary robot map corresponding to the layout map shown in FIG. 18A.
Figure 18A:
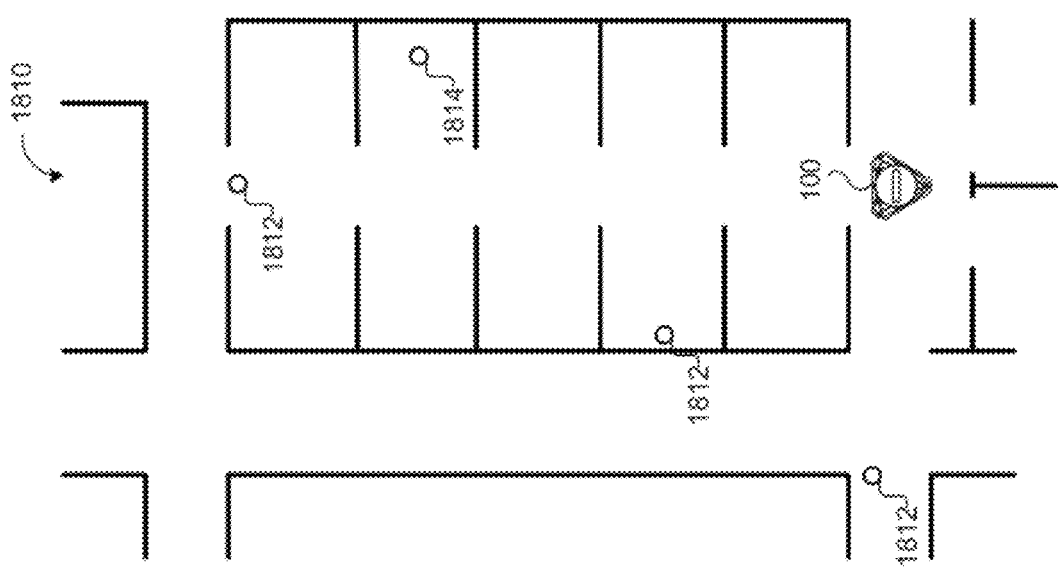
FIG. 18A is a schematic view of an exemplary layout map.
Figure 18C:
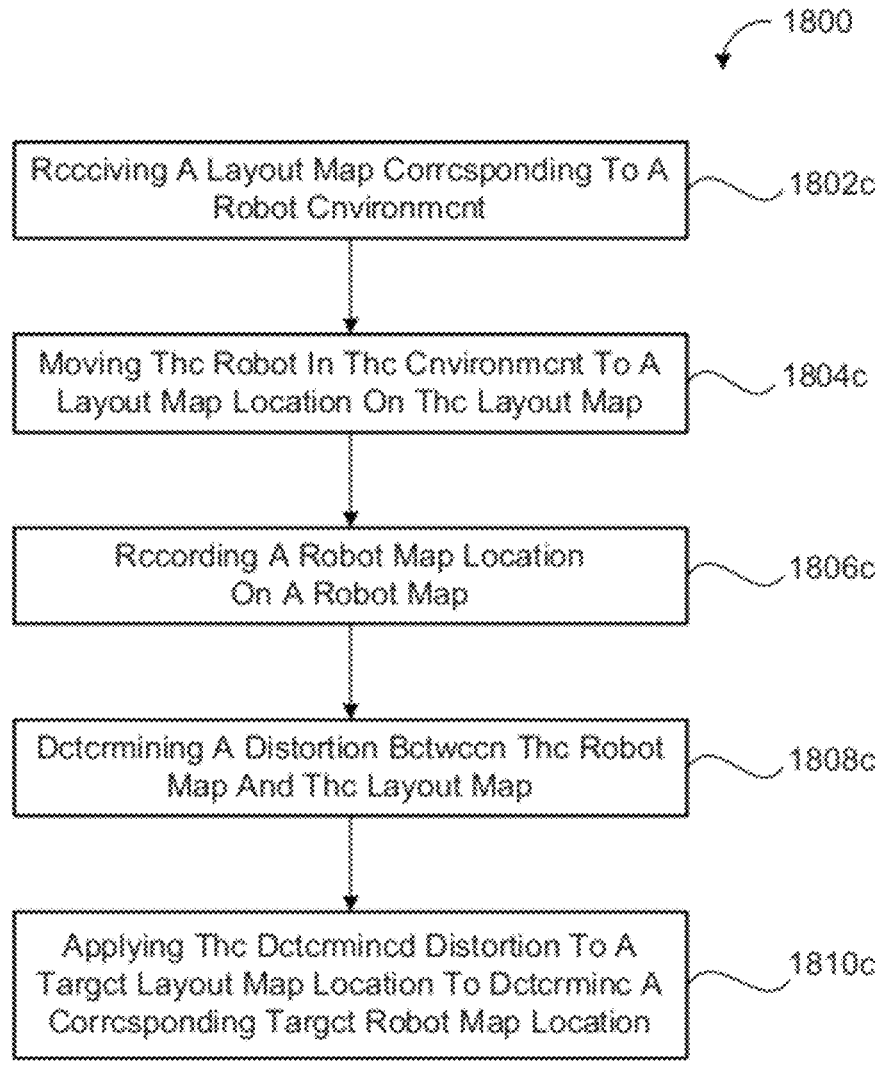
FIG. 18C provide an exemplary arrangement of operations for operating a mobile robot to navigate about an environment using a layout map and a robot map.

FIG. 18C provide an exemplary arrangement 1800 of operations for operating the robot 100 to navigate about an environment using the layout map 1810 and the robot map 1820. With reference to FIGS. 18B and 18C, the operations include receiving 1802c a layout map 1810 corresponding to an environment of the robot 100, moving 1804c the robot 100 in the environment to a layout map location 1812 on the layout map 1810, recording 1806c a robot map location 1822 on a robot map 1820 corresponding to the environment and produced by the robot 100, determining 1808c a distortion between the robot map 1820 and the layout map 1810 using the recorded robot map locations 1822 and the corresponding layout map locations 1812, and applying 1810c the determined distortion to a target layout map location 1814 to determine a corresponding target robot map location 1824, thus allowing the robot to navigate to the selected location 1814 on the layout map 1810. In some implementations it operations include determining a scaling size, origin mapping, and rotation between the layout map and the robot map using existing tagged locations and resolving a robot map location corresponding to the selected layout map location 1814. The operations may include applying an affine transformation to the determined scaling size, origin mapping, and rotation to resolve the robot map location.

Figure 19B:
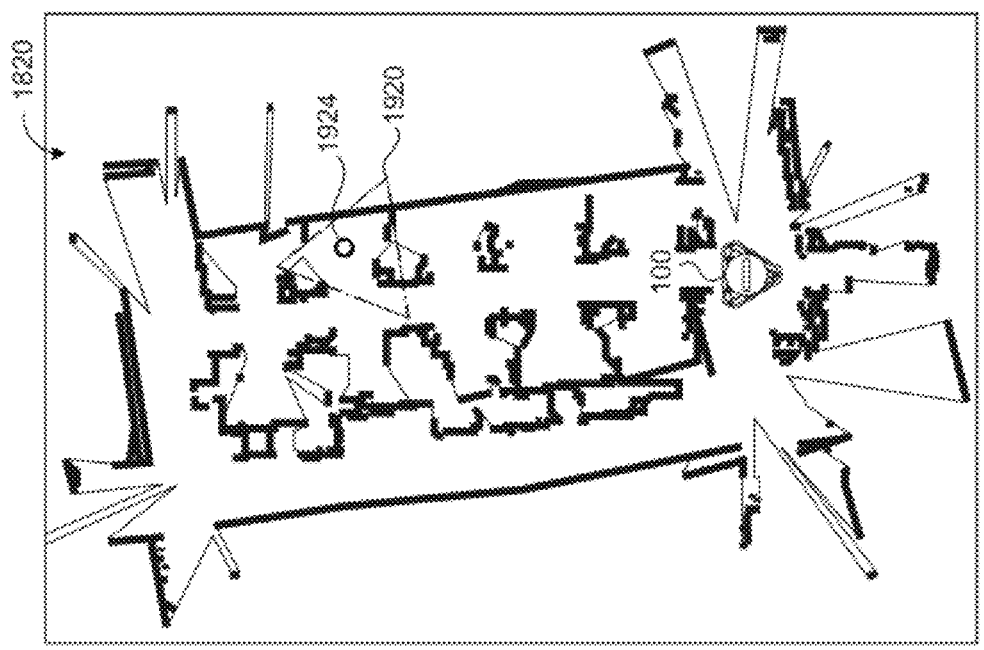
FIG. 19B is a schematic view of an exemplary robot map corresponding to the layout map shown in FIG. 19A.
Figure 19A:
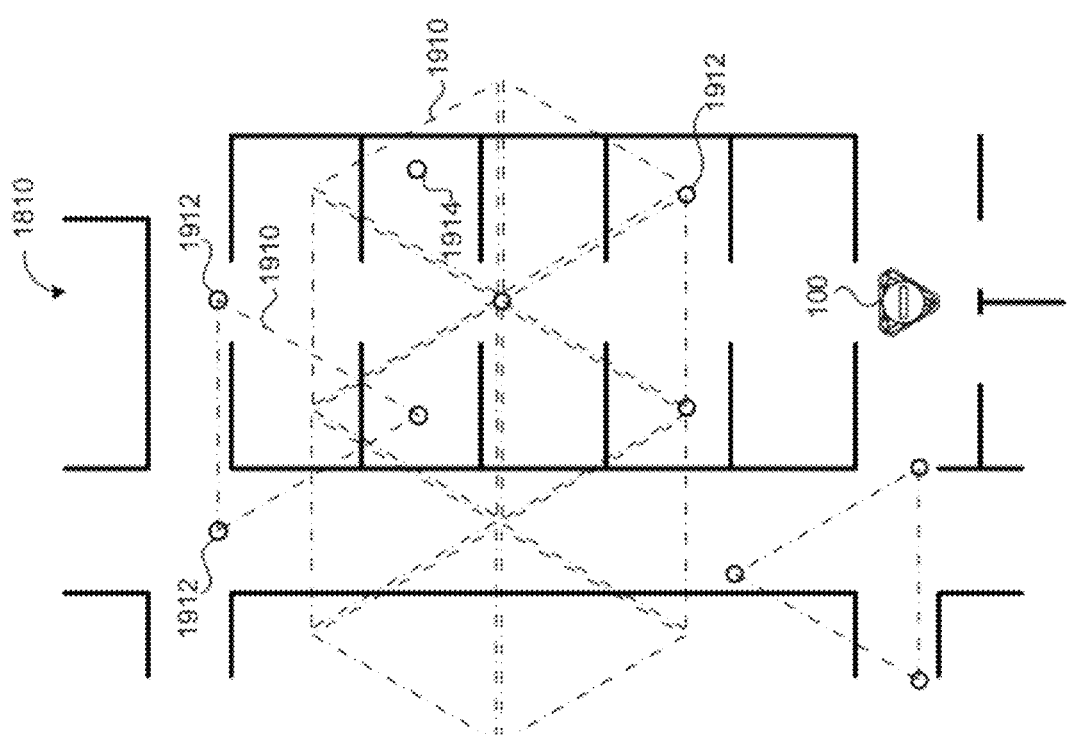
FIG. 19A is a schematic view of an exemplary layout map with triangulation of type layout points.
Figure 19C:
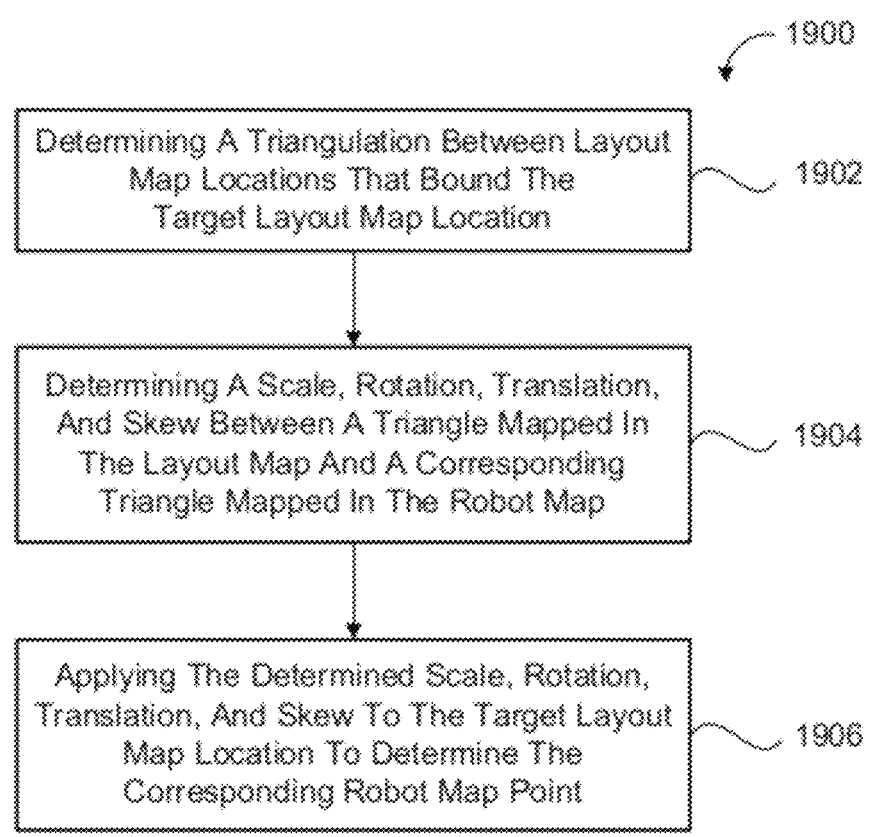
FIG. 19C provide an exemplary arrangement of operations for determining a target robot map location using a layout map and a robot map.

Referring to FIGS. 19A-19C, in some implementations, the method includes using tagged layout map points 1912 (also referred to recorded layout map locations) to derive a triangulation of an area inside a bounding shape containing the tagged layout map points 1912, such that all areas of the layout map 1810 are covered by at least one triangle 1910 whose vertices are at a tagged layout map points 1912. The method further includes finding the triangle 1910 that contains the selected layout map point 1914 and determining a scale, rotation, translation, and skew between the triangle 1910 mapped in the layout map 1810 and a corresponding triangle 1920 mapped in the robot map 1820 (i.e., the robot map triangle with the same tagged vertices). The method includes applying the determined scale, rotation, translation, and skew to the selected layout map point 1914 in order to find a corresponding robot map point 1924.

FIG. 19C provide an exemplary arrangement 1900 of operations for determining the target robot map location 1924. The operations include determining 1902 a triangulation between layout map locations that bound the target layout map location, determining 1904 a scale, rotation, translation, and skew between a triangle mapped in the layout map and a corresponding triangle mapped in the robot map and applying 1906 the determined scale, rotation, translation, and skew to the target layout map location to determine the corresponding robot map point.

Figure 20B:
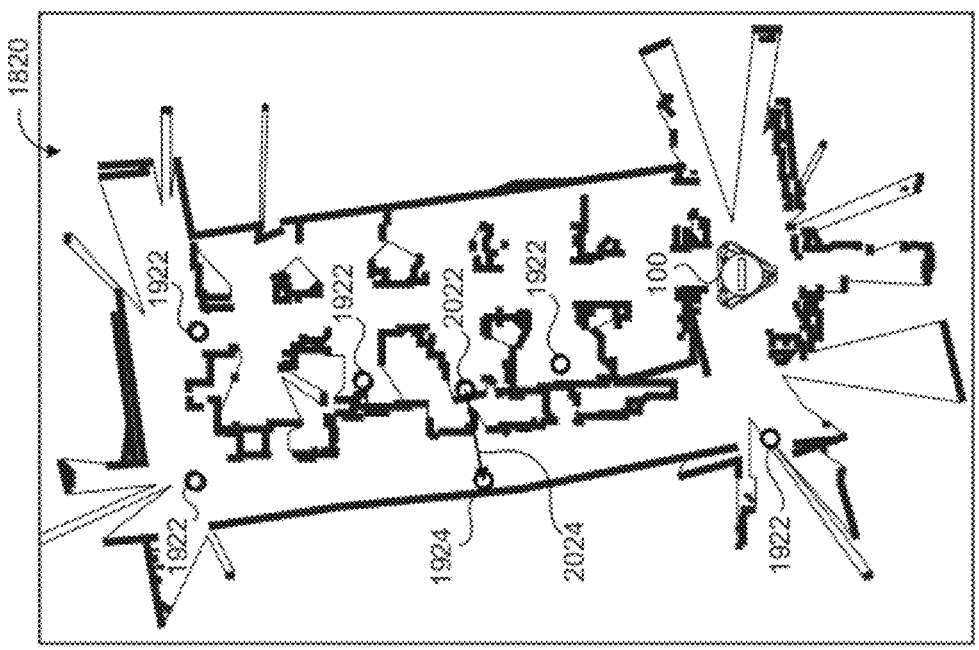
FIG. 20B is a schematic view of an exemplary robot map corresponding to the layout map shown in FIG. 20A.
Figure 20A:
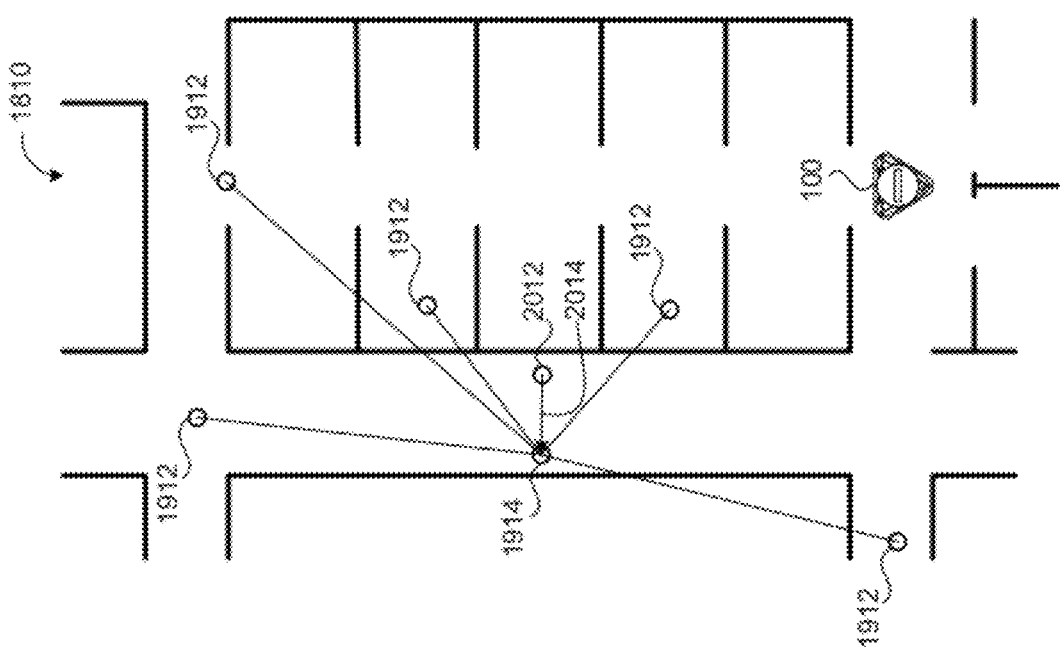
FIG. 20A is a schematic view of an exemplary layout map with a centroid of tight layout points.

Referring to FIGS. 20A and 20B, in another example, the method includes determining the distances of all tagged points 1912 in the layout map 1810 to the selected layout map point 1914 and determining a centroid 2012 of the layout map tagged points 1912. The method also includes determining a centroid 2022 of all tagged points 1922 on the robot map 1820. For each tagged layout map point 1912, the method includes determining a rotation and a length scaling needed to transform a vector 2014 that runs from the layout map centroid 2012 to the selected layout point 1914 into a vector 2024 that runs from the robot map centroid 2022 to the robot map point 1924. Using this data, the method further includes determining an average rotation and scale. For each tagged layout map point 1912, the method further includes determining an "ideal robot map coordinate" point 1924i by applying the centroid translations, the average rotation, and the average scale to the selected layout map point 1914. Moreover, for each tagged layout map point 1912, the method includes determining a distance from that layout map point 1912 to the selected layout map point 1914 and sorting the tagged layout map points 1912 by these distances, shortest distance to longest. The method includes determining an "influence factor" for each tagged layout map point 1912, using either the inverse square of the distance between each tagged layout map point 1912 and the selected layout map point 1914. Then for each tagged layout map point 1912, the method includes determining a vector which is the difference between the "ideal robot map coordinate" point 1924i and robot map point 1924, prorated by using the influence factors of the tagged layout map points 1912. The method includes summing the prorated vectors and adding them to "ideal robot map coordinate" point 1924i for the selected layout map point 1914. The result is the corresponding robot map point 1924 on the robot map 1820. In some examples, this method/algorithm includes only the closest N tagged layout map point 1912 rather than all tagged layout map point 1912.

Figure 20C:
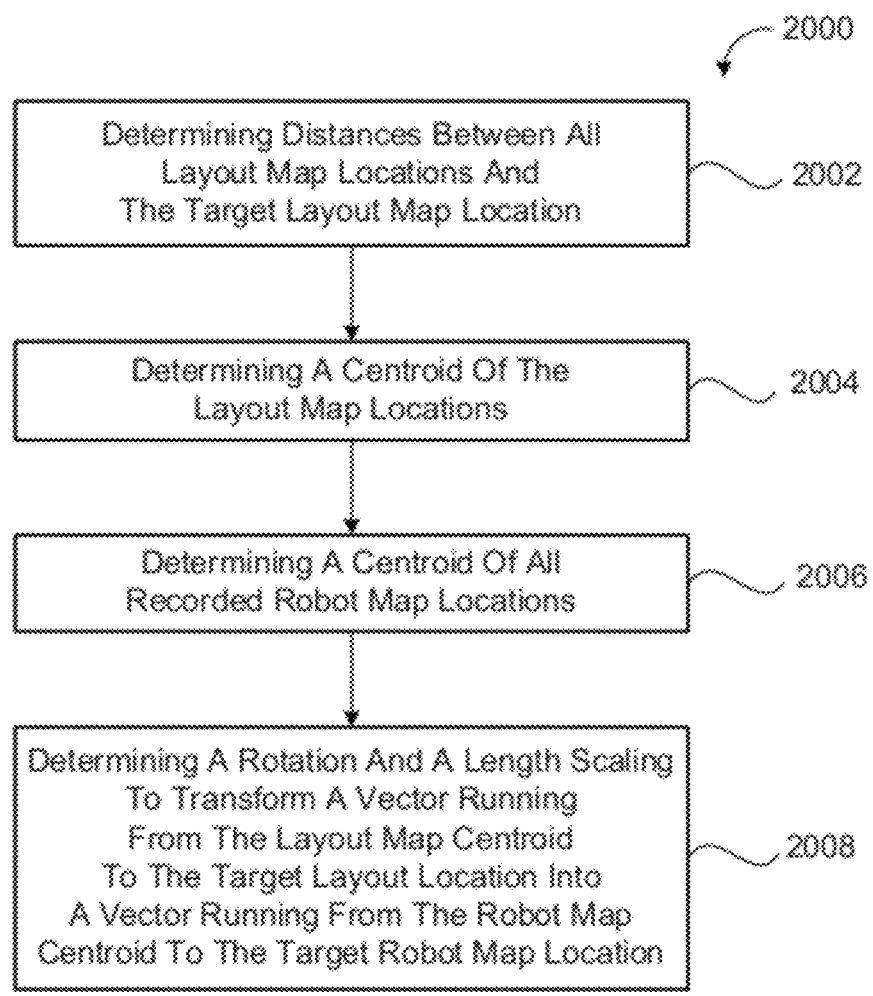
FIG. 20C provide an exemplary arrangement of operations for determining a target robot map location using a layout map and a robot map.

FIG. 20C provide an exemplary arrangement 2000 of operations for determining a target robot map location 1924 using the layout map 1810 and the robot map 1820. The operations include determining 2002 distances between all layout map locations and the target layout map location, determining 2004 a centroid of the layout map locations, determining 2006 a centroid of all recorded robot map locations, and for each layout map location, determining 2006 a rotation and a length scaling to transform a vector running from the layout map centroid to the target layout location into a vector running from the robot map centroid to the target robot map location.

Figure 21A:
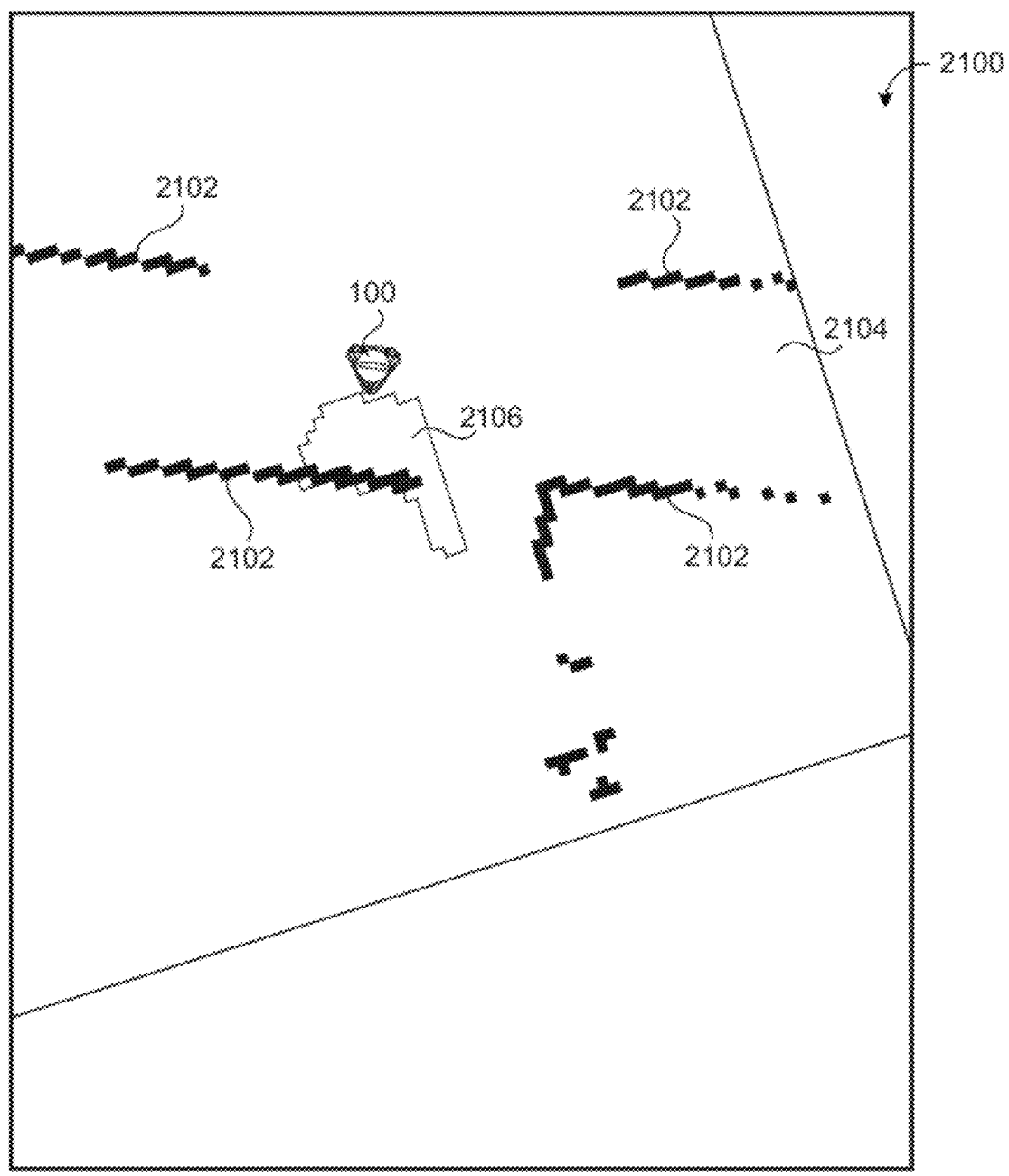
FIG. 21A provides an exemplary schematic view of the local perceptual space of a mobile human interface robot while stationary.

Referring to FIGS. 10A and 21A-21D, in some implementations, the robot 100 (e.g., the control system 510 shown in FIG. 22) classifies its local perceptual space into three categories: obstacles (black) 2102, unknown (gray) 2104, and known free (white) 2106. Obstacles 2102 are observed (i.e., sensed) points above the ground G that are below a height of the robot 100 and observed points below the ground G (e.g., holes, steps down, etc.). Known free 2106 corresponds to areas where the 3-D image sensors 450 can see the ground G. Data from all sensors in the sensor system 400 can be combined into a discretized 3-D voxel grid. The 3-D grid can then be analyzed and converted into a 2-D grid 2100 with the three local perceptual space classifications. FIG. 21A provides an exemplary schematic view of the local perceptual space of the robot 100 while stationary. The information in the 3-D voxel grid has persistence, but decays over time if it is not reinforced. When the robot 100 is moving, it has more known free area 2106 to navigate in because of persistence.

Figure 21B:
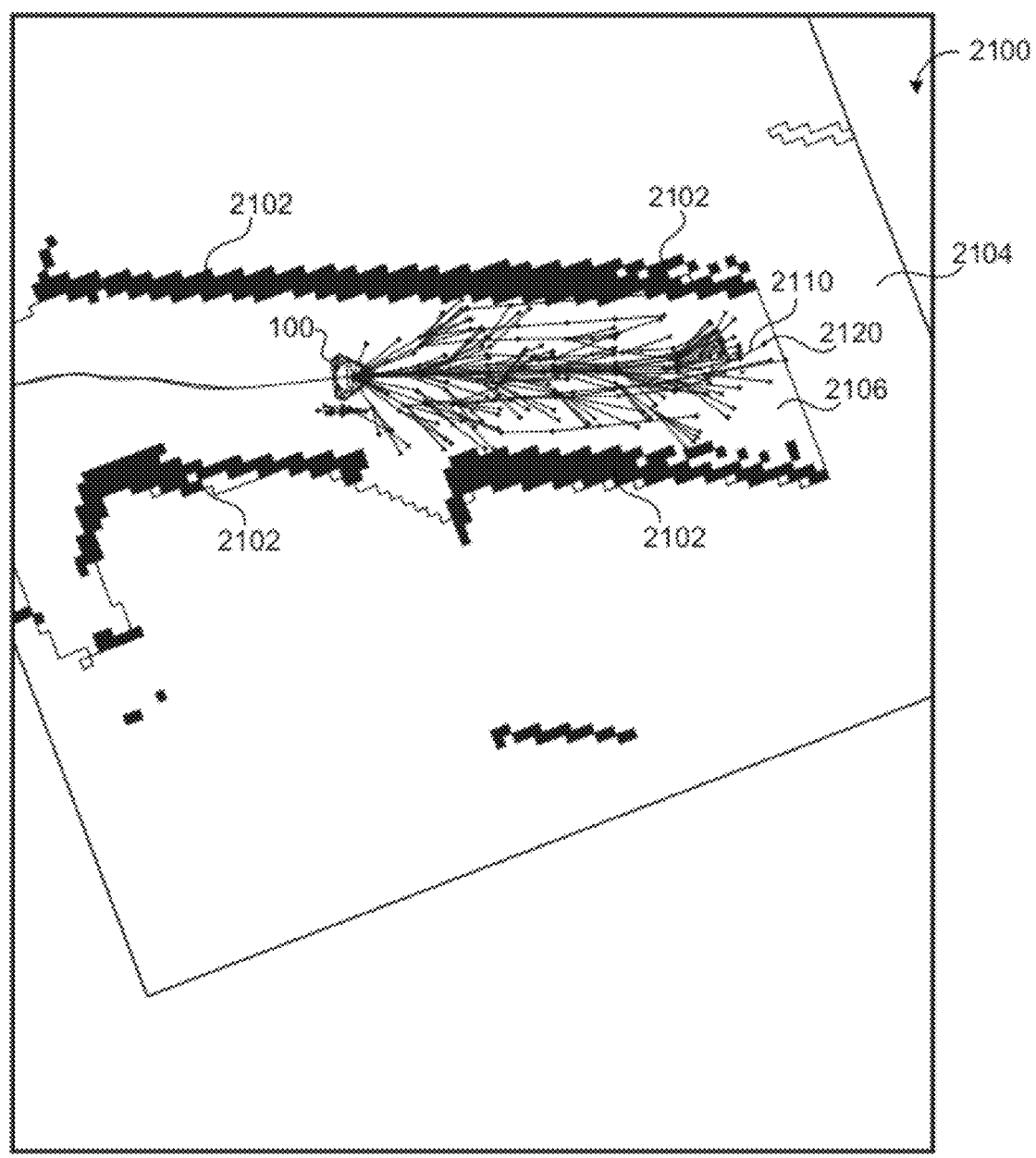
FIG. 21B provides an exemplary schematic view of the local perceptual space of a mobile human interface robot while moving.

An object detection obstacle avoidance (ODOA) navigation strategy for the control system 510 may include either accepting or rejecting potential robot positions that would result from commands. Potential robot paths 2110 can be generated many levels deep with different commands and resulting robot positions at each level. FIG. 21B provides an exemplary schematic view of the local perceptual space of the robot 100 while moving. An ODOA behavior 600b (FIG. 22) can evaluate each predicted robot path 2110. These evaluations can be used by the action selection engine 580 to determine a preferred outcome and a corresponding robot command. For example, for each robot position 2120 in the robot path 2110, the ODOA behavior 600b can execute a method for object detection and obstacle avoidance that includes identifying each cell in the grid 2100 that is in a bounding box around a corresponding position of the robot 100, receiving a classification of each cell. For each cell classified as an obstacle or unknown, retrieving a grid point corresponding to the cell and executing a collision check by determining if the grid point is within a collision circle about a location of the robot 100. If the grid point is within the collision circle, the method further includes executing a triangle test of whether the grid point is within a collision triangle (e.g., the robot 100 can be modeled as triangle). If the grid point is within the collision triangle, the method includes rejecting the grid point. If the robot position is inside of a sensor system field of view of parent grid points on the robot path 2110, then the "unknown" grid points are ignored because it is assumed that by the time the robot 100 reaches those grid points, it will be known.

The method may include determining whether any obstacle collisions are present within a robot path area (e.g., as modeled by a rectangle) between successive robot positions 2120 in the robot path 2110, to prevent robot collisions during the transition from one robot position 2120 to the next.

Figure 21C:
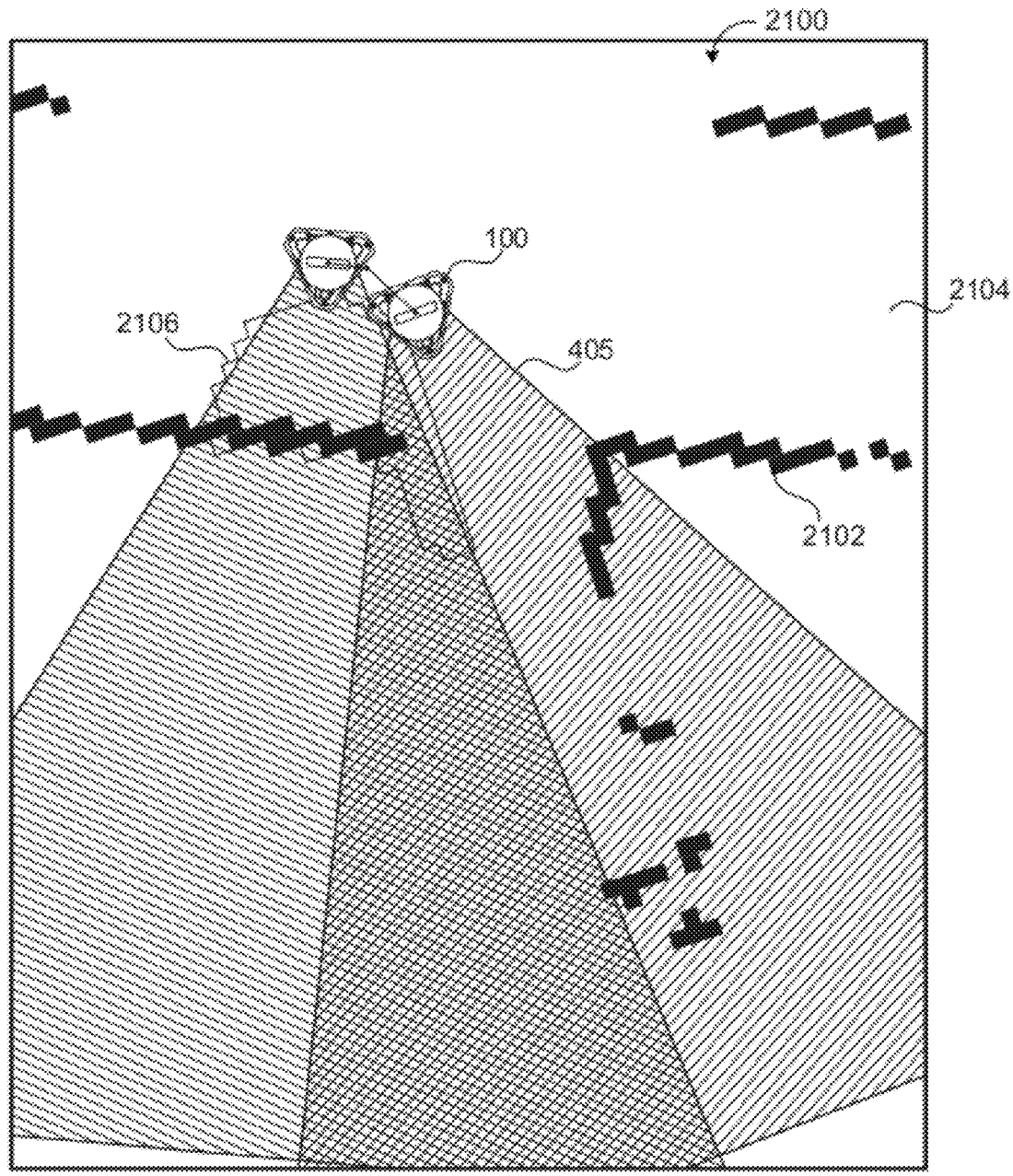
FIG. 21C provides an exemplary schematic view of the local perceptual space of a mobile human interface robot while stationary.

FIG. 21C provides a schematic view of the local perceptual space of the robot 100 and a sensor system field of view 405 (the control system 510 may use only certain sensor, such as the first and second 3-D image sensors 450a, 450b, for robot path determination). Taking advantage of the holonomic mobility of the drive system 200, the robot 100 can use the persistence of the known ground G to allow it to drive in directions where the sensor system field of view 405 does not actively cover. For example, if the robot 100 has been sitting still with the first and second 3-D image sensors 450a, 450b pointing forward, although the robot 100 is capable of driving sideways, the control system 510 will reject the proposed move, because the robot 100 does not know what is to its side, as illustrated in the example shown in FIG. 21C, which shows an unknown classified area to the side of the robot 100. If the robot 100 is driving forward with the first and second 3-D image sensors 450a, 450b pointing forward, then the ground G next to the robot 100 may be classified as known free 2106, because both the first and second 3-D image sensors 450a, 450b can view the ground G as free as the robot 100 drives forward and persistence of the classification has not decayed yet. (See e.g., FIG. 21B.) In such situations the robot 100 can drive sideways.

Figure 21D:
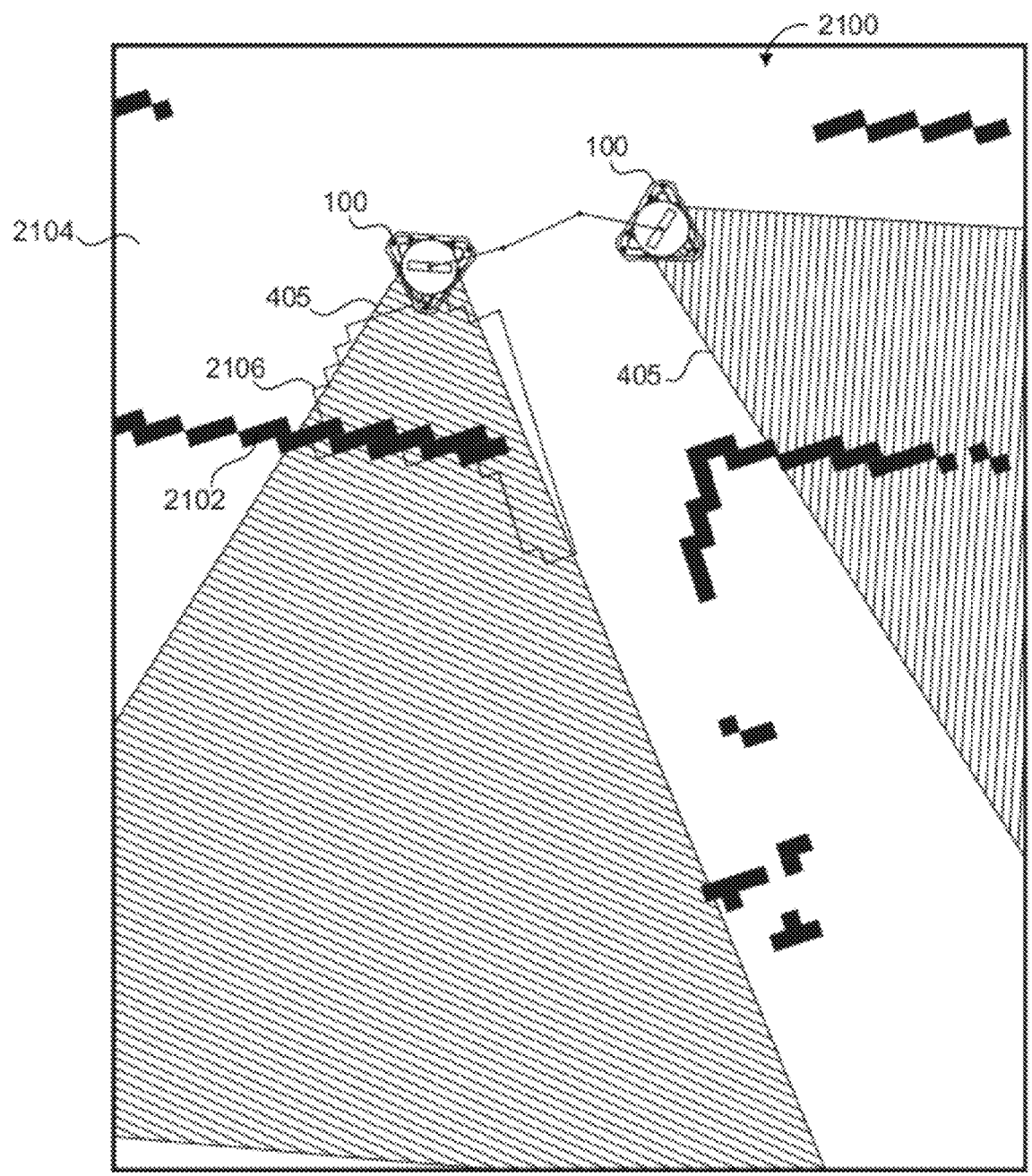
FIG. 21D provides an exemplary schematic view of the local perceptual space of a mobile human interface robot while moving.

Referring to FIG. 21D, in some examples, given a large number of possible trajectories with holonomic mobility, the ODOA behavior 600b may cause robot to choose trajectories where it will (although not currently) see where it is going. For example, the robot 100 can anticipate the sensor field of view orientations that will allow the control system 510 to detect objects. Since the robot can rotate while translating, the robot can increase the sensor field of view 405 while driving.

Figure 21E:
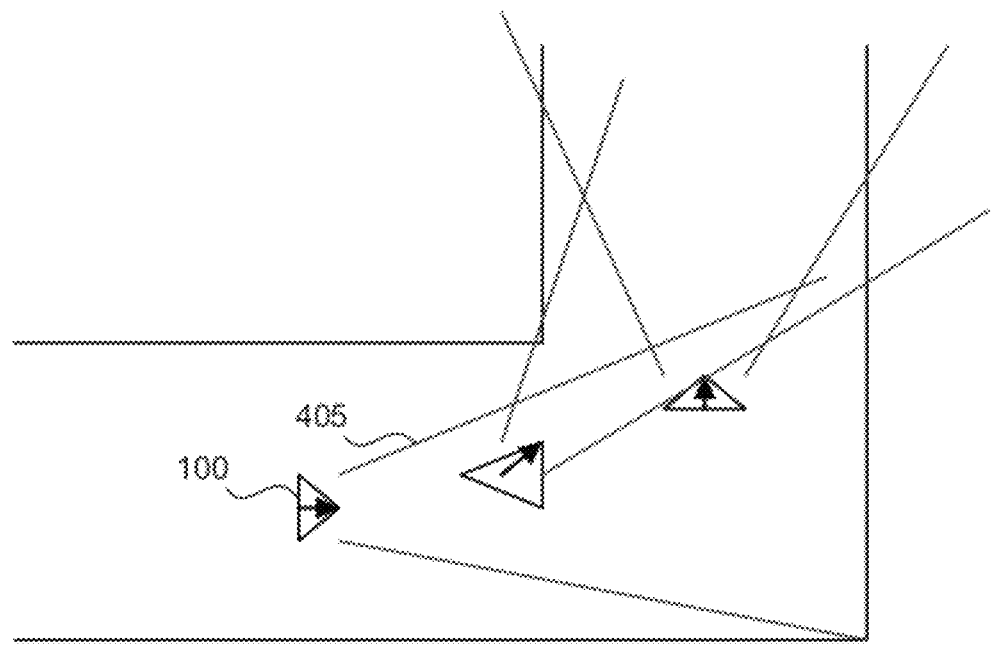
FIG. 21E provides an exemplary schematic view of a mobile human interface robot with the corresponding sensory field of view moving closely around a corner.
Figure 21F:
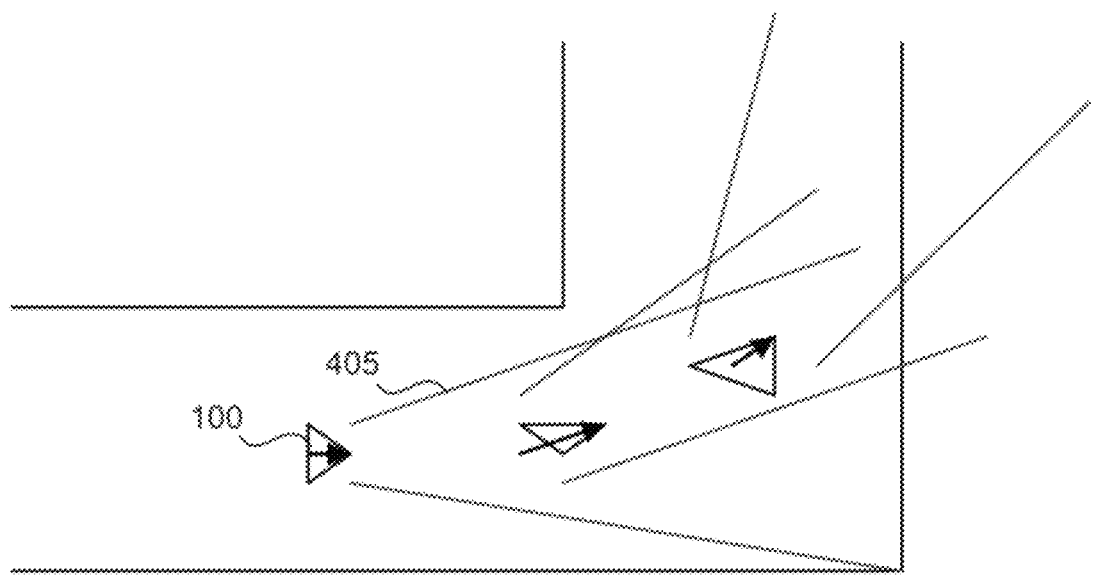
FIG. 21F provides an exemplary schematic view of a mobile human interface robot with the corresponding sensory field of view moving widely around a corner.

By understanding the field of view 405 of the sensor system 400 and what it will see at different positions, the robot 100 can select movement trajectories that help it to see where it is going. For example, when turning a corner, the robot 100 may reject trajectories that make a hard turn around the corner because the robot 100 may end up in a robot position 2120 that is not sensor system field of view 405 of a parent robot position 2120 and of which it currently has no knowledge of, as shown in FIG. 21E. Instead, the robot 100 may select a movement trajectory that turns to face a desired direction of motion early and use the holonomic mobility of the drive system 200 to move sideways and then straight around the corner, as shown in FIG. 21F.

Figure 22:
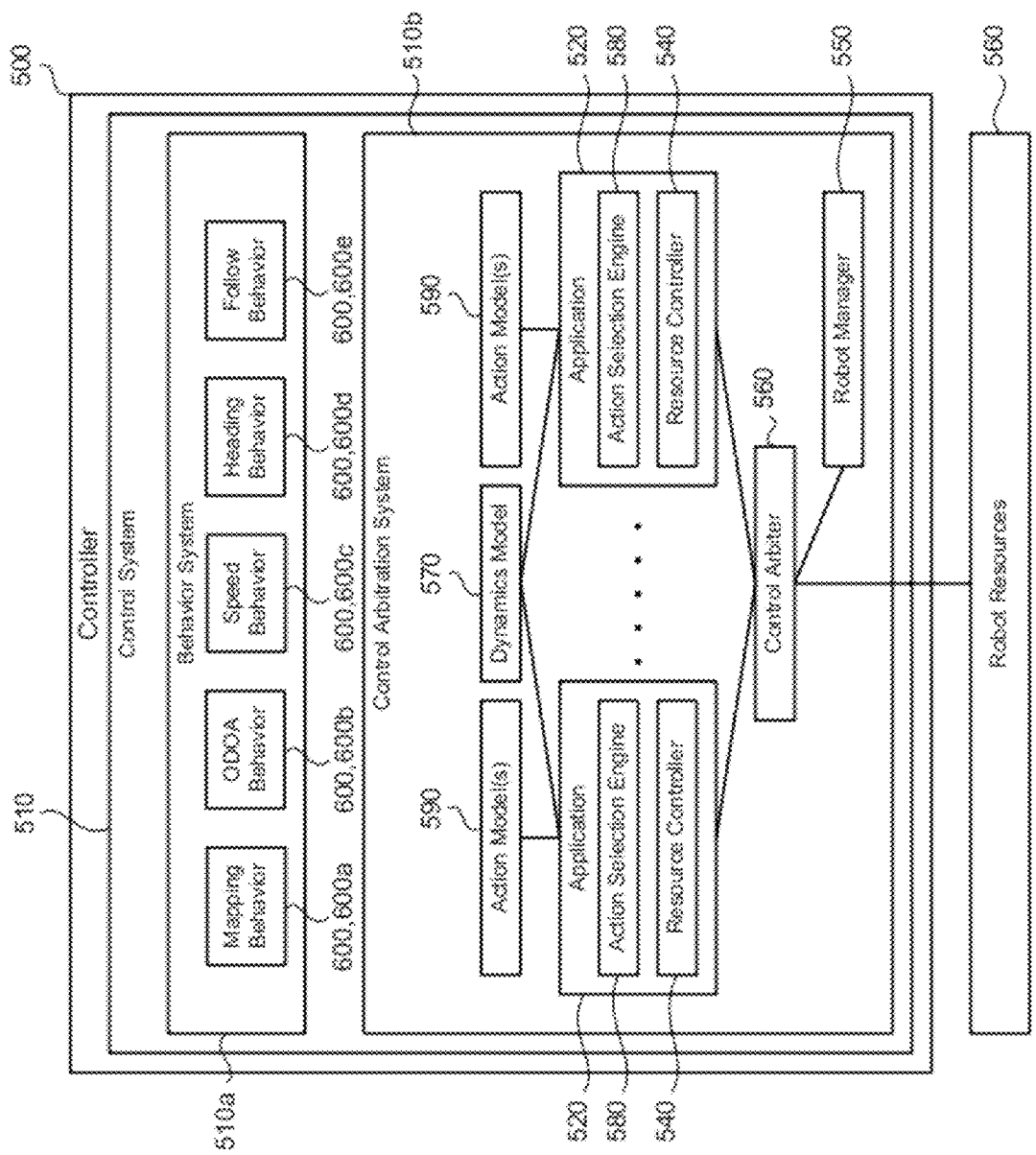
FIG. 22 is a schematic view of an exemplary control system executed by a controller of a mobile human interface robot.

Referring to FIG. 22, in some implementations, the controller 500 executes a control system 510, which includes a control arbitration system 510a and a behavior system 510b in communication with each other. The control arbitration system 510a allows applications 520 to be dynamically added and removed from the control system 510, and facilitates allowing applications 520 to each control the robot 100 without needing to know about any other applications 520. In other words, the control arbitration system 510a provides a simple prioritized control mechanism between applications 520 and resources 530 of the robot 100. The resources 530 may include the drive system 200, the sensor system 400, and/or any payloads or controllable devices in communication with the controller 500.

The applications 520 can be stored in memory of or communicated to the robot 100, to run concurrently on (e.g., a processor) and simultaneously control the robot 100. The applications 520 may access behaviors 600 of the behavior system 510b. The independently deployed applications 520 are combined dynamically at runtime and to share robot resources 530 (e.g., drive system 200, arm(s), head(s), etc.) of the robot 100. A low-level policy is implemented for dynamically sharing the robot resources 530 among the applications 520 at run-time. The policy determines which application 520 has control of the robot resources 530 required by that application 520 (e.g. a priority hierarchy among the applications 520). Applications 520 can start and stop dynamically and run completely independently of each other. The control system 510 also allows for complex behaviors 600 which can be combined together to assist each other.

The control arbitration system 510a includes one or more resource controllers 540, a robot manager 550, and one or more control arbiters 560. These components do not need to be in a common process or computer, and do not need to be started in any particular order. The resource controller 540 component provides an interface to the control arbitration system 510a for applications 520. There is an instance of this component for every application 520. The resource controller 540 abstracts and encapsulates away the complexities of authentication, distributed resource control arbiters, command buffering, and the like. The robot manager 550 coordinates the prioritization of applications 520, by controlling which application 520 has exclusive control of any of the robot resources 530 at any particular time. Since this is the central coordinator of information, there is only one instance of the robot manager 550 per robot. The robot manager 550 implements a priority policy, which has a linear prioritized order of the resource controllers 540, and keeps track of the resource control arbiters 560 that provide hardware control. The control arbiter 560 receives the commands from every application 520 and generates a single command based on the applications' priorities and publishes it for its associated resources 530. The control arbiter 560 also receives state feedback from its associated resources 530 and sends it back up to the applications 520. The robot resources 530 may be a network of functional modules (e.g. actuators, drive systems, and groups thereof) with one or more hardware controllers. The commands of the control arbiter 560 are specific to the resource 530 to carry out specific actions.

A dynamics model 570 executable on the controller 500 can be configured to compute the center for gravity (CG), moments of inertia, and cross products of inertia of various portions of the robot 100 for the assessing a current robot state. The dynamics model 570 may also model the shapes, weight, and/or moments of inertia of these components. In some examples, the dynamics model 570 communicates with an inertial moment unit 470 (IMU) or portions of one (e.g., accelerometers and/or gyros) disposed on the robot 100 and in communication with the controller 500 for calculating the various center of gravities of the robot 100. The dynamics model 570 can be used by the controller 500, along with other programs 520 or behaviors 600 to determine operating envelopes of the robot 100 and its components.

Each application 520 has an action selection engine 580 and a resource controller 540, one or more behaviors 600 connected to the action selection engine 580, and one or more action models 590 connected to action selection engine 580. The behavior system 510b provides predictive modeling and allows the behaviors 600 to collaboratively decide on the robot's actions by evaluating possible outcomes of robot actions. In some examples, a behavior 600 is a plug-in component that provides a hierarchical, state-full evaluation function that couples sensory feedback from multiple sources with a-priori limits and information into evaluation feedback on the allowable actions of the robot. Since the behaviors 600 are pluggable into the application 520 (e.g., residing inside or outside of the application 520), they can be removed and added without having to modify the application 520 or any other part of the control system 510. Each behavior 600 is a standalone policy. To make behaviors 600 more powerful, it is possible to attach the output of multiple behaviors 600 together into the input of another so that you can have complex combination functions. The behaviors 600 are intended to implement manageable portions of the total cognizance of the robot 100.

The action selection engine 580 is the coordinating element of the control system 510 and runs a fast, optimized action selection cycle (prediction/correction cycle) searching for the best action given the inputs of all the behaviors 600. The action selection engine 580 has three phases: nomination, action selection search, and completion. In the nomination phase, each behavior 600 is notified that the action selection cycle has started and is provided with the cycle start time, the current state, and limits of the robot actuator space. Based on internal policy or external input, each behavior 600 decides whether or not it wants to participate in this action selection cycle. During this phase, a list of active behavior primitives is generated whose input will affect the selection of the commands to be executed on the robot 100.

In the action selection search phase, the action selection engine 580 generates feasible outcomes from the space of available actions, also referred to as the action space. The action selection engine 580 uses the action models 590 to provide a pool of feasible commands (within limits) and corresponding outcomes as a result of simulating the action of each command at different time steps with a time horizon in the future. The action selection engine 580 calculates a preferred outcome, based on the outcome evaluations of the behaviors 600, and sends the corresponding command to the control arbitration system 510a and notifies the action model 590 of the chosen command as feedback.

In the completion phase, the commands that correspond to a collaborative best scored outcome are combined together as an overall command, which is presented to the resource controller 540 for execution on the robot resources 530. The best outcome is provided as feedback to the active behaviors 600, to be used in future evaluation cycles.

Received sensor signals from the sensor system 400 can cause interactions with one or more behaviors 600 to execute actions. For example, using the control system 510, the controller 500 selects an action (or move command) for each robotic component (e.g., motor or actuator) from a corresponding action space (e.g., a collection of possible actions or moves for that particular component) to effectuate a coordinated move of each robotic component in an efficient manner that avoids collisions with itself and any objects about the robot 100, which the robot 100 is aware of. The controller 500 can issue a coordinated command over robot network, such as the EtherIO network.

The control system 510 may provide adaptive speed/acceleration of the drive system 200 (e.g., via one or more behaviors 600) in order to maximize stability of the robot 100 in different configurations/positions as the robot 100 maneuvers about an area.

In some implementations, the controller 500 issues commands to the drive system 200 that propels the robot 100 according to a heading setting and a speed setting. One or behaviors 600 may use signals received from the sensor system 400 to evaluate predicted outcomes of feasible commands, one of which may be elected for execution (alone or in combination with other commands as an overall robot command) to deal with obstacles. For example, signals from the proximity sensors 410 may cause the control system 510 to change the commanded speed or heading of the robot 100. For instance, a signal from a proximity sensor 410 due to a nearby wall may result in the control system 510 issuing a command to slow down. In another instance, a collision signal from the contact sensor(s) due to an encounter with a chair may cause the control system 510 to issue a command to change heading. In other instances, the speed setting of the robot 100 may not be reduced in response to the contact sensor; and/or the heading setting of the robot 100 may not be altered in response to the proximity sensor 410.

The behavior system 510b may include a mapping behavior 600a for producing an occupancy map 1700 and/or a robot map 1820, a speed behavior 600c (e.g., a behavioral routine executable on a processor) configured to adjust the speed setting of the robot 100 and a heading behavior 600d configured to alter the heading setting of the robot 100. The speed and heading behaviors 600c, 600d may be configured to execute concurrently and mutually independently. For example, the speed behavior 600c may be configured to poll one of the sensors (e.g., the set(s) of proximity sensors 410, 420), and the heading behavior 600d may be configured to poll another sensor (e.g., the kinetic bump sensor).

Figure 23A:
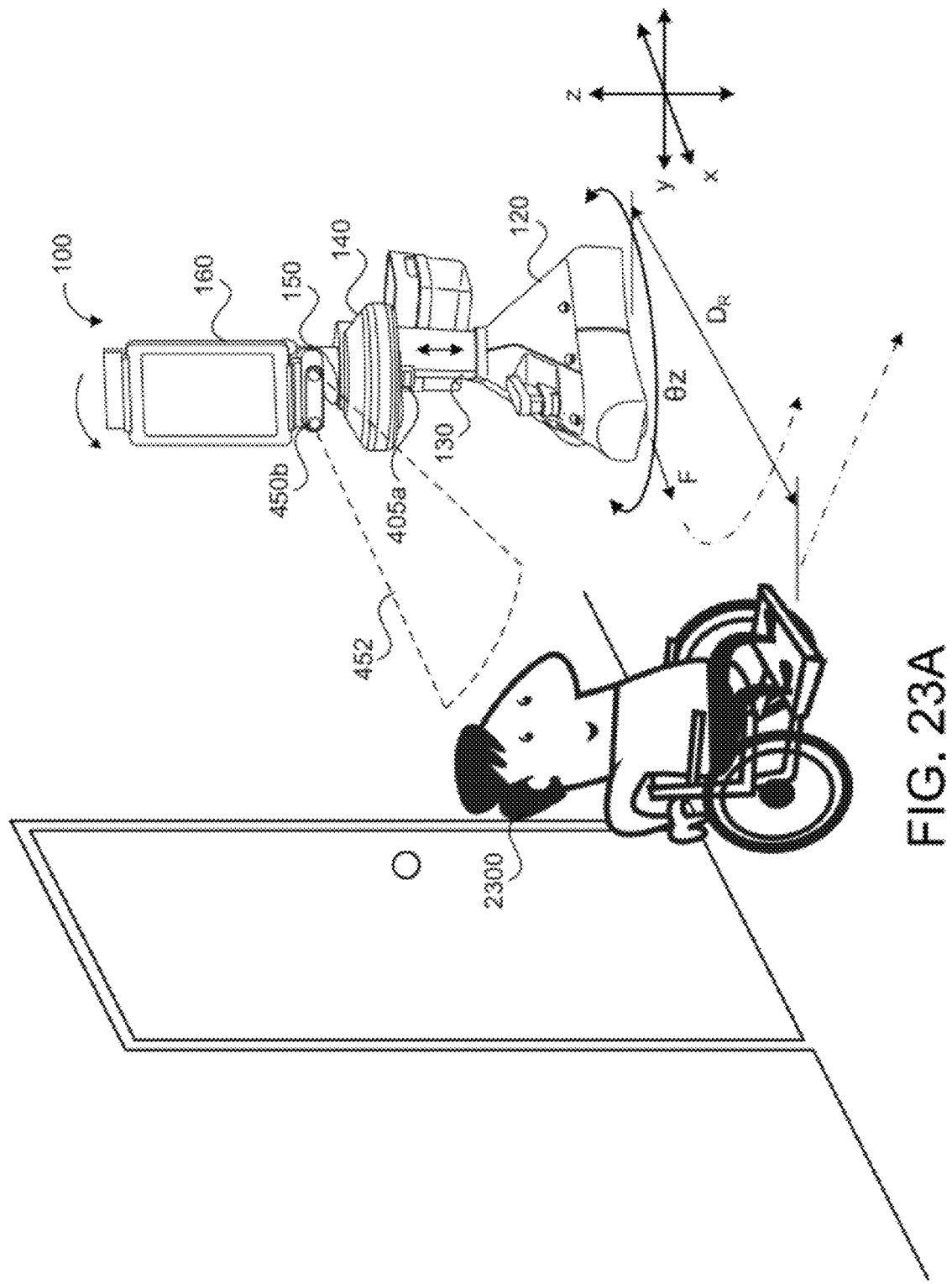
FIG. 23A is a perspective view of an exemplary mobile human interface robot maintaining a sensor field of view on a person.

Referring to FIG. 23A, in some implementations, the behavior system 510b includes a person follow behavior 600e. While executing this behavior 600e, the robot 100 may detect, track, and follow a person 2300. Since the robot 100 can pan and tilt the head 160 using the neck 150, the robot 100 can orient the second 3-D image sensor 450b to maintain a corresponding field of view 452 on the person 2300. Moreover, since the head 160 can move relatively more quickly than the base 120 (e.g., using the drive system 200), the head 160 (and the associated second 3-D image sensor 450b) can track the person 2300 more quickly than by turning the robot 100 in place. The robot 100 can drive toward the person 2300 to keep the person 2300 within a threshold distance range $D_R$ (e.g., corresponding to a sensor field of view). In some examples, the robot 100 turns to face forward toward the person/user 2300 while tracking the person 2300. The robot 100 may use velocity commands and/or waypoint commands to follow the person 2300.

Figure 23B:
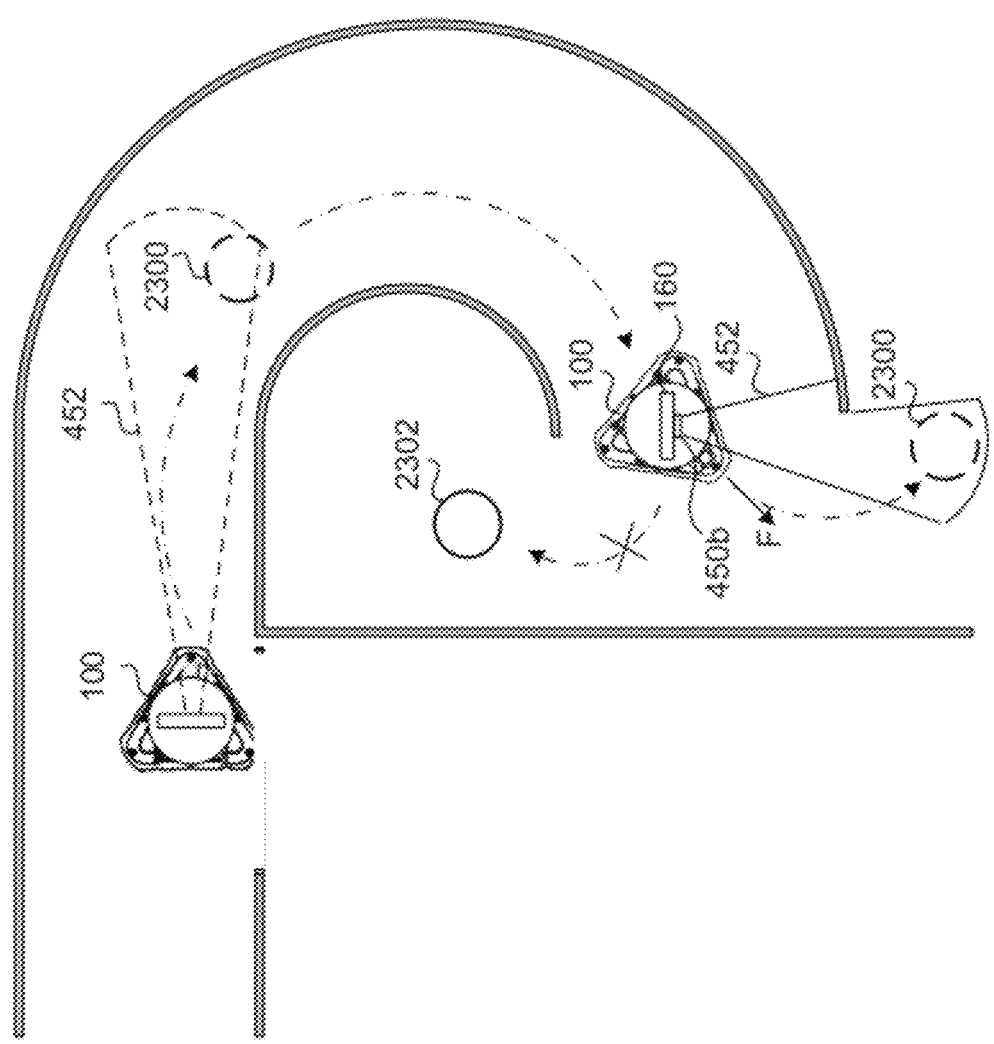
FIG. 23B is a schematic view of an exemplary mobile human interface robot following a person.

Referring to FIG. 23B, a naïve implementation of person following would result in the robot losing the location of the person 2300 once the person 2300 has left the field of view 152 of the second 3-D image sensor 450b. One example of this is when the person goes around a corner. To work around this problem, the robot 100 retains knowledge of the last known location of the person 2300 and its trajectory. Using this knowledge, the robot 100 can use a waypoint (or set of waypoints) to navigate to a location around the corner toward the person 2300. Moreover, as the robot 100 detects the person 2300 moving around the corner, the robot 100 can drive (in a holonomic manner) and/or move the second 3-D image sensor 450b (e.g., by panning and/or tilting the head 160) to orient the field of view 452 of the second 3-D image sensor 450b to regain viewing of the person 2300.

Figure 24A:
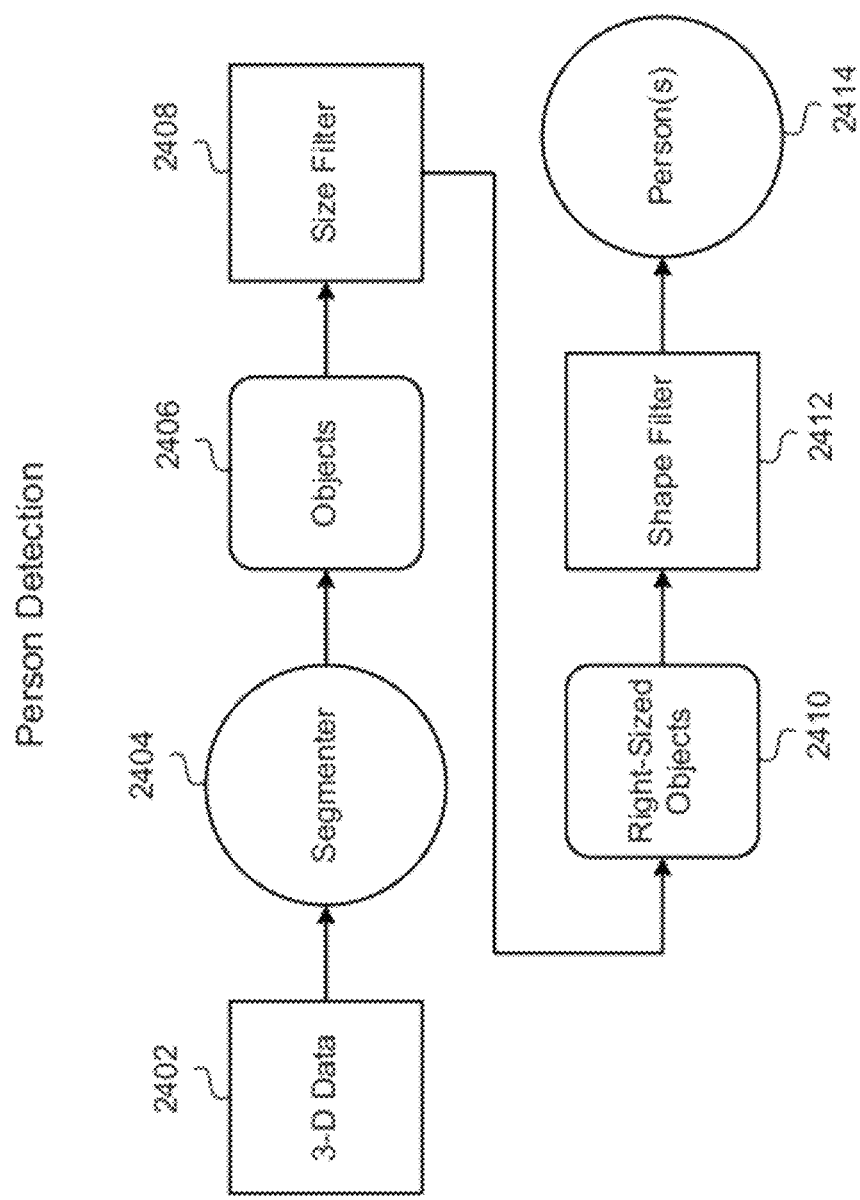
FIG. 24A is a schematic view of an exemplary person detection routine for a mobile human interface robot.

Referring to FIGS. 23B and 24A, using the image data received from the second 3-D image sensor 450b, the control system 510 can identify the person 2300 (e.g., via pattern or image recognition), so as to continue following that person 2300. If the robot 100 encounters another person 2302, as the first person 2300 turns around a corner, for example, the robot 100 can discern that the second person 2302 is not the first person 2300 and continues following the first person 2300. In some implementations, the second 3-D image sensor 450b provides 3-D image data 2402 (e.g., a 2-d array of pixels, each pixel containing depth information (e.g., distance to the camera)) to a segmentor 2404 for segmentation into objects or blobs 2406. For example, the pixels are grouped into larger objects based on their proximity to neighboring pixels. Each of these objects (or blobs) is then received by a size filter 2408 for further analysis. The size filter 2408 processes the objects or blobs 2406 into right sized objects or blobs 2410, for example, by rejecting objects that are too small (e.g., less than about 3 feet in height) or too large to be a person (e.g., greater than about 8 feet in height). A shape filter 2412 receipts the right sized objects or blobs 2410 and eliminates objects that do not satisfy a specific shape. The shape filter 2412 may look at an expected width of where a midpoint of a head is expected to be using the angle-of-view of the camera 450b and the known distance to the object. The shape filter 2412 processes are renders the right sized objects or blobs 2410 into person data 2414 (e.g., images or data representative thereof).

Figure 24B:
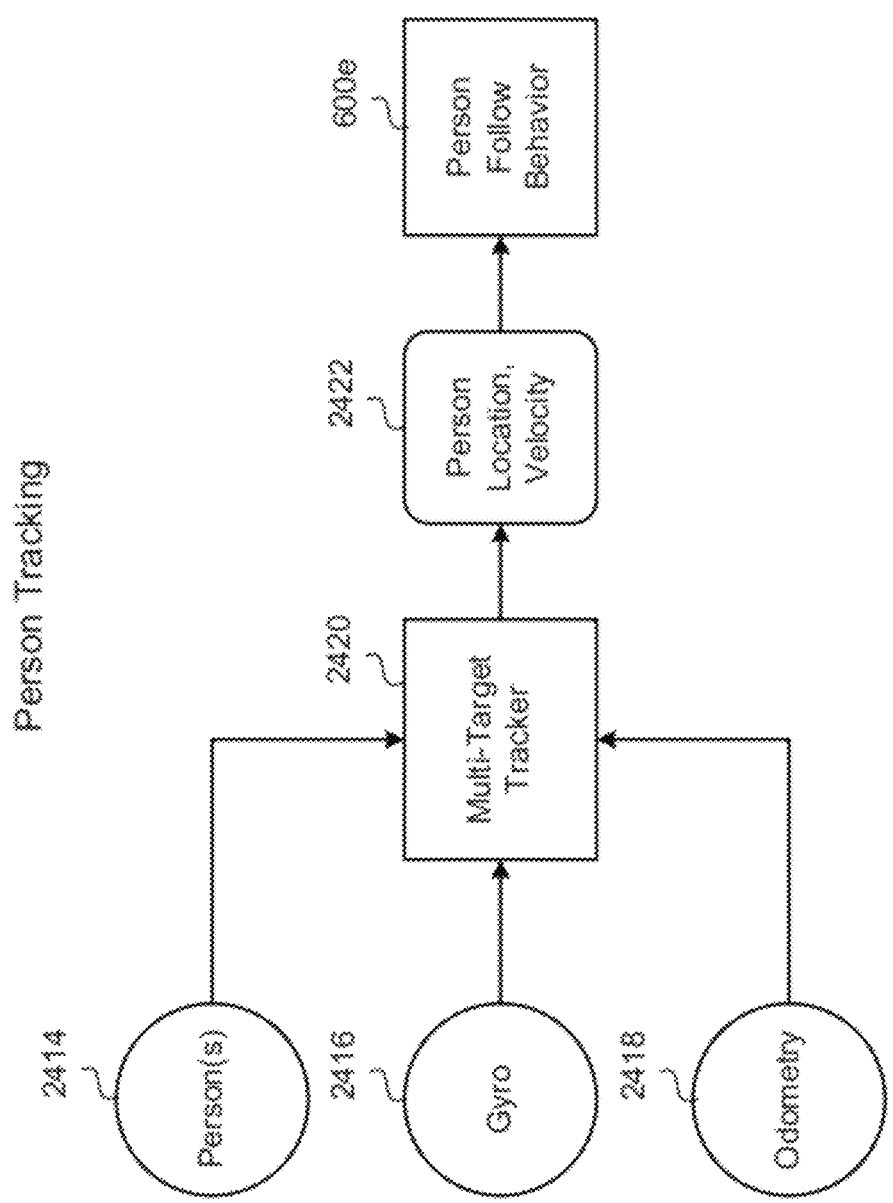
FIG. 24B is a schematic view of an exemplary person tracking routine for a mobile human interface robot.

In some examples, the robot 100 can detect and track multiple persons 2300, 2302 by maintaining a unique identifier for each person 2300, 2302 detected. The person follow behavior 600e propagates trajectories of each person individually, which allows the robot 100 to maintain knowledge of which person the robot 100 should track, even in the event of temporary occlusions cause by other persons or objects. Referring to FIG. 24B, in some implementations, a multi-target tracker 2420 (e.g., a routine executable on a computing processor, such as the controller 500) receives the person(s) data 2414 (e.g., images or data representative thereof) from the shape filter 2412, gyroscopic data 2416 (e.g., from the IMU 470), and odometry data 2418 (e.g., from the drive system 200) provides person location/velocity data 2422, which is received by the person follow behavior 600e. In some implementations, the multi-target tracker 2420 uses a Kalman filter to track and propagate each person's movement trajectory, allowing the robot 100 to perform tracking beyond a time when a user is seen, such as when a person moves around a corner or another person temporarily blocks a direct view to the person.

Figure 24C:
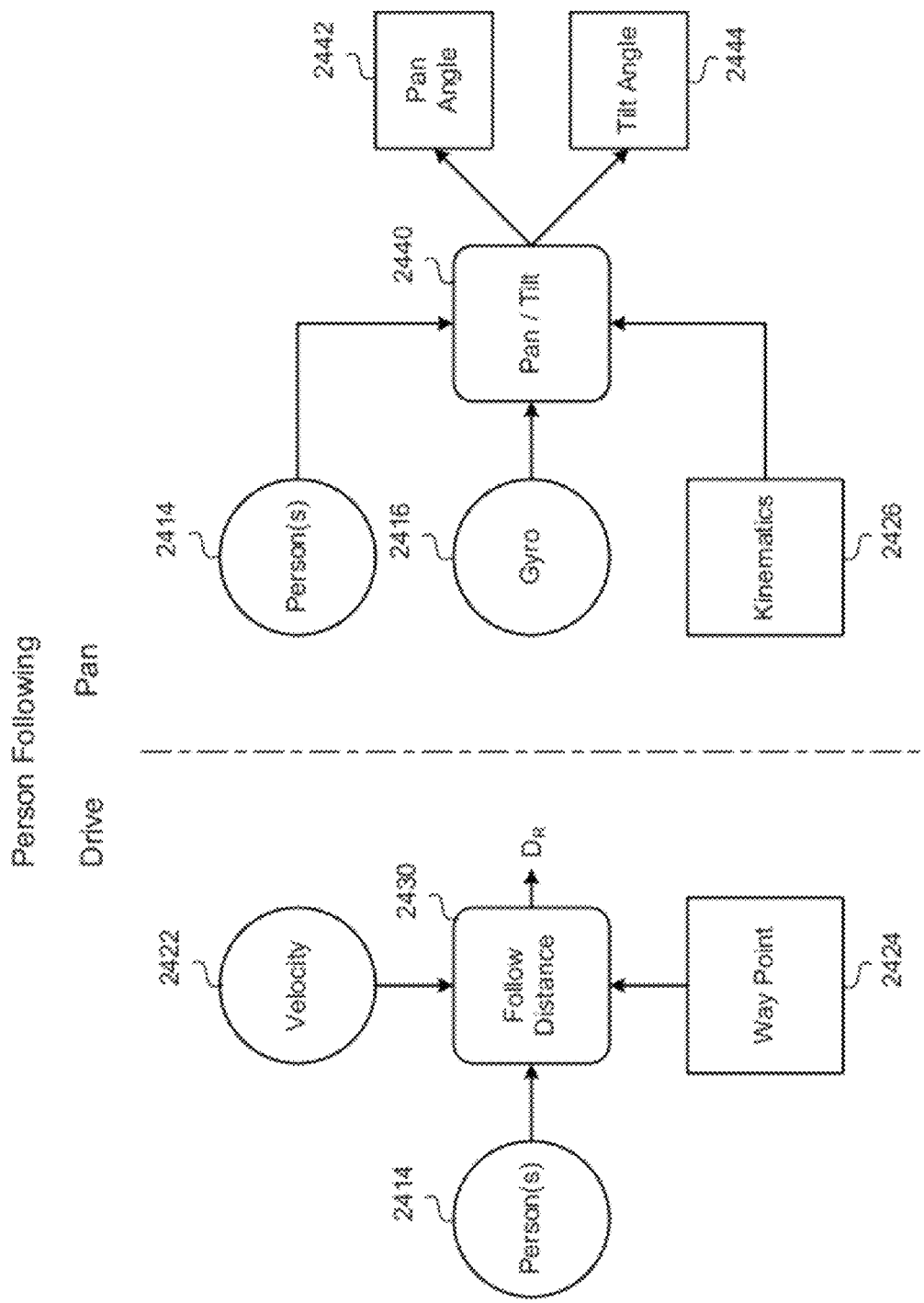
FIG. 24C is a schematic view of an exemplary person following routine for a mobile human interface robot.

Referring to FIG. 24C, in some examples, the person follow behavior 600e executes person following by maintaining a following distance $D_R$ between the robot 100 and the person 2300 while driving. The person follow behavior 600e can be divided into two subcomponents, a drive component 2430 and a pan-tilt component 2440. The drive component 2430 (e.g. a follow distance routine executable on a computing processor) may receive the person data 2414, person velocity data 2422, and waypoint data 2424 to determine (e.g., compute) the following distance $D_R$ (which may be a range). The drive component 2430 controls how the robot 100 will try to achieve its goal, depending on the distance to the person 2300. If the robot 100 is within a threshold distance, velocity commands are used directly, allowing the robot 100 to turn to face the person 2300 or back away from the person 2300 if it is getting too close. If the person 2300 is further than the desired distance, waypoint commands may be used.

The pan-tilt component 2440 causes the neck 150 to pan and/or tilt to maintain the field of view 452 of the second 3-D image sensor 450b on the person 2300. A pan/tilt routine 2440 (e.g., executable on a computing processor) may receive the person data 2414, the gyroscopic data 2416, and kinematics 2426 (e.g., from the dynamics model 570 of the control system 510) and determine a pan angle 2442 and a tilt angle 2444 that will orient the second 3-D image sensor 450b to maintain its field of view 452 on the person 2300. There may be a delay in the motion of the base 120 relative to the pan-tilt of the head 160 and also a delay in sensor information arriving to the person follow behavior 600e. This may be compensated for based on the gyro and odometry information 2416, 2426 so that the pan angle $\theta_R$ does not overshoot significantly once the robot is turning.

Figure 25A:
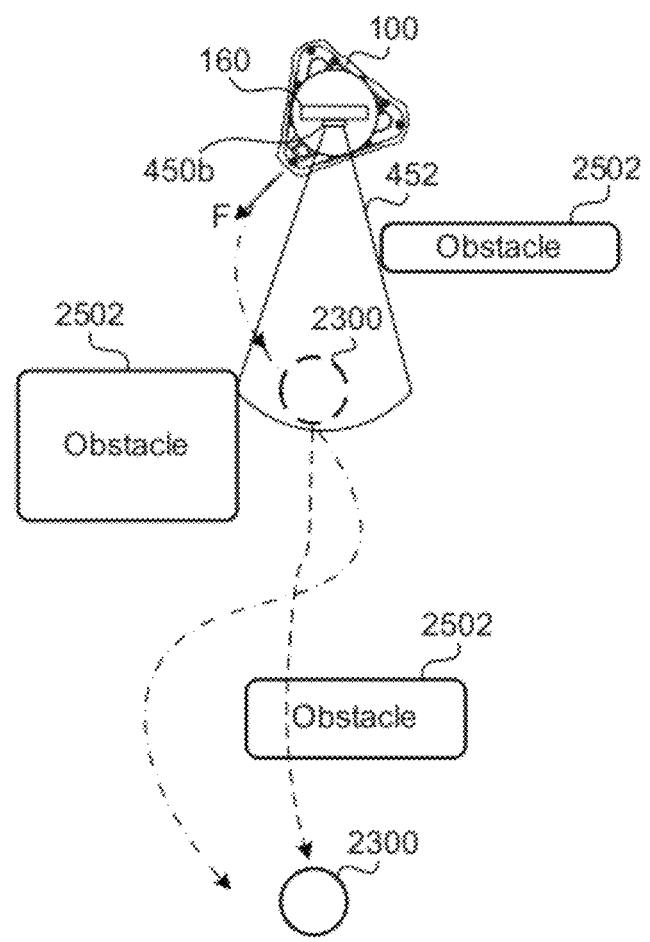
FIG. 25A is a schematic view of an exemplary mobile human interface robot following a person around obstacles.

Referring to FIG. 25A, in some examples, the person follow behavior 600e causes the robot 100 to navigate around obstacles 2502 to continue following the person 2300. Since the robot 100 can use waypoints to follow the person 2300, it is able to determine a path around obstacles using an ODOA (obstacle detection/obstacle avoidance) behavior 600b, even if the person steps over obstacles that the robot cannot traverse. The ODOA behavior 600b (FIG. 22) can evaluate predicted robot paths (e.g., a positive evaluation for predicted robot path having no collisions with detected objects). These evaluations can be used by the action selection engine 580 to determine the preferred outcome and a corresponding robot command (e.g., drive commands).

Figure 25C:
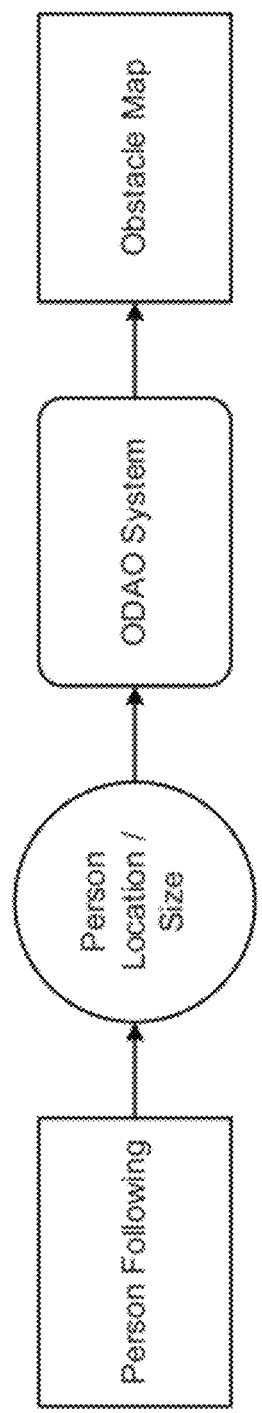
FIG. 25C is a schematic view of an exemplary local map routine for a mobile human interface robot.

Referring to FIGS. 25B and 25C, in some implementations, the control system 510 builds a local map 2500 of obstacles 2502 in an area near the robot 100. In a naïve system, the robot 100 may not be able to tell the difference between a real obstacle 2502 and a person 2300 to be followed. This would normally prevent the robot 100 from traveling in the direction of the person 2300, since it would appear to be an obstacle 2502 in that direction. A person-tracking algorithm can continuously report to the ODOA behavior 600b a location of the person 2300 being followed. Accordingly, the ODOA behavior 600b can then update the local map 2500 to remove the obstacle 2502 previously corresponding to the person 2300 and can optionally provided location of the person 2300.

Figure 26D:
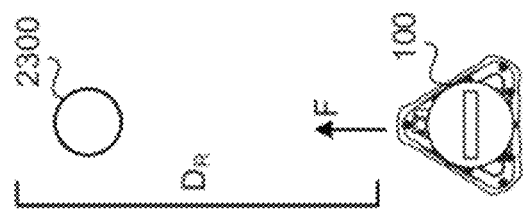
FIG. 26D is a schematic view of an exemplary mobile human interface robot using waypoint commands to maintain a following distance from a person.
Figure 26C:
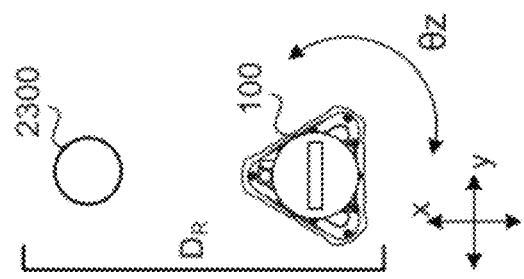
FIG. 26C is a schematic view of an exemplary mobile human interface robot using direct velocity commands to maintain a following distance from a person.
Figure 26B:
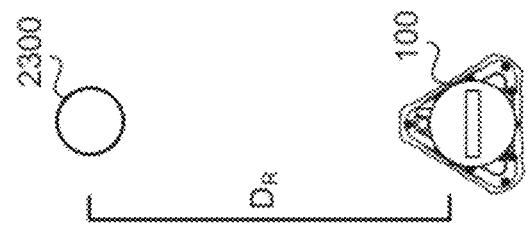
FIG. 26B is a schematic view of an exemplary mobile human interface robot maintaining a following distance from a person.
Figure 26A:
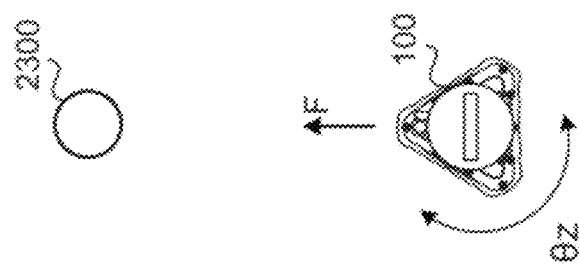
FIG. 26A is a schematic view of an exemplary mobile human interface robot turning to face a person.

Referring to FIGS. 26A-26D, in some implementations, the person follow behavior 600e evaluates outcomes of feasible commands generated by the action selection engine 580 to effectuate two goals: 1) keeping the robot 100 facing the person 2300 (e.g., maintaining a forward drive direction F toward the person 2300 and/or panning and/or tilting the head 160 to face the person 2300), as shown in FIG. 26A; and 2) maintaining a follow distance $D_R$ (e.g., about 2-3 meters) between the robot 100 and person 2300, as shown in FIG. 26B. When the robot 100 is within the follow distance $D_R$ of the person 2300, the person follow behavior 600e may cause the control system 510 to issue velocity commands (x, y, θz), to satisfy the above goals, as shown in FIG. 26C. If person 2300 approaches too close to the robot 100, the robot 100 can optionally back away from the person 100 to maintain a safe distance, such as the follow distance $D_R$ (and a distance that keeps the user in the sensor range (e.g., 0.5 m or higher). The robot 100 can tilt the second 3-D image sensor 450b up to accommodate when the person 100 gets very close, since the person's head may still be in range even though its body may not be. When the robot 100 moves outside of the follow distance $D_R$, the robot 100 may use waypoint commands to regain the follow distance $D_R$. Using waypoint commands allows the robot 100 to determine an optimal path of the robot 100, thus allowing for the ODOA behavior 600b to maintain an adequate distance from nearby obstacles.

Figure 27:
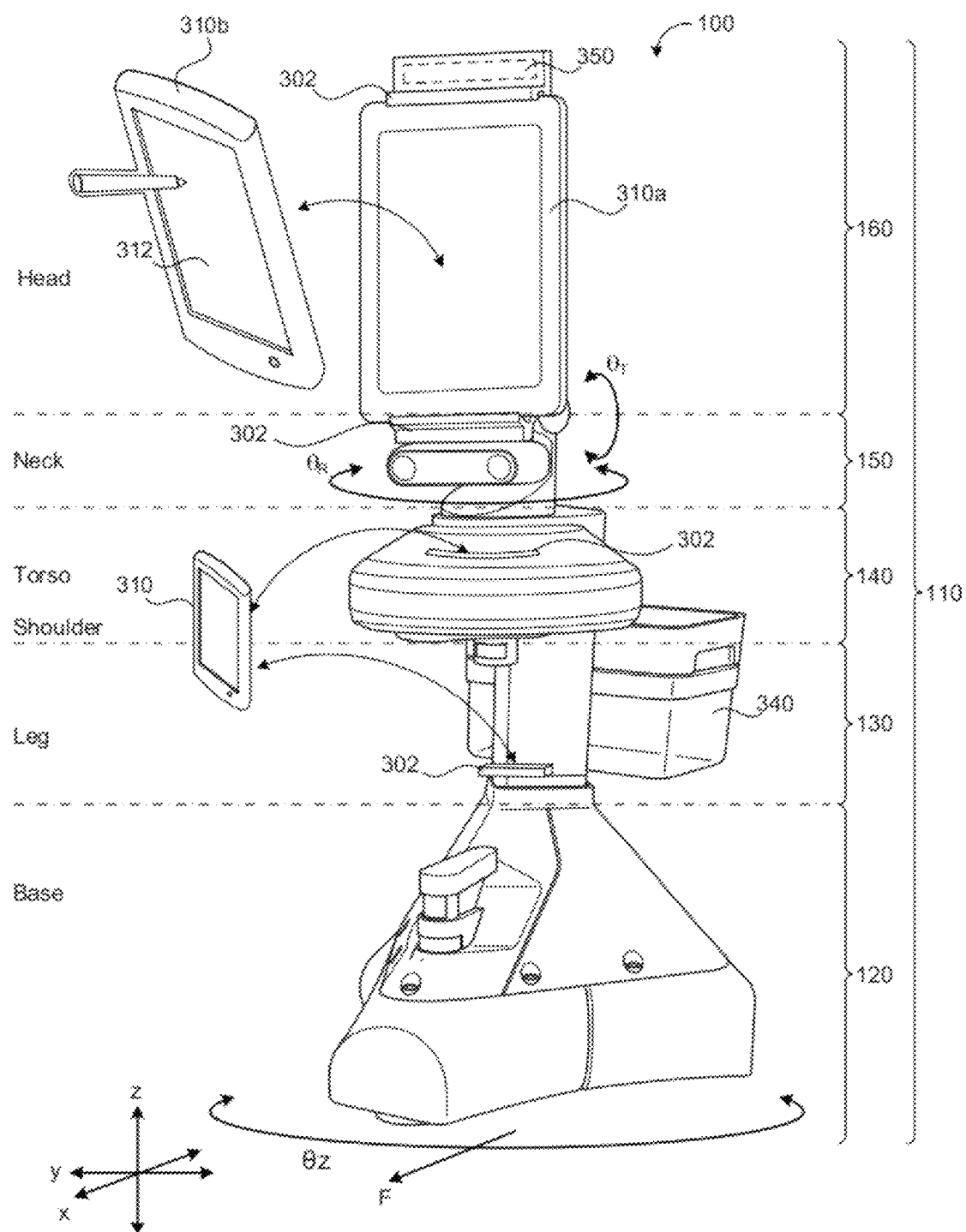
FIG. 27 is a perspective view of an exemplary mobile human interface robot having detachable web pads.

With reference to FIGS. 1-3 and 27, in some implementations, the head 160 supports one or more portions of the interfacing module 300. The head 160 may include a dock 302 for releasably receiving one or more computing tablets 310, also referred to as a web pad or a tablet PC, each of which may have a touch screen 312. The web pad 310 may be oriented forward, rearward or upward. In some implementations, web pad 310 includes a touch screen, optional I/O (e.g., buttons and/or connectors, such as micro-USB, etc.) a processor, and memory in communication with the processor. An exemplary web pad 310 includes the Apple iPad is by Apple, Inc. In some examples, the web pad 310 functions as the controller 500 or assist the controller 500 and controlling the robot 100. In some examples, the dock 302 includes a first computing tablet 310a fixedly attached thereto (e.g., a wired interface for data transfer at a relatively higher bandwidth, such as a gigabit rate) and a second computing tablet 310b removably connected thereto. The second web pad 310b may be received over the first web pad 310a as shown in FIG. 27, or the second web pad 310b may be received on an opposite facing side or other side of the head 160 with respect to the first web pad 310a. In additional examples, the head 160 supports a single web pad 310, which may be either fixed or removably attached thereto. The touch screen 312 may detected, monitor, and/or reproduce points of user touching thereon for receiving user inputs and providing a graphical user interface that is touch interactive. In some examples, the web pad 310 includes a touch screen caller that allows the user to find it when it has been removed from the robot 100.

In some implementations, the robot 100 includes multiple web pad docks 302 on one or more portions of the robot body 110. In the example shown in FIG. 27, the robot 100 includes a web pad dock 302 optionally disposed on the leg 130 and/or the torso 140. This allows the user to dock a web pad 310 at different heights on the robot 100, for example, to accommodate users of different height, capture video using a camera of the web pad 310 in different vantage points, and/or to receive multiple web pads 310 on the robot 100.

The interfacing module 300 may include a camera 320 disposed on the head 160 (see e.g., FIG. 2), which can be used to capture video from elevated vantage point of the head 160 (e.g., for videoconferencing). In the example shown in FIG. 3, the camera 320 is disposed on the neck 150. In some examples, the camera 320 is operated only when the web pad 310, 310a is detached or undocked from the head 160. When the web pad 310, 310a is attached or docked on the head 160 in the dock 302 (and optionally covering the camera 320), the robot 100 may use a camera of the web pad 310a for capturing video. In such instances, the camera 320 may be disposed behind the docked web pad 310 and enters an active state when the web pad 310 is detached or undocked from the head 160 and an inactive state when the web pad 310 is attached or docked on the head 160.

The robot 100 can provide videoconferencing (e.g., at 24 fps) through the interface module 300 (e.g., using a web pad 310, the camera 320, the microphones 320, and/or the speakers 340). The videoconferencing can be multiparty. The robot 100 can provide eye contact between both parties of the videoconferencing by maneuvering the head 160 to face the user. Moreover, the robot 100 can have a gaze angle of <5 degrees (e.g., an angle away from an axis normal to the forward face of the head 160). At least one 3-D image sensor 450 and/or the camera 320 on the robot 100 can capture life size images including body language. The controller 500 can synchronize audio and video (e.g., with the difference of <50 ms). In the example shown in FIGS. 28E-28E, robot 100 can provide videoconferencing for people standing or sitting by adjusting the height of the web pad 310 on the head 160 and/or the camera 320 (by raising or lowering the torso 140) and/or panning and/or tilting the head 160. The camera 320 may be movable within at least one degree of freedom separately from the web pad 310. In some examples, the camera 320 has an objective lens positioned more than 3 feet from the ground, but no more than 10 percent of the web pad height from a top edge of a display area of the web pad 310. Moreover, the robot 100 can zoom the camera 320 to obtain close-up pictures or video about the robot 100. The head 160 may include one or more speakers 340 so as to have sound emanate from the head 160 near the web pad 310 displaying the videoconferencing.

Figure 28A:
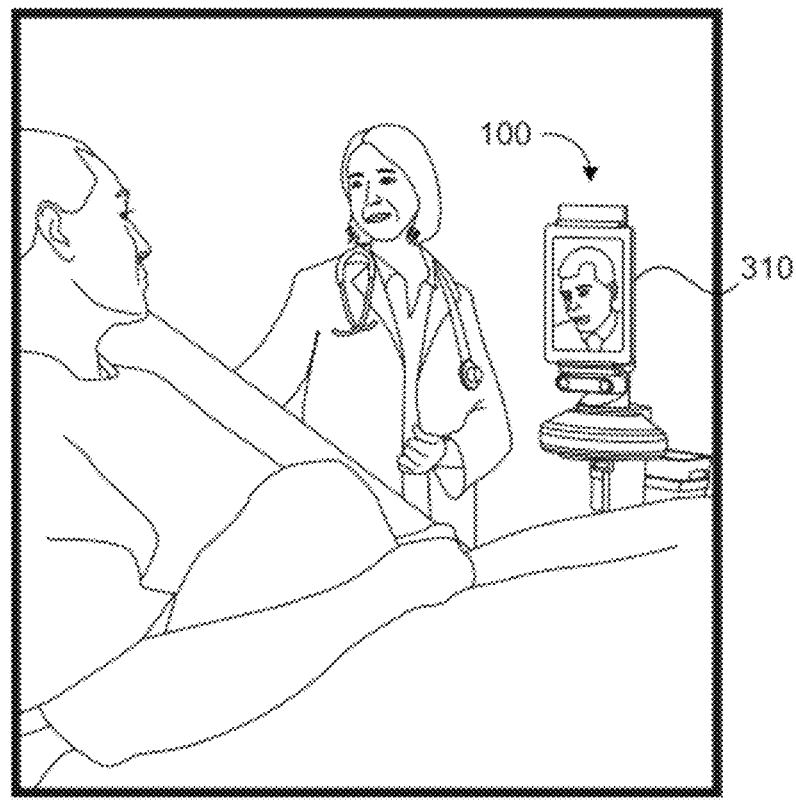
FIGS. 28A-28E perspective views of people interacting with an exemplary mobile human interface robot.
Figure 28B:
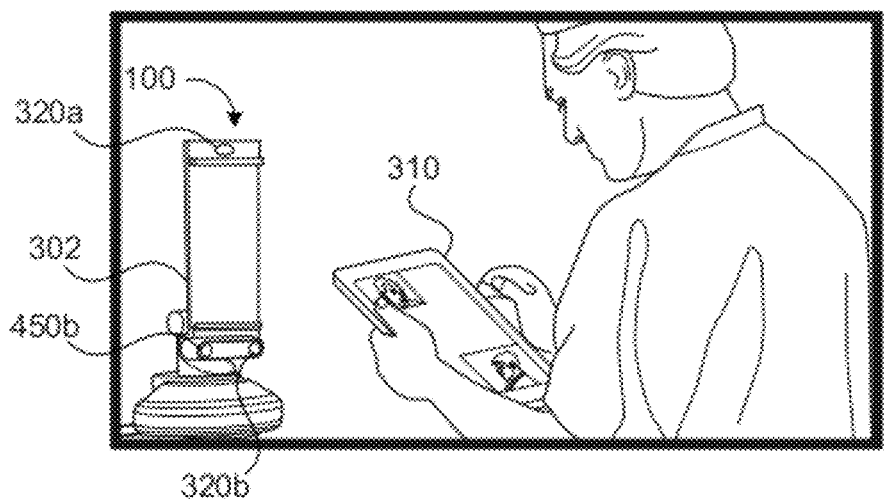
Figure 28C:
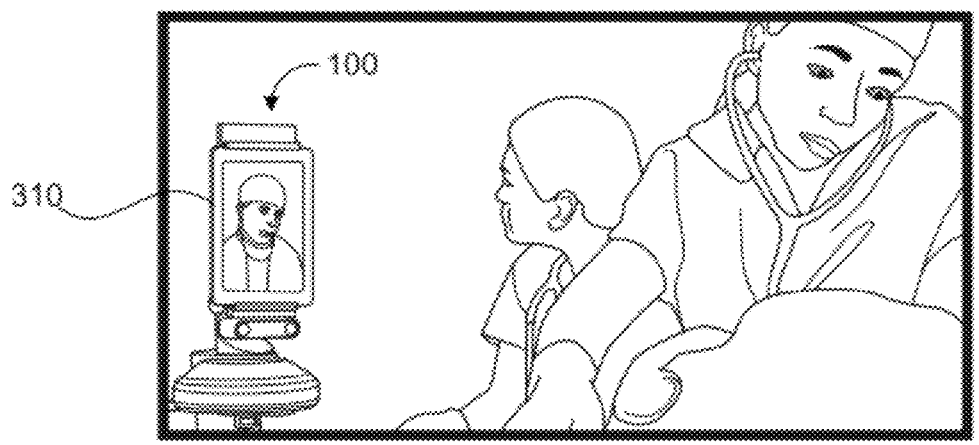
Figure 28D:
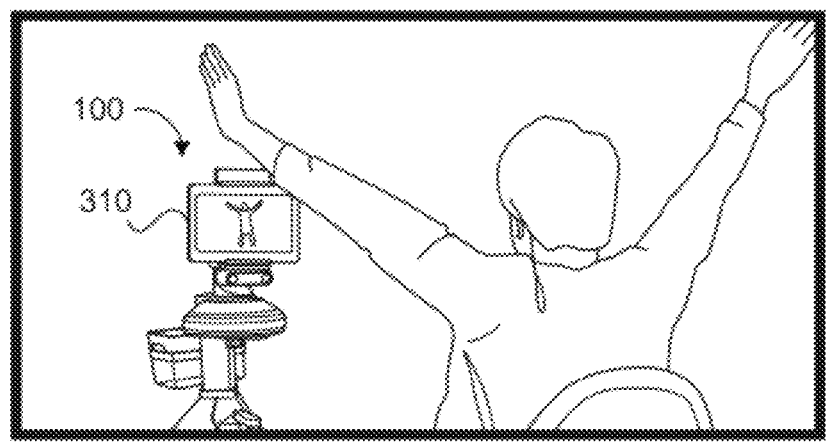
Figure 28E:
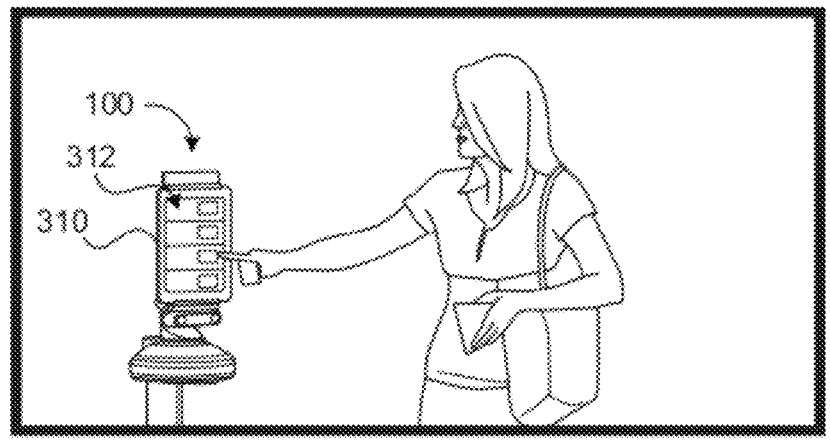

In some examples, the robot 100 can receive user inputs into the web pad 310 (e.g., via a touch screen), as shown in FIG. 28E. In some implementations, the web pad 310 is a display or monitor, while in other implementations the web pad 310 is a tablet computer. The web pad 310 can have easy and intuitive controls, such as a touch screen, providing high interactivity. The web pad 310 may have a monitor display 312 (e.g., touch screen) having a display area of 150 square inches or greater movable with at least one degree of freedom.

The robot 100 can provide EMR integration, in some examples, by providing video conferencing between a doctor and patient and/or other doctors or nurses. The robot 100 may include pass-through consultation instruments. For example, the robot 100 may include a stethoscope configured to pass listening to the videoconferencing user (e.g., a doctor). In other examples, the robot includes connectors 170 that allow direct connection to Class II medical devices, such as electronic stethoscopes, otoscopes and ultrasound, to transmit medical data to a remote user (physician).

In the example shown in FIG. 28B, a user may remove the web pad 310 from the web pad dock 302 on the head 160 for remote operation of the robot 100, videoconferencing (e.g., using a camera and microphone of the web pad 310), and/or usage of software applications on the web pad 310. The robot 100 may include first and second cameras 320a, 320b on the head 160 to obtain different vantage points for videoconferencing, navigation, etc., while the web pad 310 is detached from the web pad dock 302.

Interactive applications executable on the controller 500 and/or in communication with the controller 500 may require more than one display on the robot 100. Multiple web pads 310 associated with the robot 100 can provide different combinations of "FaceTime", Telestration, HD look at this-cam (e.g., for web pads 310 having built in cameras), can act as a remote operator control unit (OCU) for controlling the robot 100 remotely, and/or provide a local user interface pad.

In some implementations, the robot 100 includes a mediating security device 350 (FIG. 27), also referred to as a bridge, for allowing communication between a web pad 310 and the controller 500 (and/or other components of the robot 100). For example, the bridge 350 may convert communications of the web pad 310 from a web pad communication protocol to a robot communication protocol (e.g., Ethernet having a gigabit capacity). The bridge 350 may authenticate the web pad 310 and provided communication conversion between the web pad 310 and the controller 500. In some examples, the bridge 350 includes an authorization chip which authorizes/validates any communication traffic between the web pad 310 and the robot 100. The bridge 350 may notify the controller 500 when it has checked an authorized a web pad 310 trying to communicate with the robot 100. Moreover, after authorization, the bridge 350 notify the web pad 310 of the communication authorization. The bridge 350 may be disposed on the neck 150 or head (as shown in FIGS. 2 and 3) or elsewhere on the robot 100.

The Session Initiation Protocol (SIP) is an IETF-defined signaling protocol, widely used for controlling multimedia communication sessions such as voice and video calls over Internet Protocol (IP). The protocol can be used for creating, modifying and terminating two-party (unicast) or multiparty (multicast) sessions including one or several media streams. The modification can involve changing addresses or ports, inviting more participants, and adding or deleting media streams. Other feasible application examples include video conferencing, streaming multimedia distribution, instant messaging, presence information, file transfer, etc. Voice over Internet Protocol (Voice over IP, VoIP) is part of a family of methodologies, communication protocols, and transmission technologies for delivery of voice communications and multimedia sessions over Internet Protocol (IP) networks, such as the Internet. Other terms frequently encountered and often used synonymously with VoIP are IP telephony, Internet telephony, voice over broadband (VoBB), broadband telephony, and broadband phone.

Figure 29:
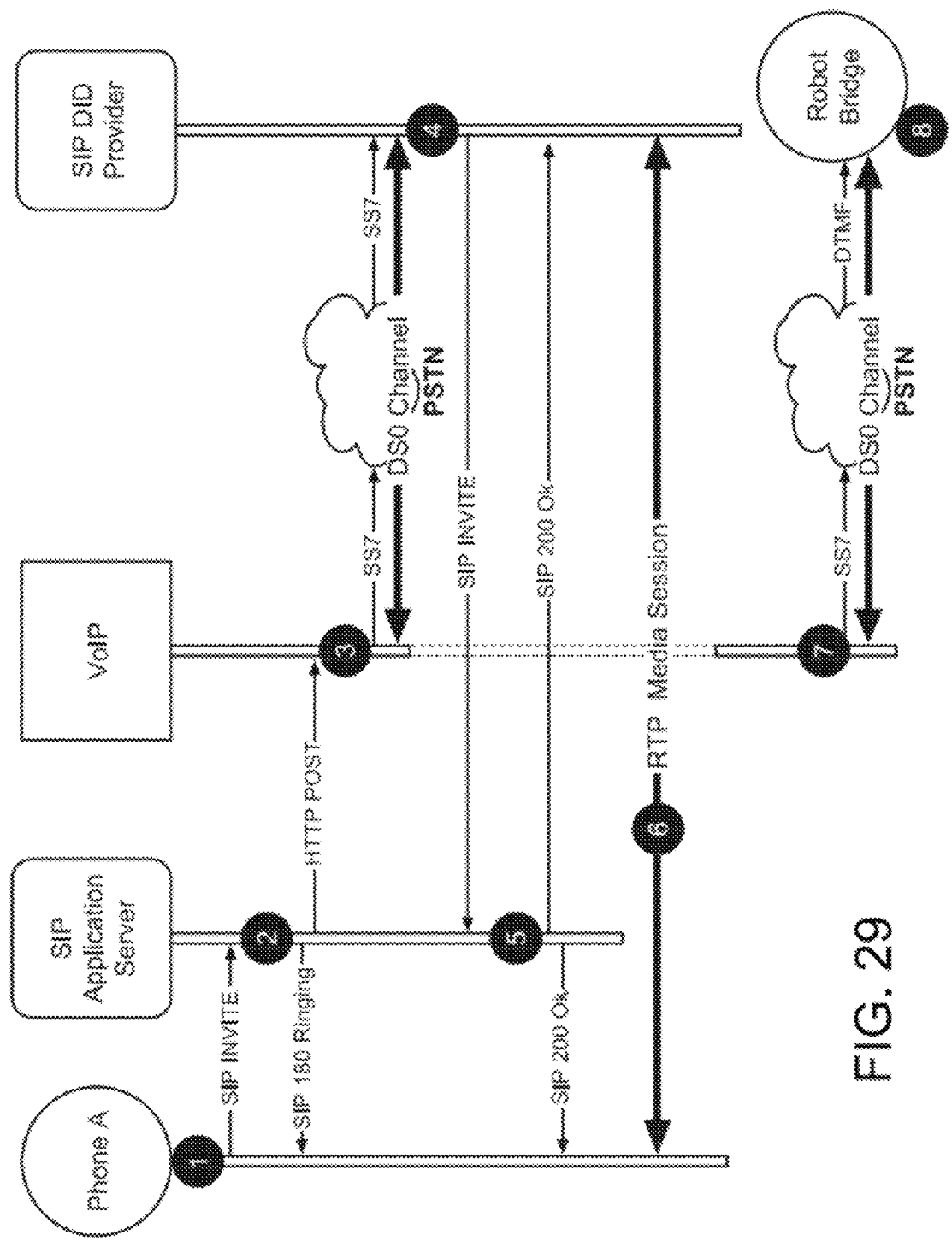
FIG. 29 provides an exemplary telephony schematic for initiating and conducting communication with a mobile human interface robot.

FIG. 29 provides a telephony example that includes interaction with the bridge 350 for initiating and conducting communication through the robot 100. An SIP of Phone A places a call with the SIP application server. The SIP invokes a dial function of the VoIP, which causes a HTTP post request to be sent to a VoIP web server. The HTTP Post request may behave like a callback function. The SIP application server sends a ringing to phone A, indicating that the call has been initiated. A VoIP server initiates a call via a PSTN to a callback number contained in the HTTP post request. The callback number terminates on a SIP DID provider which is configured to route calls back to the SIP application server. The SIP application server matches an incoming call with the original call of phone A and answers both calls with an OK response. A media session is established between phone A and the SIP DID provider. Phone A may hear an artificial ring generated by the VoIP. Once the VoIP has verified that the callback leg has been answered, it initiates the PSTN call to the destination, such as the robot 100 (via the bridge 350). The robot 100 answers the call and the VoIP server bridges the media from the SIP DID provider with the media from the robot 100.

Referring again to FIG. 6, the interfacing module 300 may include a microphone 330 (e.g., or micro-phone array) for receiving sound inputs and one or more speakers 330 disposed on the robot body 110 for delivering sound outputs. The microphone 330 and the speaker(s) 340 may each communicate with the controller 500. In some examples, the interfacing module 300 includes a basket 360, which may be configured to hold brochures, emergency information, household items, and other items.

Mobile robots generally need to sense obstacles and hazards to safely navigate their surroundings. This is especially important if the robot ever runs autonomously, although human-operated robots also require such sensing because an operator cannot always know nor attend to the details of a robot's environment. Contact sensing (such as bumpers that deflect and close a switch) can be used as a sort of failsafe mechanism, but sensors that detect objects from a distance are usually needed to improve performance. Such sensors include laser range finders, infrared distance sensors, video cameras, and depth cameras.

Referring to FIGS. 3-4C and 6, in some implementations, the robot 100 includes multiple antennas. In the examples shown, the robot 100 includes a first antenna 490*a* and a second antenna 490*b* both disposed on the base 120 (although the antennas may be disposed at any other part of the robot 100, such as the leg 130, the torso 140, the neck 150, and/or the head 160). The use of multiple antennas provide robust signal reception and transmission. The use of multiple antennas provides the robot 100 with multiple-input and multiple-output, or MIMO, which is the use of multiple antennas for a transmitter and/or a receiver to improve communication performance. MIMO offers significant increases in data throughput and link range without additional bandwidth or transmit power. It achieves this by higher spectral efficiency (more bits per second per hertz of bandwidth) and link reliability or diversity (reduced fading). Because of these properties, MIMO is an important part of modern wireless communication standards such as IEEE 802.11n (Wifi), 4G, 3GPP Long Term Evolution, WiMAX and HSPA+. Moreover, the robot 100 can act as a Wi-Fi bridge, hub or hotspot for other electronic devices nearby. The mobility and use of MIMO of the robot 100 can allow the robot to come a relatively very reliable Wi-Fi bridge.

MIMO can be sub-divided into three main categories, pre-coding, spatial multiplexing or SM, and diversity coding. Pre-coding is a type of multi-stream beam forming and is considered to be all spatial processing that occurs at the transmitter. In (single-layer) beam forming, the same signal is emitted from each of the transmit antennas with appropriate phase (and sometimes gain) weighting such that the signal power is maximized at the receiver input. The benefits of beam forming are to increase the received signal gain, by making signals emitted from different antennas add up constructively, and to reduce the multipath fading effect. In the absence of scattering, beam forming can result in a well defined directional pattern. When the receiver has multiple antennas, the transmit beam forming cannot simultaneously maximize the signal level at all of the receive antennas, and pre-coding with multiple streams can be used. Pre-coding may require knowledge of channel state information (CSI) at the transmitter.

Spatial multiplexing requires a MIMO antenna configuration. In spatial multiplexing, a high rate signal is split into multiple lower rate streams and each stream is transmitted from a different transmit antenna in the same frequency channel. If these signals arrive at the receiver antenna array with sufficiently different spatial signatures, the receiver can separate these streams into (almost) parallel channels. Spatial multiplexing is a very powerful technique for increasing channel capacity at higher signal-to-noise ratios (SNR). The maximum number of spatial streams is limited by the lesser in the number of antennas at the transmitter or receiver. Spatial multiplexing can be used with or without transmit channel knowledge. Spatial multiplexing can also be used for simultaneous transmission to multiple receivers, known as space-division multiple access. By scheduling receivers with different spatial signatures, good separability can be assured.

Diversity Coding techniques can be used when there is no channel knowledge at the transmitter. In diversity methods, a single stream (unlike multiple streams in spatial multiplexing) is transmitted, but the signal is coded using techniques called space-time coding. The signal is emitted from each of the transmit antennas with full or near orthogonal coding. Diversity coding exploits the independent fading in the multiple antenna links to enhance signal diversity. Because there is no channel knowledge, there is no beam forming or array gain from diversity coding. Spatial multiplexing can also be combined with pre-coding when the channel is known at the transmitter or combined with diversity coding when decoding reliability is in trade-off.

In some implementations, the robot 100 includes a third antenna 490*c* and/or a fourth antenna 490*d* and the torso 140 and/or the head 160, respectively (see e.g., FIG. 3). In such instances, the controller 500 can determine an antenna arrangement (e.g., by moving the antennas 490*a-d*, as by raising or lowering the torso 140 and/or rotating and/or tilting the head 160) that achieves a threshold signal level for robust communication. For example, the controller 500 can issue a command to elevate the third and fourth antennas 490*c*, 490*d* by raising a height of the torso 140. Moreover, the controller 500 can issue a command to rotate and/or the head 160 to further orient the fourth antenna 490*d* with respect to the other antennas 490*a-c*.

Figure 30:
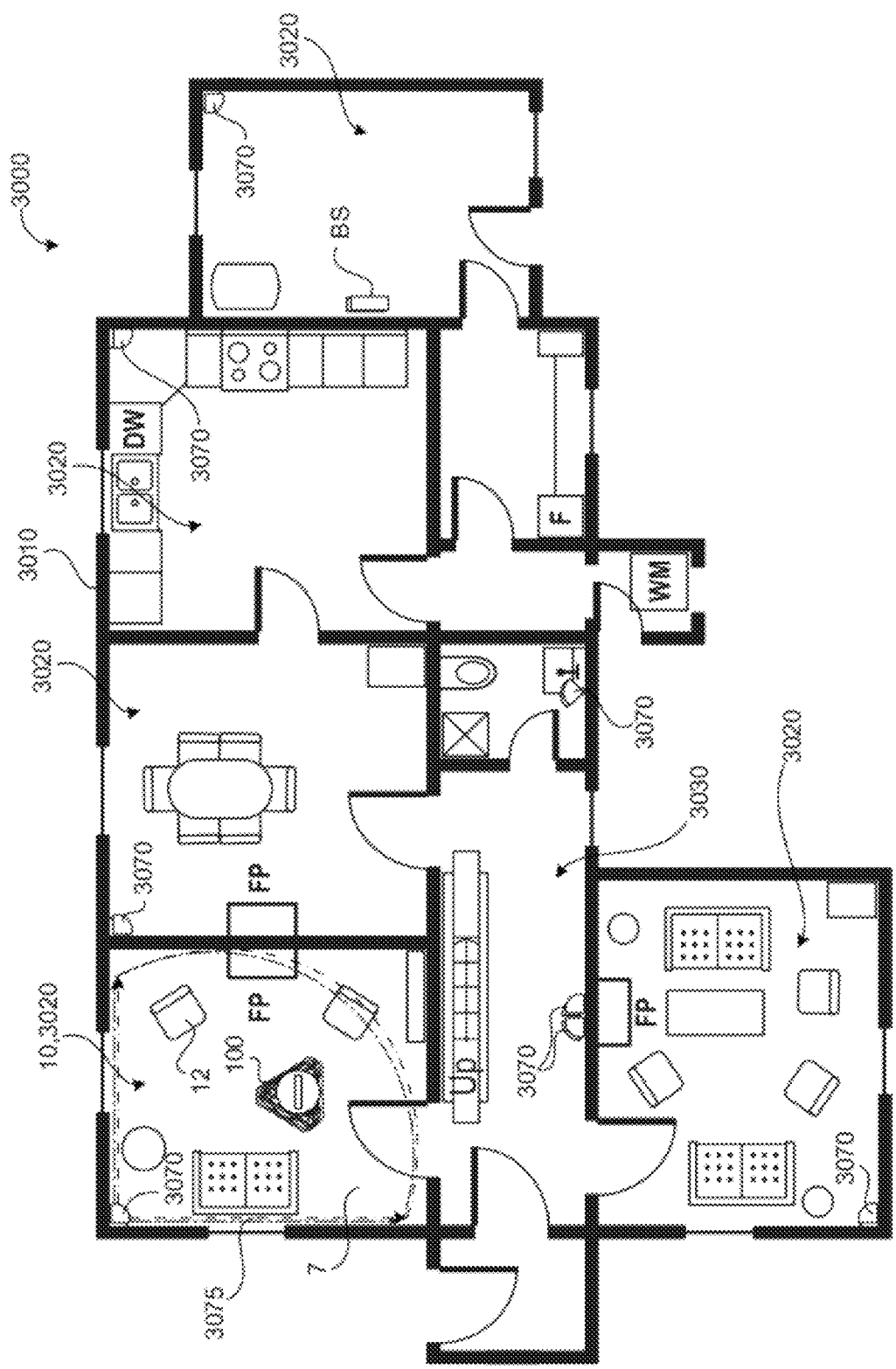
FIG. 30 is a schematic view of an exemplary house having an object detection system.

FIG. 30 provides a schematic view of an exemplary house 3010 having an object detection system 3000. The object detection system 3000 includes imaging sensors 3070, such as the 3D speckle camera 1300 and/or the 3D TOF camera 1500, mounted in various rooms 3020, hallways 3030, and/or other parts of the house 3010 (inside and/or outside) for home monitoring, person monitoring, and/or a personal emergency response system (PERS). The imaging sensor 3070 can have a field of view 3075 that covers the entire room 3020 (e.g., a scene 10) or a portion there of. The object detection system 3000 can provide hands-free, real-time activity monitoring (e.g., of elderly individuals), connecting care givers to those seeking independent living. In the example shown, imaging sensors 3070 are placed on one or more walls or in one or more corners of rooms 3020 where human activity can be most effectively monitored. For example, imaging sensors 3070 can be placed in a corner or on a wall opposite of a doorway, sofa, main sitting area, etc. Activity and rest patterns of individuals can be monitored, tracked, and stored (e.g., for comparison with future patterns) or relayed to a caregiver.

The object detection system 3000 may include a base station BS in communication with the imaging sensor(s) 3070 (e.g., electrical connection or wireless). The base station BS may have a processor for executing image recognition and/or monitoring routines and memory for storing sensor data, such as 3D maps at certain time intervals. In some examples, the object detection system 3000 includes a mobile robot 100, 1400 in communication with the base station BS and/or the imaging sensor(s) 3070.

In some implementations, the imaging sensor 3070 constructs a 3D map of a corresponding room 3020 in which the imaging sensor 3070 is mounted for object recognition and/or object tracking Moreover, in examples including the mobile robot 100, which has at least one imaging sensor 450, the mobile robot 100 can construct a 3D of the same room 3020 or an object 12 for comparison with the 3D map of the imaging sensor 3070. The base station BS may receive both 3D maps, which may be from different vantage points or perspectives, and compare the two 3D maps to recognize and resolve locations of object 12 (e.g., furniture, people, pets, etc.) and occlusions 16.

In some implementations, the object detection system 3000 uses the imaging sensor 3070 for obtaining depth perception of a scene 10 (e.g., a 3D map) to recognize a gesture created by a body part or whole body of a person. The imaging sensor 3070 may identify position information for the body or body part, including depth-wise position information for discrete portions of a body part. The imaging sensor 3070 may create a depth image that contains position information of the entire scene 10 about the person, including position information of the body part of interest. The imaging sensor 3070 and/or the base station BS (e.g., having a processor executing commands or routines) may segment the body part of interest from a background and other objects in the depth image and determines the shape and position of the body part of interest (e.g., statically) at one particular interval. The dynamic determination may be determined when the body or body part moves in the scene 10. Moreover, the imaging sensor 3070 and/or the base station BS may identify the gesture created by the body part dynamically over a duration of time, if movement of the body part is of interest. The identified body gesture may be classified and an event raised based on the classification. Additional details and features on gesture recognition, which may combinable with those described herein, can be found in U.S. Pat. No. 7,340,077, Entitled "Gesture Recognition System Using Depth Perceptive Sensors", the contents of which are hereby incorporated by reference in its entirety.

The imaging sensor 3070 can be used for gesture recognition of a person in the respective room 3070. For example, the imaging sensor 3070 can construct a 3D map of the individual, which can be used to resolve or classify gestures or poses of the person (e.g., sitting, lying down, walking, fallen, pointing, etc.). The imaging sensor 3070, the base station BS, and/or the robot 100 can use image data to construct a 3D map of the person and execute a routine for identifying and/or classifying gestures of the person. Certain gestures, such as a fallen gesture or a hand waving gesture, can raise an emergency event trigger with the object detection system 3000. In response to the emergency event trigger, the base station BS may send an emergency communication (e.g., phone call, email, etc.) for emergency assistance and/or the robot 100 may locate the individual to verify the gesture recognition and/or provide assistance (e.g., deliver medication, assist the person off the floor, etc.).

Figure 31:
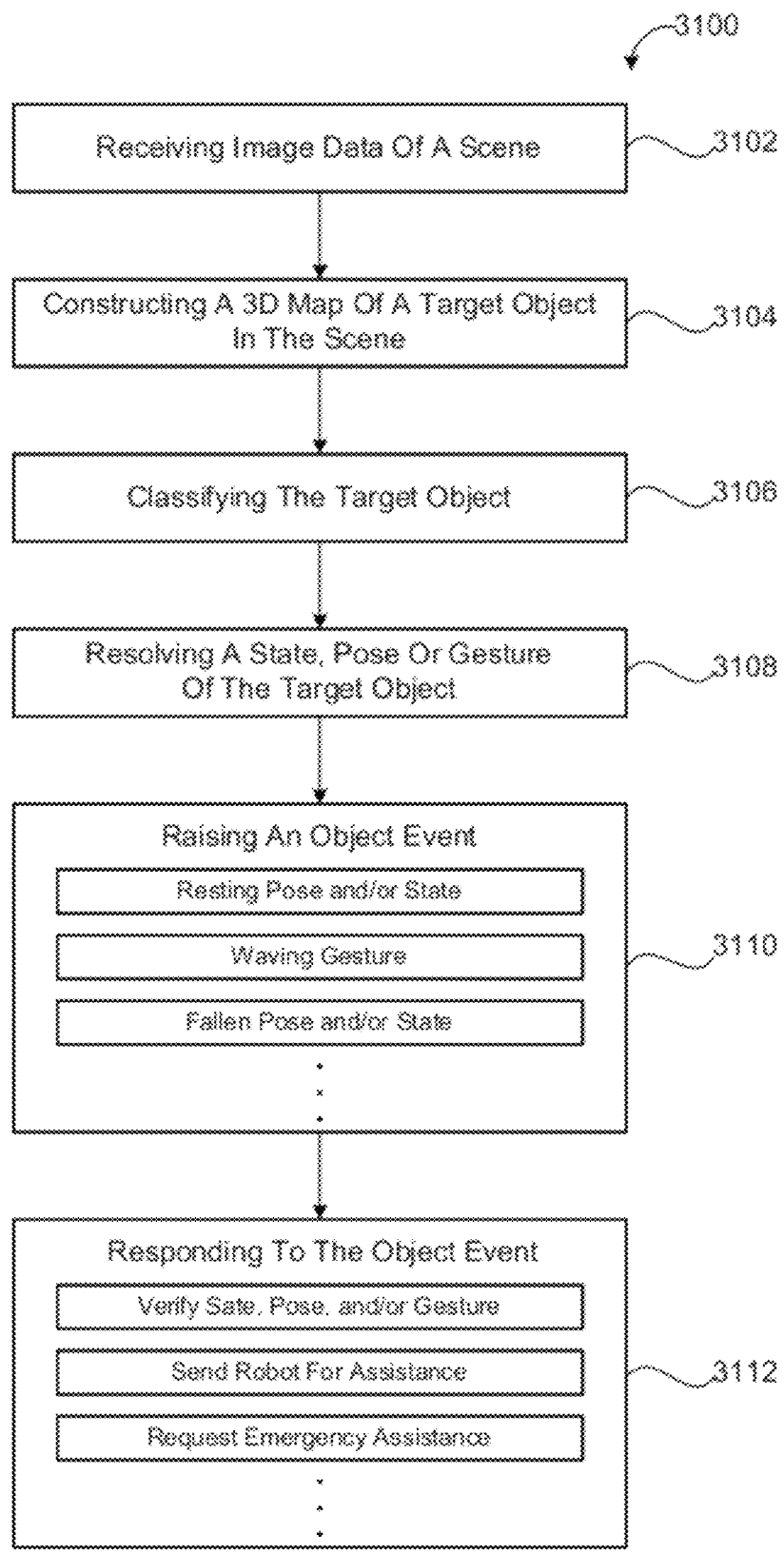
FIG. 31 is a schematic view of an exemplary arrangement of operations for operating the object detection system.

FIG. 31 provides an exemplary arrangement 3100 of operations for operating the object detection system 3000. The operations include receiving 3102 image data (e.g., from a 3D speckle camera 1300 and/or a 3D TOF camera 1500) of a scene 10 (e.g., of a room 3020), constructing 3104 a 3D map of a target object 12 in the scene 10. The operations further include classifying 3106 the target object 12 (e.g., as a person) and resolving 3108 a state, pose or gesture of the target object 12. The operations include raising 3110 an object event (e.g., an event specific to the resolved state, pose, and/or gesture) and optionally responding 3112 to the object event.

In some implementations, the operation of classifying 3106 the target object 12 includes determining an object type for the target object 12 (e.g., person, dog, cat, chair, sofa, bed, etc.) and for living object types (e.g., a person), determining a state of the object 12, such as whether the object 12 is a alive, resting, injured, etc. (e.g., be sensing movement).

In some implementations, the operation of resolving 3108 a state, pose, and/or gesture of the target object 12 includes determining whether the target object 12 is alive, sitting, lying down, waiving, falling, or fallen. The determination of states, poses, and/or gestures may be executed separately and serially, concurrently, or in combinations thereof. For example, upon sensing and resolving a falling or waving gesture (e.g., beckoning while falling), the operations may further include determining a pose, such as a fallen pose (e.g., lying on the floor), and a state of the target object 12 (e.g., alive, breathing, injured, impaired, unconscious, etc.).

In the case of a fallen target object 12 (e.g., a fall of a person), for example, the operation can include classifying 3106 the target object 12 as a person, and resolving 3108 a state, pose, and/or gesture of the target object 12, as by recognizing known characteristics, which can be stored in memory. Exemplary stored characteristics may include rag doll collapse gestures or forward falling gestures when in an unconscious state, falling to the left when a left hip is weak, cane or walking aid falls over, etc. Moreover, the operations may include learning states, poses, and/or gestures in general and/or of particular target objects 12, filtering sensor data, and/or executing searching algorithms on the sensor data.

For a waiving gesture, the operations may include raising a waiving event and in response to that event, sending the robot 100 to the target object 12 for assistance. For example, the robot 100 may have communication capabilities (e.g., wireless, phone, teleconference, email, etc.), a medicine dispenser, or some other item to which the target object 12, such as a person, wishes to have access. Moreover, the robot 100 may bring the person to the base station BS, which may include a television or display for a videoconferencing session that takes advantage of a large screen (on the TV), stable acoustics (a microphone array on the BS that is not subject to motor and mechanical noise), stable AC power, a stable camera, and wired broadband access.

For lying down and/or sitting poses, the operations may include raising a verify health event, and in response to that event, sending the robot 100 to the target object 12 for verifying the pose, vital signs, etc. For a falling gesture or a fallen pose, the operations may include raising an emergency event, and in response to that event, sending the robot 100 to the target object 12 for assistance and issuing an emergency communication for emergency assistance.

In some examples, the operations include constructing or updating an occupancy map 1700 and comparing a current object location with past object locations for object tracking.

A gesture event can be raised for moved objects 12, and in response to that event, the operations may include sending the robot 100 to the corresponding room 3020 for verifying the object's location.

The robot 100 may operate autonomously from, yet remain in communication with, the object detection system 3050. As such, the robot 100 can receive raised events of the object detection system 3050 and respond to the events. For example, instead of the base station BS issuing a command to the robot 100, e.g., to verify a gesture classification, the robot 100 may listen for events raised on the object detection system 3000 and optionally react to the raised events.

Figure 32:
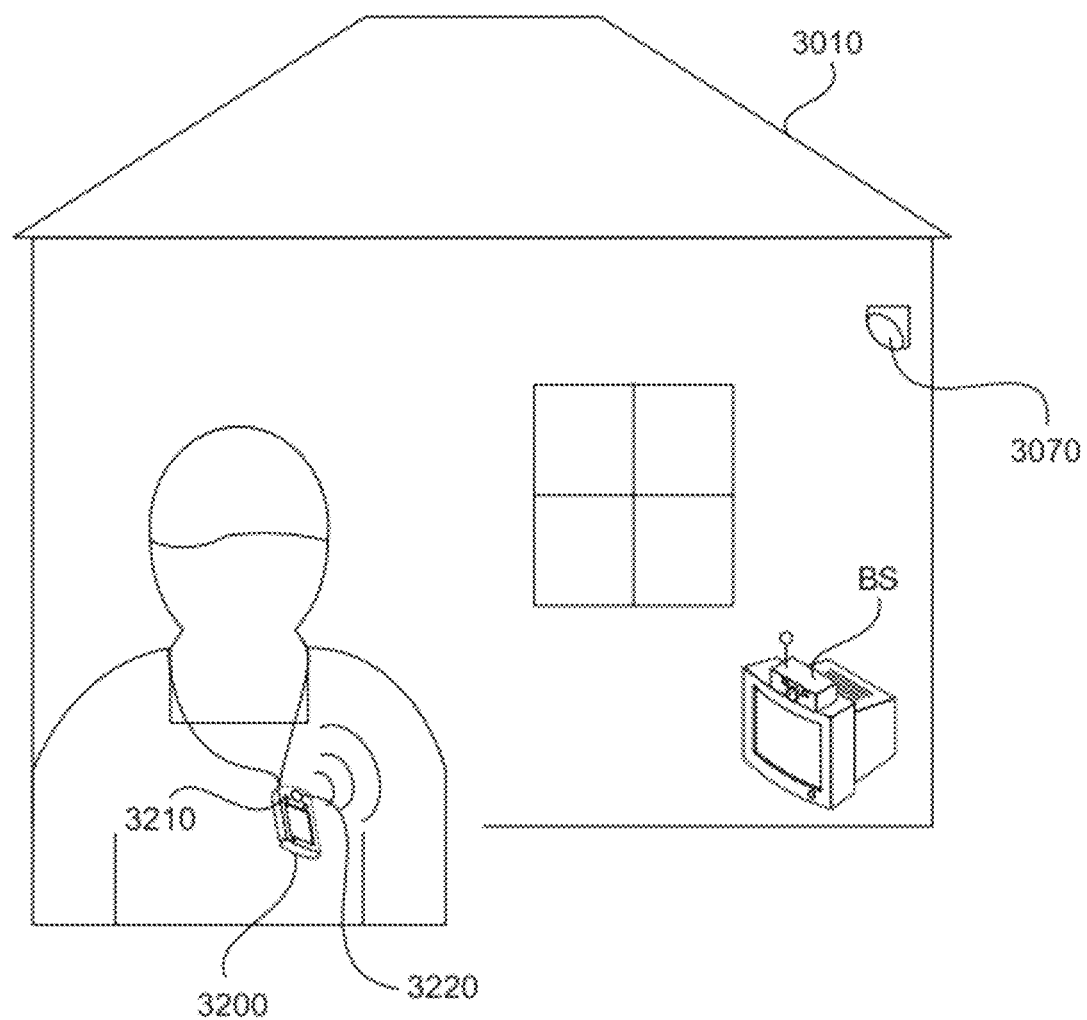
FIG. 32 is a schematic view of a person wearing a pendant in communication with an object detection system.

Referring to FIG. 32, in some implementations, a person can wear a pendant 3200, which is in communication with the object detection system 3000 (e.g., via the base station BS and/or the image sensor 3070). The pendant 3200 may include a motion sensor 3210 (e.g., one or accelerometers, gyroscopes, etc.) for detecting movement of the user. The object detection system 3000 can track the pendant's movement through out the house. Moreover, the pendant can provide user movement data, such as number of steps walked, number of times sitting or lying down, and/or a current state (e.g., standing, walking, sitting upright, lying down, etc.). The base station BS can receive the user movement data and raise events accordingly.

For example, upon receiving a current state of the pendant 3200 of lying down, the object detection system 3000 may raise a verify state of health event, and in response to that event, the robot 100 may locate the person wearing the pendant 3200 and verify a current state of health of that person. For example, upon locating the person, the robot 100 may capture image data of the person and verify chest movement as an indication that the person is breathing, use infrared imaging to determine a temperature of the person, etc. The robot 100 may issue an audible query (e.g., "How are you feeling?") and await an audible response from the person. If the robot 100 fails to sense an audible response, the robot 100 may raise an emergency event receivable by the base station BS of the detection system 3000 for communication request for emergency assistance. Moreover, the image sensor 450 of the robot 100 can capture images or live video for communication to a third party (e.g., caregiver, emergency response entity, etc.).

In some implementations, the pendant 3200 includes an assistance button 3220, which the user can press to request assistance. The base station BS may receive the assistance request signal from the pendant 3200 and communicate the assistance request to a caregiver, emergency response entity, etc. Moreover, in response to receiving the assistance request signal, the base station BS may raise an assistance request event, which the robot 100, in communication with the base station BS, can receive and respond to accordingly. For example, the robot 100 may locate the person wearing the pendant 3200 to verify a state of the person and/or provide assistance (e.g., provide medicine, videoconferencing, phone service, help the person to stand, etc.).

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Implementations of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method of object detection for a mobile robot, the method comprising:
   emitting a speckle pattern of light onto a scene about the robot while maneuvering the robot across a work surface of a working area;
   receiving odometry measurements from a drive system of the robot while maneuvering the robot across the work surface;
   determining a first motion of the robot based on the odometry measurements;
   determining a current location of the robot in the working area based on the first robot motion and a previously determined location of the robot;
   receiving reflections of the emitted speckle pattern off surfaces of a target object in the scene;
   determining a second motion of the robot using visual odometry of the robot based on an optical flow of the received reflections;
   determining a robot motion error between the first robot motion based on the drive system odometry and the second robot motion based on the visual odometry;
   adjusting the current location of the robot based on the robot motion error;
   determining a distance of each reflecting surface of the target object;
   constructing a three-dimensional depth map of the target object using the received reflections, the determined distance of each reflecting surface of the target object, and the adjusted current location of the robot; and
   classifying the target object using the three-dimensional depth map, the classifying comprising:
      determining a state, a pose, or a gesture of the target object;
      classifying the target object as a living object based on the state, the pose, or the gesture of the target object;
      determining whether the living object needs assistance by determining one or more of whether the living object is alive, sitting, lying down, waiving, falling, or fallen based on the state, the pose, or the gesture; and
   when the living object needs assistance, determining a type of assistance needed based on the state, the pose, or the gesture.

2. The method of claim 1, further comprising storing reference images of the speckle pattern as reflected off a reference object in the scene, the reference images captured at different distances from the reference object.

3. The method of claim 2, further comprising determining a primary speckle pattern on the target object and computing at least one of a respective cross-correlation and a decorrelation between the primary speckle pattern and the speckle patterns of the reference images.

4. The method of claim 1, further comprising emitting the speckle pattern of light in intermittent pulses.

5. The method of claim 4, further comprising altering a frequency of the emitted light pulses.

6. The method of claim 1, further comprising maneuvering the robot to avoid a target object classified as an obstacle.

7. The method of claim 1, further comprising:
identifying an occlusion in the scene about the robot, the occlusion indicating an un-viewable area in the scene by one or more imaging sensors of the robot from a current vantage point; and
maneuvering the robot across the work surface of the working area to obtain a new vantage point that allows the one or more image sensors to detect the target object in the occlusion.

8. The method of claim 1, wherein determining whether the living object needs assistance comprises determining whether the living object is resting or injured.

9. The method of claim 1, wherein determining whether the living object needs assistance further comprises resolving the state, the pose, and/or the gesture of the target object and determining whether the target object is alive, sitting, lying down, waiving, falling, or fallen.

10. The method of claim 1, wherein the gesture of the target object is a falling or waving gesture.

11. The method of claim 1, further comprising, when the living object needs assistance, maneuvering the robot to approach the target object based on the three-dimensional depth map.

12. The method of claim 11, further comprising:
maneuvering the robot to move toward and stop next to the target object; and
verifying a location of the target object and/or the state, the pose, and/or the gesture of the target object.

* * * * *